US012509736B2

(12) United States Patent
Dietrich et al.

(10) Patent No.: US 12,509,736 B2
(45) Date of Patent: Dec. 30, 2025

(54) GENETIC LOCI ASSOCIATED WITH DISEASE RESISTANCE IN SOYBEANS

(71) Applicant: Syngenta Participations AG, Basel (CH)

(72) Inventors: Robert Arthur Dietrich, Durham, NC (US); Thomas Joseph Curley, Durham, NC (US); Becky Welsh Breitinger, Durham, NC (US); John Luther Dawson, Durham, NC (US); John Daniel Hipskind, Durham, NC (US); Qingli Liu, Durham, NC (US)

(73) Assignee: Syngenta Crop Protection AG, Basel (CH)

( * ) Notice: Subject to any disclaimer, the term of this patent is extended or adjusted under 35 U.S.C. 154(b) by 26 days.

(21) Appl. No.: 18/046,021

(22) Filed: Oct. 12, 2022

(65) Prior Publication Data

US 2023/0147114 A1 May 11, 2023

Related U.S. Application Data

(62) Division of application No. 16/095,032, filed as application No. PCT/US2017/036712 on Jun. 9, 2017, now abandoned.

(60) Provisional application No. 62/347,945, filed on Jun. 9, 2016.

(51) Int. Cl.

| | |
|---|---|
| ***C12Q 1/68*** | (2018.01) |
| ***A01H 1/04*** | (2006.01) |
| ***A01H 5/10*** | (2018.01) |
| ***A01H 6/54*** | (2018.01) |
| ***C12N 15/82*** | (2006.01) |
| ***C12Q 1/6895*** | (2018.01) |

(52) U.S. Cl.

CPC ........... *C12Q 1/6895* (2013.01); *A01H 1/045* (2021.01); *A01H 5/10* (2013.01); *A01H 6/542* (2018.05); *C12N 15/8282* (2013.01)

(58) Field of Classification Search

None

See application file for complete search history.

(56) References Cited

U.S. PATENT DOCUMENTS

| | | | | |
|---|---|---|---|---|
| 7,842,850 | B2 | 11/2010 | Singh | |
| 8,759,607 | B2 * | 6/2014 | Harada | A01H 5/10 800/312 |
| 2007/0261139 | A1 | 11/2007 | Singh | |
| 2010/0263094 | A1 | 10/2010 | Singh | |
| 2011/0083234 | A1 | 4/2011 | Nguyen | |
| 2014/0255932 | A1 | 9/2014 | Harada et al. | |
| 2015/0135359 | A1 | 5/2015 | Baley et al. | |
| 2016/0073598 | A1 | 3/2016 | Yu et al. | |

OTHER PUBLICATIONS

Akpertey, A., Genetic introgression from Glycine Tomentella to soybean to increase seed yield., Dissertation submitted in the Graduate College of the University of Illinois at Urbana-Champaign, 2015.

International Search Report for International Patent Application No. PCT/US2017/036712 mailed Dec. 27, 2017.

Extended ESR for EP17815926.5, mailed on Oct. 25, 2019.

Singh, R.J. et al: "Intersubgeneric hybridization between Glycine maxandG. tomentella: production of FI, amphidiploid, BCI, BC2, BC3, and fertile soybean plants", in: Theoretical and Applied Genetics; International Journal of Plant Breeding Research. Springer. Berlin. DE., vol. 128. No. 6. Apr. 3, 2015, pp. 1117-1136. XP035502554. ISSN: 0040-5752. DOI: 10.1007/S00122-015-2494-0.

Langenbach, Caspar et al: "Fighting Asian Soybean Rust", in: Frontiers in Plant Science, vol. 7. No. 797. Jun. 7, 2016, pp. 1-13. XP055287670. DOI: 10.3389/fpls.2016.0079.

Soria-Guerra, Ruth Elena et al: "Transcriptome analysis of resistant and susceptible genotypes of Glycine tomentella during Phakopsora pachyrhizi infection reveals novel rust resistance genes", in: Theoretical and Applied Genetics; International Journal of Plant Breeding Research. Springer. Berlin. DE. vol 120. No. 7. Jan. 8, 2010, pp. 1315-1333. XP019797010. ISSN: 1432-2242.

Patzoldt, M.E. et al: "Soybean rust resistance derived from Glycine tomentella in amphiploid hybrid lines", in: Crop Science. Crop Science Society of America. US. vol 47. No. 1. Jan. 1, 2007, pp. 158-161. XP009102209. ISSN: 0011-183X. DOI. 10.2135/CROPSCI2006.05.0328.

Varala et al., "Rapid Genotyping of Soybean Cultivars Using High Throughput Sequencing," Department of Crop Sciences, University of Illinois, (PLoS ONE) Sep. 2011, vol. 6, Issue 9, e24811.

Derek Shih-Shun Shiao: "Characterizing soybean rust resistance within populatins of glycine tomentella and the inheritance and characterization of soybean aphid resistance in PI 587663, PI 587677, PI 587685, and PI 594592", Jan. 1, 2012, 51 pages.

* cited by examiner

*Primary Examiner* — Medina A Ibrahim
(74) *Attorney, Agent, or Firm* — Suparna Kanjilal

(57) ABSTRACT

The present invention relates to methods and compositions for identifying, selecting and/or producing a Disease resistant soybean plant or germplasm using markers, genes and chromosomal intervals derived from *Glycine tomentella* PI441001, PI441008, PI446958, PI509501, PI583970, or PI483224. A soybean plant or germplasm that has been identified, selected and/or produced by any of the methods of the present invention is also provided. Disease resistant soybean seeds, plants and germplasms are also provided.

4 Claims, 11 Drawing Sheets

Specification includes a Sequence Listing.

**Figure. 1 Depiction of *Glycine tomentella* SNPs Associated with ASR Resistance (i.e. each dot equals 1 SNP that associates with ASR resistance)**
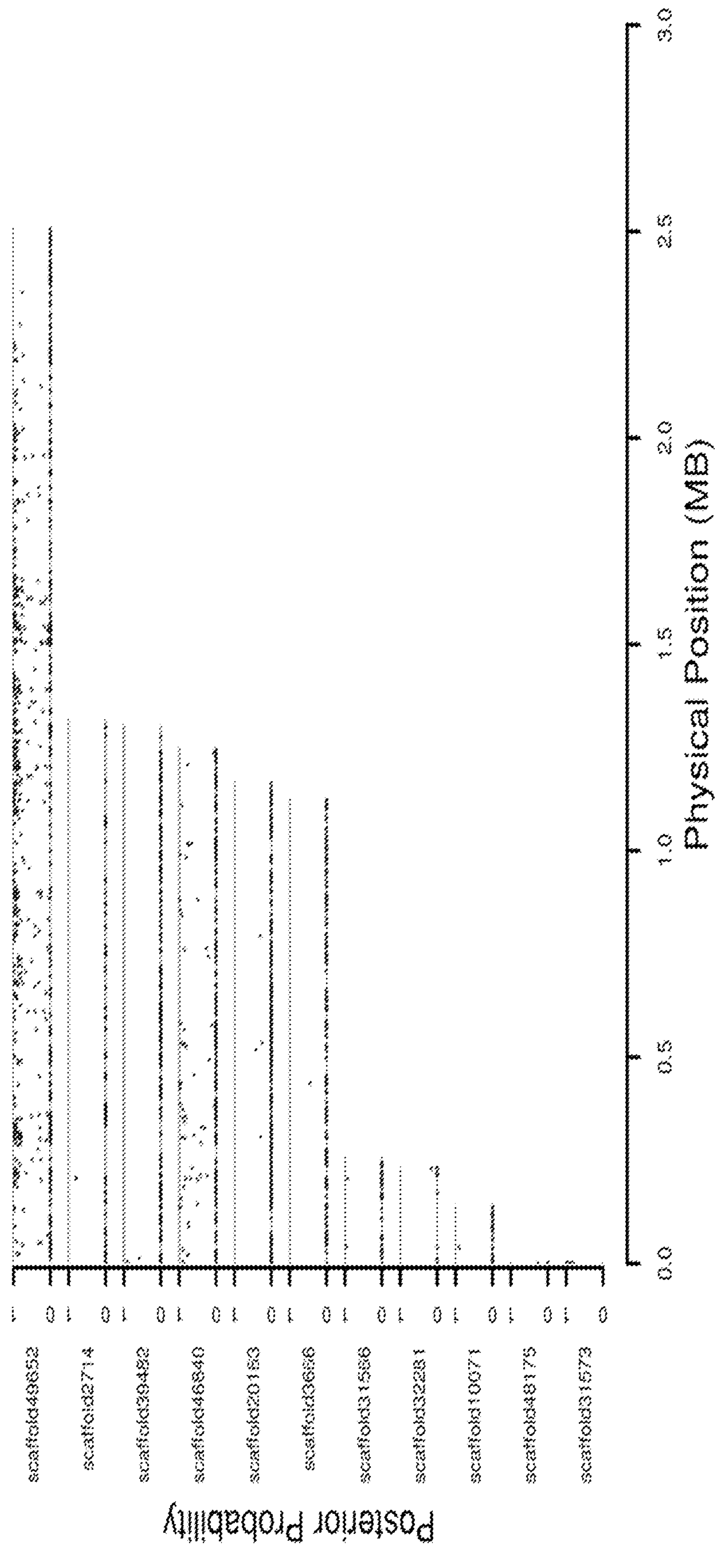

Figure. 2: Mapping Interval Discovery for Scaffold 49652
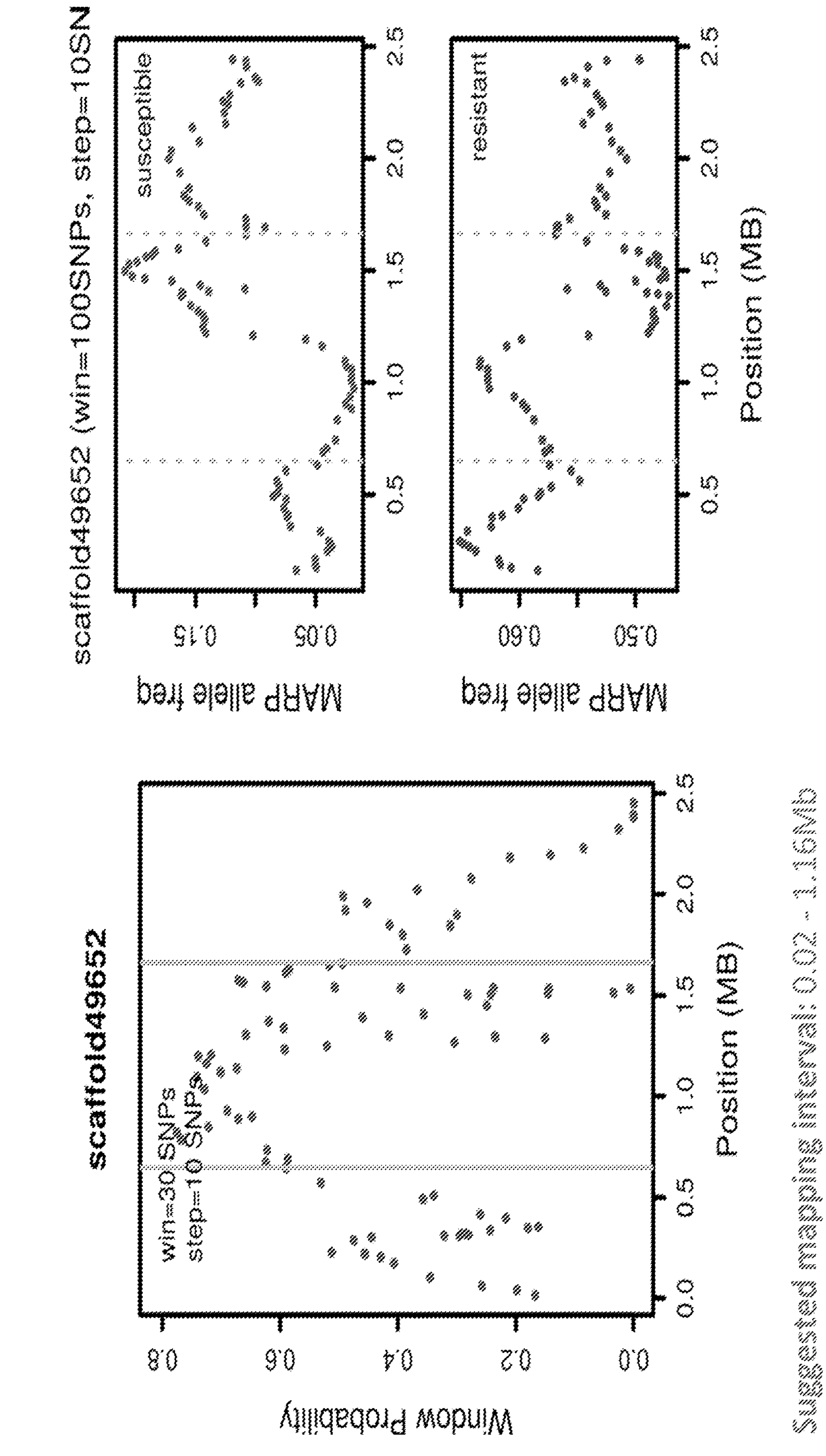

Figure. 3: Mapping Interval Discovery for Scaffold 46840
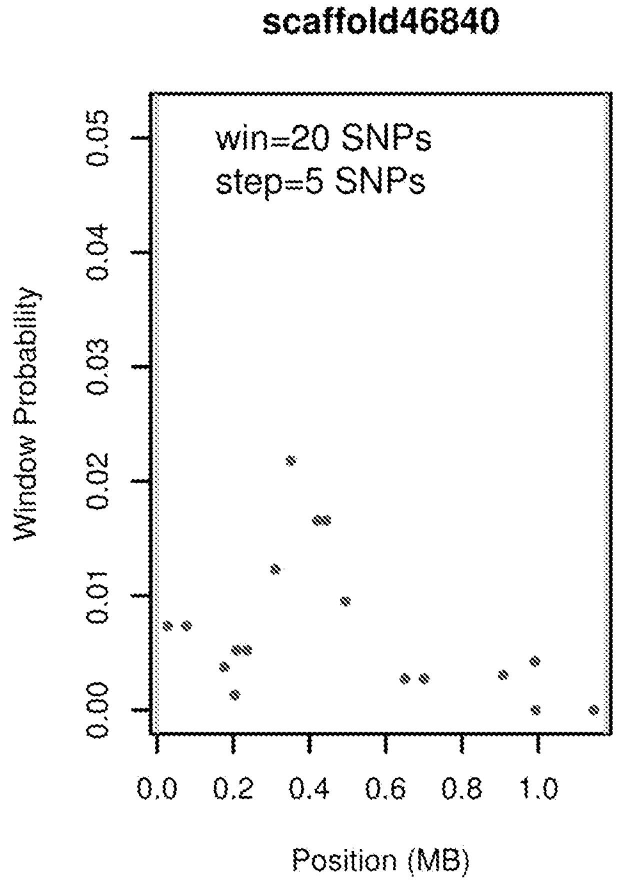
Suggested mapping interval: 0.02 - 1.19Mb

**Figure 4: Marker Association Mapping for *Glycine tomentella* PI 441001**
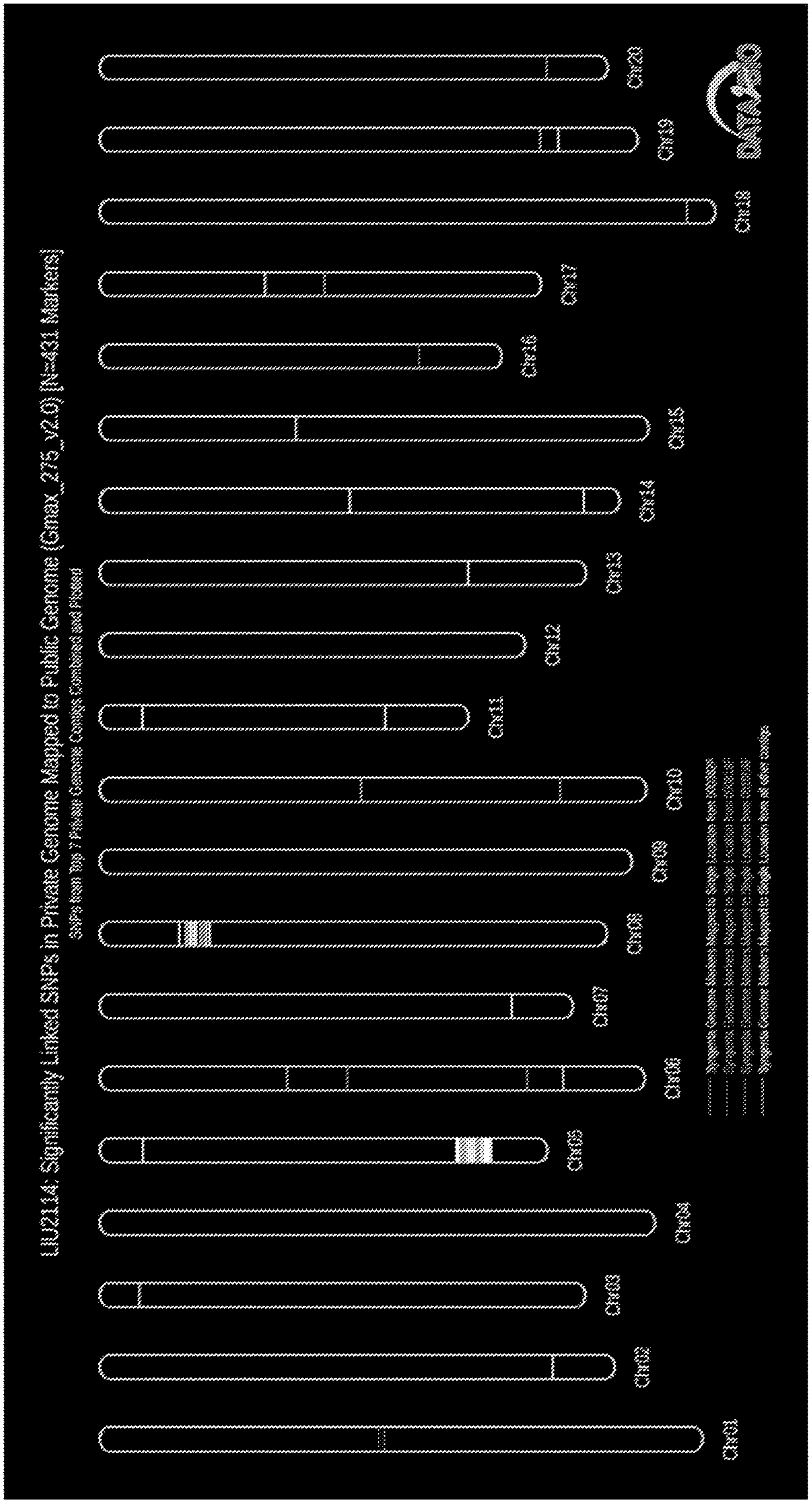

Figure 5: Scale used to rate rust resistance in *Glycine tomentella* lines

| RB0-NSP | No reaction to infection, or extremely small flecks/lesions |
|---|---|
| RB1-2-NSP | Necrotic or chlorotic flecks only, no sporulation |
| | Large or dense necrotic or chlorotic flecks only, no sporulation |
| RB3-NSP | minute uredia, large necrotic or chlorotic zones, few spores |
| RB4-SP | Small uredia with some associated necrotic or chlorotic tissues |
| TAN1-5-SP | large profusely sporulating uredia, little/no necrosis or chlorosis,1-5 is the level of sporulations, density and severity |

**Figure 6: Mapping result for *Glycine tomentella* PI583970**
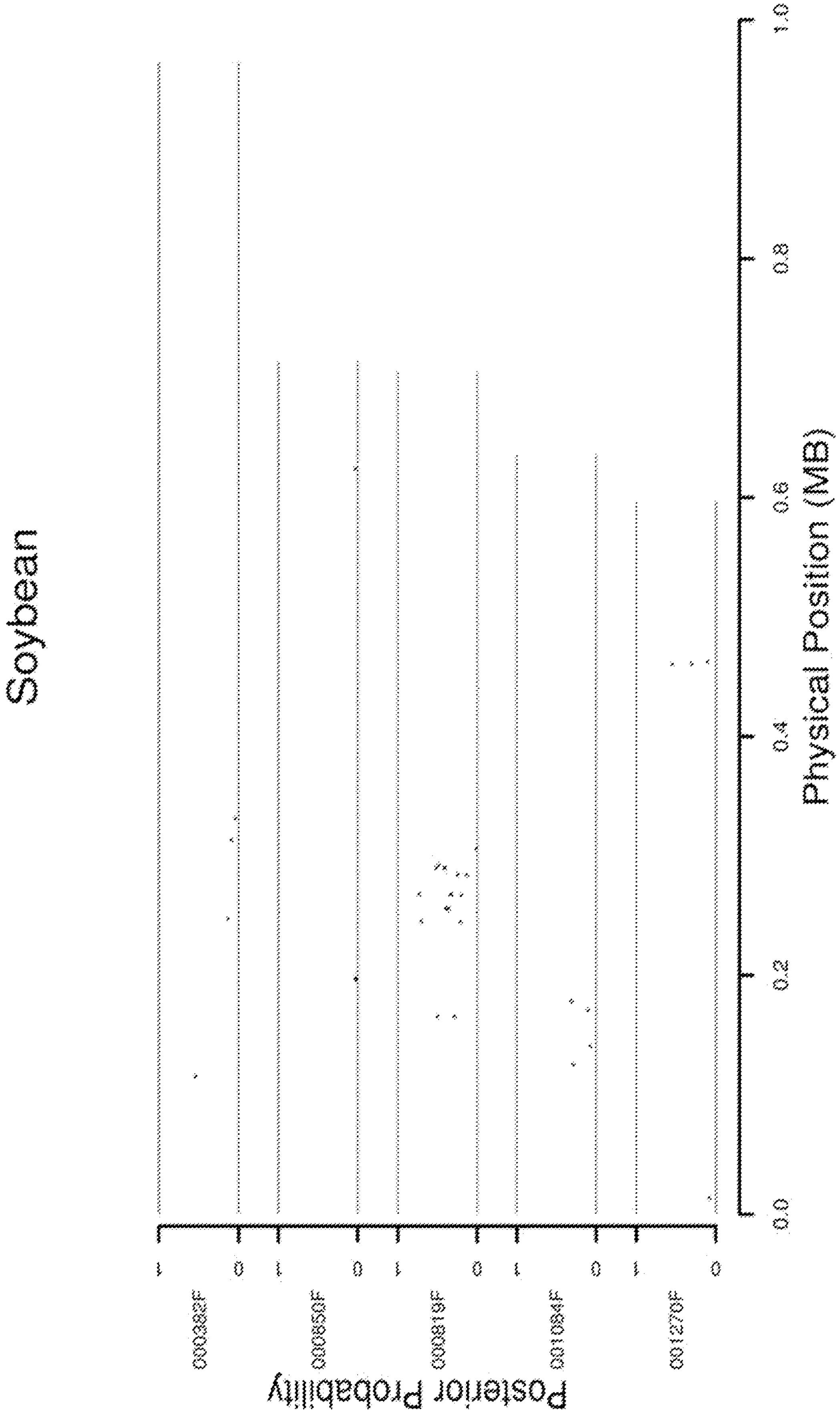

Figure 7: *Glycine tomentella* PI583970 Loci Associated with ASR Resistance mapped to *Glycine max* genome
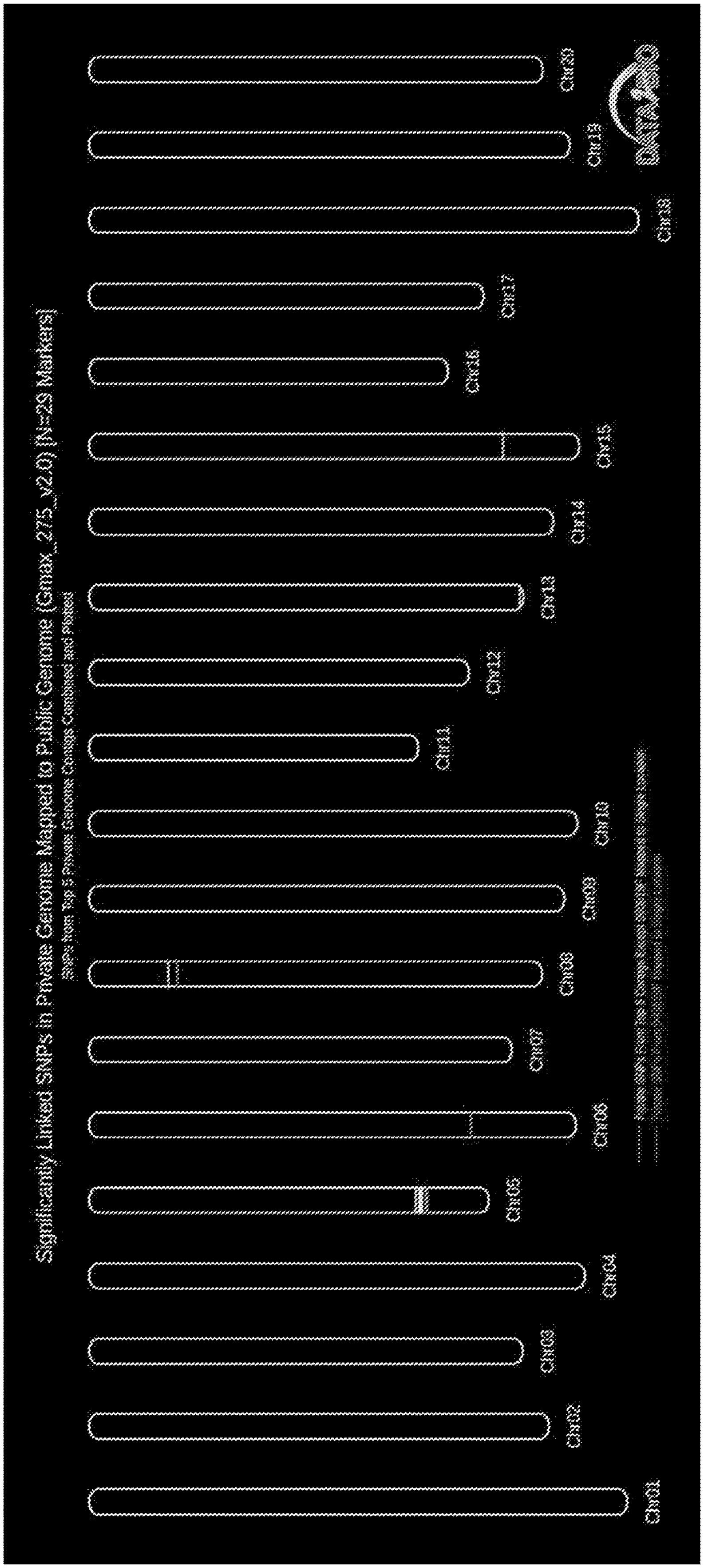

Figure 8: *Glycine tomentella* PI583970 Loci Associated with ASR Resistance to *Glycine max* genome (in relation to scaffold 001084F or SEQ ID NO: 4)
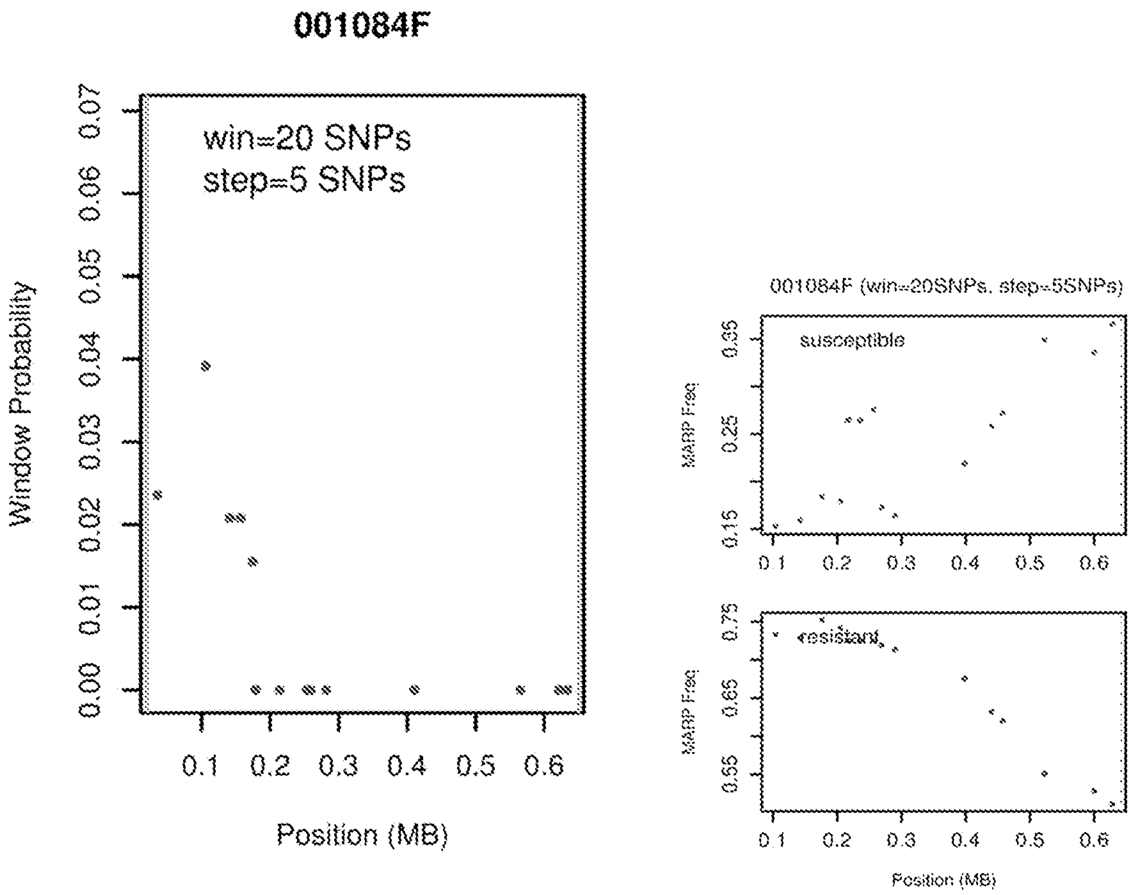

Figure 9: *Glycine tomentella* PI483224 Genomic Loci Associated with ASR Resistance
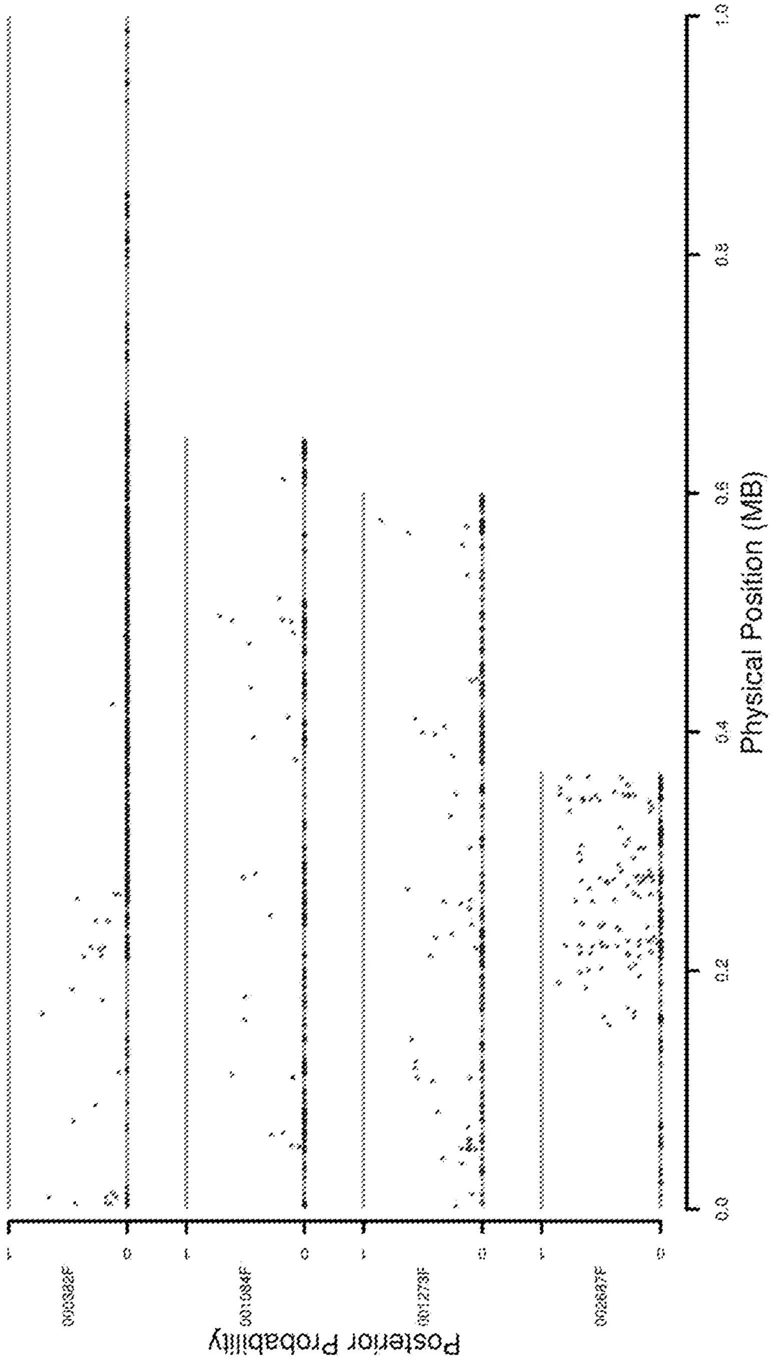

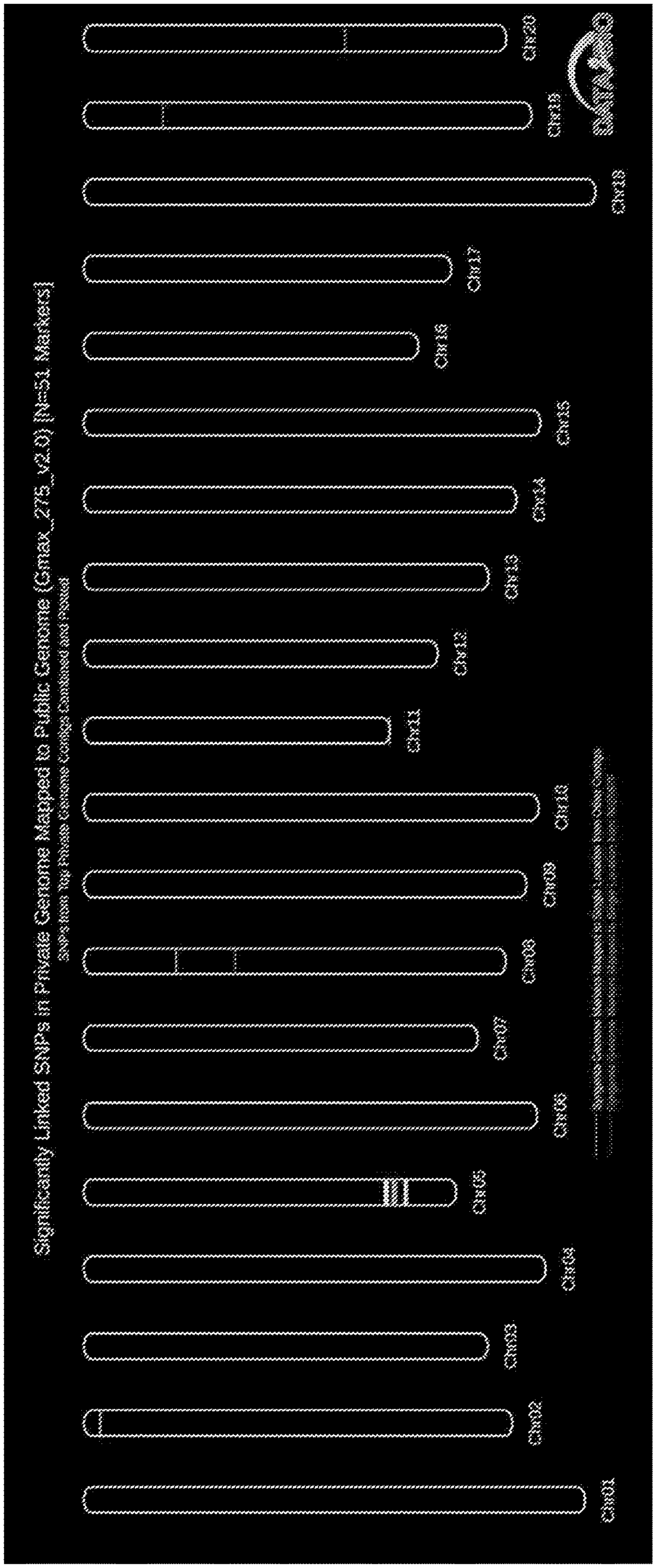
Figure 10: *Glycine tomentella* PI483224 Loci Associated with ASR Resistance mapped to *Glycine max* genome

Figure 11: *Glycine tomentella* PI483224 Loci Associated with ASR Resistance to *Glycine max* genome (in relation to scaffold 002687F or SEQ ID NO: 3)
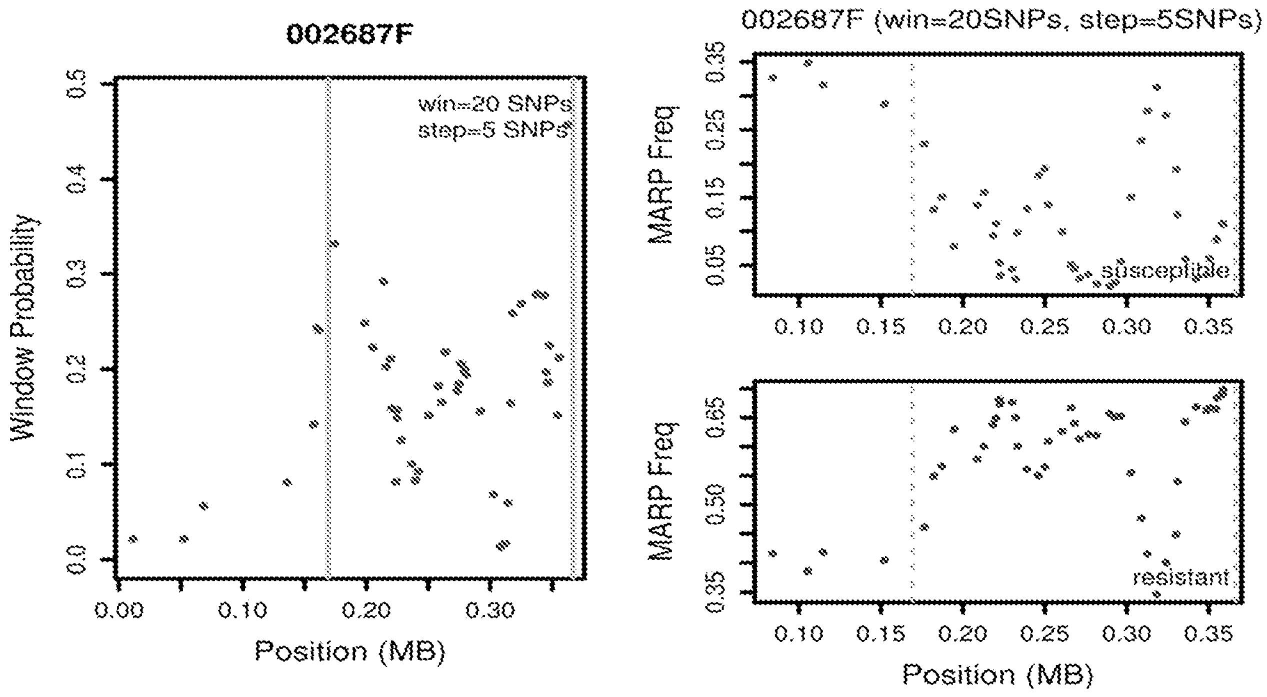

GENETIC LOCI ASSOCIATED WITH DISEASE RESISTANCE IN SOYBEANS

RELATED APPLICATIONS

This application is a divisional application of application Ser. No. 16/095,032 filed Oct. 19, 2018, which is a U.S. 371 of international application PCT/US2017/036712 filed Jun. 9, 2017, the benefit of U.S. Provisional Patent Application No. 62/347,945 filed Jun. 9, 2016, the contents of which are incorporated herein by reference in their entirety.

STATEMENT REGARDING ELECTRONIC FILING OF A SEQUENCE LISTING

A Sequence Listing in ST26 xml format, is submitted, entitled 81045.xml and 5.52 MB in size, generated on Oct. 5, 2022 and an electronic sequence listing is filed in conjunction with this application. This Sequence Listing is hereby incorporated by reference into the specification for its disclosures.

FIELD OF THE INVENTION

The present invention relates to compositions and methods for identifying, selecting and producing enhanced disease and/or pathogen resistant soybean plants.

BACKGROUND

Plant pathogens are known to cause considerable damage to important crops, resulting in significant agricultural losses with widespread consequences for both the food supply and other industries that rely on plant materials. As such, there is a long felt need to reduce the incidence and/or impact of agricultural pathogens on crop production.

Several pathogens have been associated with damage to soybeans, which individually and collectively have the potential to cause significant yield losses in the United States and throughout the world. Exemplary pathogens include, but are not limited to fungi (e.g., genus *Phytophthora* and Asian Soybean rust *Phakopsora pachyrhizi*), nematodes (e.g., genus *Meloidogyne*, particularly, *Meloidogyne javanica*), and soybean stem canker. Given the significant threat to global food supplies that these pathogens present as well as the time and expense associated with treating soybean crops to prevent yield loss, new methods for producing pathogen resistant soybean cultivars are needed. What is needed is novel resistance genes (herein, "R-Genes") that can be introduced into commercial soybean plants to control soybean pathogens

SUMMARY OF THE INVENTION

This summary lists several embodiments of the presently disclosed subject matter, and in many cases lists variations and permutations of these embodiments.

Thus, it is an object of the presently disclosed subject matter to provide methods for conveying pathogen resistance into non-resistant soybean germplasm or plant lines. Further the presently disclosed subject matter provides novel *Glycine max* lines comprising in its genome a chromosome interval, loci, and/or gene that is derived from *Glycine tomentella* and further confers Asian soybean rust resistance (herein, 'ASR') in said novel *Glycine max* line.

BRIEF DESCRIPTION OF THE SEQUENCE LISTING

SEQ ID NOs: 1 & 2 are chromosomal intervals derived from *Glycine tomentella* line accession PI441001 referred to herein as "Scaffold 46840" and "Scaffold 49652" respectively. Scaffold 49652 has been mapped to *G. tomentella* chromosome 5 and Scaffold 46840 has been mapped to *G. tomentella* chromosome 5. SEQ ID NO. 3 is a chromosomal interval derived from *Glycine tomentella* line accession PI 483224 referred to herein as "Scaffold 002687F". Scaffold 002687F has been mapped to *G. tomentella* chromosome 5. SEQ ID NO. 4 is a chromosomal interval derived from *Glycine tomentella* line accession PI 583970 referred to herein as "Scaffold 001084F". Scaffold 001084F has been mapped to *G. tomentella* chromosome 5. SEQ ID NO: 5 is a chromosomal interval derived from *Glycine tomentella* line accession PI583970 herein referred to "Scaffold 000819F". Scaffold 000819F has been mapped to *G. tomentella* chromosome 5. Genetic population mapping studies for PI441001, PI483224 and PI 583970 indicate that *Glycine tomentella* Chromosome 5 contains chromosomal intervals highly associated with ASR resistance (e.g. as corresponding to SEQ ID NOs: 1-5). Tentative data, not to be limited by theory, also indicates that *Glycine tomentella* accessions PI446958 and/or PI483224 can be used as a source for said chromosomal intervals corresponding to SEQ ID NOs 1-5. These chromosomal intervals or portions thereof may be introduced (i.e. introgressed through use of embryo rescue & marker assisted breeding (MAB)) into *Glycine max* lines to create *Glycine max* lines resistant to various diseases such as ASR. Tables 1-5 indicate single nucleotide polymorphisms (SNP) within SEQ ID NOs 1-5 that are associated with ASR resistance. Table 1 displays SNP associations for SEQ ID NO: 1 (Scaffold 46840) and Table 2 displays SNP associations for SEQ ID NO: 2 (Scaffold 49652). Table 3 displays SNP associations for SEQ ID NO: 3 (Scaffold 002687F). Table 4 displays SNP association for SEQ ID NO. 4 (Scaffold 001084F). Table 5 displays SNP associations for SEQ ID NO: 5 (Scaffold 000819F). All alleles for the SNPs identified in Tables 1-5 were determined to be significantly linked with resistance or susceptibility ($p<0.05$) to ASR.

TABLE 1

SNP Positions within SEQ ID NO: 1 that are associated with increased resistance to ASR

| SNP Name | Position | Favorable Allele (Rust Resistant) | Unfavorable Allele (Rust Susceptible) |
|---|---|---|---|
| scaffold46840_1828_SNP | 1828 | T | C |
| scaffold46840_3854_SNP | 3854 | A | T |
| scaffold46840_4596_SNP | 4596 | G | C |
| scaffold46840_7871_SNP | 7871 | G | T |
| scaffold46840_16578_SNP | 16578 | A | C |
| scaffold46840_19339_SNP | 19339 | T | A |
| scaffold46840_19702_SNP | 19702 | C | T |
| scaffold46840_19733_SNP | 19733 | A | G |
| scaffold46840_21388_SNP | 21388 | G | T |
| scaffold46840_21389_SNP | 21389 | G | A |
| scaffold46840_21402_SNP | 21402 | A | G |
| scaffold46840_21518_SNP | 21518 | A | G |
| scaffold46840_21519_SNP | 21519 | A | T |
| scaffold46840_23199_SNP | 23199 | T | C |
| scaffold46840_27734_SNP | 27734 | A | C |
| scaffold46840_28944_SNP | 28944 | C | A |
| scaffold46840_31424_SNP | 31424 | A | G |
| scaffold46840_33107_SNP | 33107 | G | A |

TABLE 1-continued

SNP Positions within SEQ ID NO: 1 that are associated with increased resistance to ASR

| SNP Name | Position | Favorable Allele (Rust Resistant) | Unfavorable Allele (Rust Susceptible) |
|---|---|---|---|
| scaffold46840__34009__SNP | 34009 | C | T |
| scaffold46840__53166__SNP | 53166 | C | T |
| scaffold46840__53469__SNP | 53469 | C | T |
| scaffold46840__53908__SNP | 53908 | A | C |
| scaffold46840__54203__SNP | 54203 | T | C |
| scaffold46840__56034__SNP | 56034 | T | G |
| scaffold46840__88414__SNP | 88414 | G | T |
| scaffold46840__98917__SNP | 98917 | T | G |
| scaffold46840__104913__SNP | 104913 | C | G |
| scaffold46840__106826__SNP | 106826 | T | C |
| scaffold46840__106962__SNP | 106962 | A | T |
| scaffold46840__107712__SNP | 107712 | T | A |
| scaffold46840__133407__SNP | 133407 | T | C |
| scaffold46840__135237__SNP | 135237 | A | T |
| scaffold46840__138711__SNP | 138711 | C | T |
| scaffold46840__143396__SNP | 143396 | G | A |
| scaffold46840__143399__SNP | 143399 | T | C |
| scaffold46840__144469__SNP | 144469 | A | G |
| scaffold46840__155153__SNP | 155153 | T | C |
| scaffold46840__156265__SNP | 156265 | C | T |
| scaffold46840__156445__SNP | 156445 | G | A |
| scaffold46840__157487__SNP | 157487 | A | G |
| scaffold46840__160570__SNP | 160570 | A | G |
| scaffold46840__173047__SNP | 173047 | C | T |
| scaffold46840__173086__SNP | 173086 | C | T |
| scaffold46840__175324__SNP | 175324 | T | C |
| scaffold46840__176807__SNP | 176807 | A | T |
| scaffold46840__183058__SNP | 183058 | G | A |
| scaffold46840__185660__SNP | 185660 | T | A |
| scaffold46840__187500__SNP | 187500 | A | G |
| scaffold46840__189638__SNP | 189638 | G | A |
| scaffold46840__193666__SNP | 193666 | A | G |
| scaffold46840__194620__SNP | 194620 | G | A |
| scaffold46840__195623__SNP | 195623 | A | G |
| scaffold46840__199643__SNP | 199643 | C | A |
| scaffold46840__203247__SNP | 203247 | T | C |
| scaffold46840__204613__SNP | 204613 | A | G |
| scaffold46840__205887__SNP | 205887 | C | T |
| scaffold46840__206645__SNP | 206645 | T | C |
| scaffold46840__206670__SNP | 206670 | A | T |
| scaffold46840__207999__SNP | 207999 | A | G |
| scaffold46840__208069__SNP | 208069 | T | G |
| scaffold46840__210361__SNP | 210361 | G | C |
| scaffold46840__210610__SNP | 210610 | T | C |
| scaffold46840__211145__SNP | 211145 | A | C |
| scaffold46840__213594__SNP | 213594 | A | G |
| scaffold46840__213644__SNP | 213644 | G | A |
| scaffold46840__228760__SNP | 228760 | T | G |
| scaffold46840__232915__SNP | 232915 | G | T |
| scaffold46840__244091__SNP | 244091 | T | A |
| scaffold46840__247995__SNP | 247995 | C | T |
| scaffold46840__252031__SNP | 252031 | A | G |
| scaffold46840__252294__SNP | 252294 | G | A |
| scaffold46840__265245__SNP | 265245 | C | G |
| scaffold46840__266739__SNP | 266739 | G | T |
| scaffold46840__292109__SNP | 292109 | C | T |
| scaffold46840__301218__SNP | 301218 | T | A |
| scaffold46840__305019__SNP | 305019 | A | G |
| scaffold46840__305252__SNP | 305252 | A | G |
| scaffold46840__306327__SNP | 306327 | T | C |
| scaffold46840__306369__SNP | 306369 | C | T |
| scaffold46840__308096__SNP | 308096 | T | C |
| scaffold46840__309679__SNP | 309679 | A | T |
| scaffold46840__310247__SNP | 310247 | C | A |
| scaffold46840__310792__SNP | 310792 | A | T |
| scaffold46840__312460__SNP | 312460 | C | A |
| scaffold46840__313406__SNP | 313406 | A | C |
| scaffold46840__329689__SNP | 329689 | G | A |
| scaffold46840__330435__SNP | 330435 | G | C |
| scaffold46840__331328__SNP | 331328 | G | A |
| scaffold46840__337919__SNP | 337919 | C | A |
| scaffold46840__350957__SNP | 350957 | A | T |

TABLE 1-continued

SNP Positions within SEQ ID NO: 1 that are associated with increased resistance to ASR

| SNP Name | Position | Favorable Allele (Rust Resistant) | Unfavorable Allele (Rust Susceptible) |
|---|---|---|---|
| scaffold46840__354267__SNP | 354267 | A | G |
| scaffold46840__355661__SNP | 355661 | T | C |
| scaffold46840__356478__SNP | 356478 | T | C |
| scaffold46840__358994__SNP | 358994 | T | C |
| scaffold46840__363408__SNP | 363408 | A | G |
| scaffold46840__367504__SNP | 367504 | G | C |
| scaffold46840__368441__SNP | 368441 | A | T |
| scaffold46840__371665__SNP | 371665 | C | T |
| scaffold46840__372390__SNP | 372390 | C | A |
| scaffold46840__372415__SNP | 372415 | T | A |
| scaffold46840__380899__SNP | 380899 | C | T |
| scaffold46840__381701__SNP | 381701 | T | G |
| scaffold46840__382539__SNP | 382539 | A | G |
| scaffold46840__384909__SNP | 384909 | A | T |
| scaffold46840__386383__SNP | 386383 | G | A |
| scaffold46840__386883__SNP | 386883 | G | C |
| scaffold46840__387699__SNP | 387699 | A | G |
| scaffold46840__388192__SNP | 388192 | C | G |
| scaffold46840__401306__SNP | 401306 | G | C |
| scaffold46840__402205__SNP | 402205 | C | T |
| scaffold46840__419063__SNP | 419063 | A | C |
| scaffold46840__419121__SNP | 419121 | C | T |
| scaffold46840__419259__SNP | 419259 | G | A |
| scaffold46840__420963__SNP | 420963 | C | G |
| scaffold46840__421037__SNP | 421037 | C | T |
| scaffold46840__421906__SNP | 421906 | T | C |
| scaffold46840__424476__SNP | 424476 | C | T |
| scaffold46840__426504__SNP | 426504 | T | C |
| scaffold46840__426550__SNP | 426550 | C | T |
| scaffold46840__433738__SNP | 433738 | C | A |
| scaffold46840__435442__SNP | 435442 | C | T |
| scaffold46840__435446__SNP | 435446 | T | C |
| scaffold46840__435456__SNP | 435456 | G | A |
| scaffold46840__436445__SNP | 436445 | G | T |
| scaffold46840__436844__SNP | 436844 | T | G |
| scaffold46840__437526__SNP | 437526 | G | T |
| scaffold46840__438692__SNP | 438692 | C | A |
| scaffold46840__440329__SNP | 440329 | G | A |
| scaffold46840__441638__SNP | 441638 | T | C |
| scaffold46840__442882__SNP | 442882 | C | T |
| scaffold46840__444624__SNP | 444624 | C | T |
| scaffold46840__444829__SNP | 444829 | G | T |
| scaffold46840__444833__SNP | 444833 | C | T |
| scaffold46840__445506__SNP | 445506 | T | C |
| scaffold46840__451845__SNP | 451845 | A | G |
| scaffold46840__455083__SNP | 455083 | G | A |
| scaffold46840__455349__SNP | 455349 | G | C |
| scaffold46840__456838__SNP | 456838 | C | T |
| scaffold46840__456840__SNP | 456840 | C | T |
| scaffold46840__456888__SNP | 456888 | G | A |
| scaffold46840__457510__SNP | 457510 | G | A |
| scaffold46840__459924__SNP | 459924 | A | T |
| scaffold46840__493769__SNP | 493769 | G | A |
| scaffold46840__493863__SNP | 493863 | T | C |
| scaffold46840__495644__SNP | 495644 | G | A |
| scaffold46840__498269__SNP | 498269 | G | C |
| scaffold46840__500187__SNP | 500187 | C | T |
| scaffold46840__524750__SNP | 524750 | G | A |
| scaffold46840__531774__SNP | 531774 | G | C |
| scaffold46840__532217__SNP | 532217 | A | G |
| scaffold46840__532460__SNP | 532460 | C | A |
| scaffold46840__532849__SNP | 532849 | C | T |
| scaffold46840__533165__SNP | 533165 | T | G |
| scaffold46840__534674__SNP | 534674 | A | G |
| scaffold46840__534815__SNP | 534815 | T | C |
| scaffold46840__541100__SNP | 541100 | T | C |
| scaffold46840__547800__SNP | 547800 | A | G |
| scaffold46840__548096__SNP | 548096 | A | T |
| scaffold46840__548651__SNP | 548651 | A | G |
| scaffold46840__548909__SNP | 548909 | C | A |
| scaffold46840__550359__SNP | 550359 | A | G |
| scaffold46840__554136__SNP | 554136 | T | C |

TABLE 1-continued

SNP Positions within SEQ ID NO: 1 that are associated with increased resistance to ASR

| SNP Name | Position | Favorable Allele (Rust Resistant) | Unfavorable Allele (Rust Susceptible) |
|---|---|---|---|
| scaffold46840_557231_SNP | 557231 | G | C |
| scaffold46840_557476_SNP | 557476 | T | C |
| scaffold46840_559239_SNP | 559239 | G | T |
| scaffold46840_566877_SNP | 566877 | G | T |
| scaffold46840_573263_SNP | 573263 | C | G |
| scaffold46840_576344_SNP | 576344 | G | A |
| scaffold46840_576937_SNP | 576937 | T | A |
| scaffold46840_581793_SNP | 581793 | T | C |
| scaffold46840_631321_SNP | 631321 | T | A |
| scaffold46840_632437_SNP | 632437 | T | C |
| scaffold46840_644135_SNP | 644135 | G | A |
| scaffold46840_646516_SNP | 646516 | A | C |
| scaffold46840_646661_SNP | 646661 | C | T |
| scaffold46840_650395_SNP | 650395 | C | G |
| scaffold46840_650533_SNP | 650533 | T | G |
| scaffold46840_650883_SNP | 650883 | T | C |
| scaffold46840_680820_SNP | 680820 | T | C |
| scaffold46840_700296_SNP | 700296 | G | T |
| scaffold46840_709091_SNP | 709091 | T | C |
| scaffold46840_717250_SNP | 717250 | A | G |
| scaffold46840_717919_SNP | 717919 | C | T |
| scaffold46840_723204_SNP | 723204 | A | G |
| scaffold46840_737847_SNP | 737847 | A | C |
| scaffold46840_742854_SNP | 742854 | G | C |
| scaffold46840_761047_SNP | 761047 | C | T |
| scaffold46840_763626_SNP | 763626 | G | A |
| scaffold46840_767022_SNP | 767022 | A | T |
| scaffold46840_773124_SNP | 773124 | G | A |
| scaffold46840_795852_SNP | 795852 | G | A |
| scaffold46840_844662_SNP | 844662 | A | T |
| scaffold46840_856241_SNP | 856241 | C | T |
| scaffold46840_864819_SNP | 864819 | A | C |
| scaffold46840_868404_SNP | 868404 | T | A |
| scaffold46840_881483_SNP | 881483 | G | A |
| scaffold46840_881687_SNP | 881687 | G | A |
| scaffold46840_948734_SNP | 948734 | C | G |
| scaffold46840_951580_SNP | 951580 | C | A |
| scaffold46840_979277_SNP | 979277 | C | A |
| scaffold46840_984144_SNP | 984144 | A | G |
| scaffold46840_985119_SNP | 985119 | A | G |
| scaffold46840_990969_SNP | 990969 | T | G |
| scaffold46840_991246_SNP | 991246 | G | A |
| scaffold46840_996069_SNP | 996069 | A | T |
| scaffold46840_996617_SNP | 996617 | T | C |
| scaffold46840_1005071_SNP | 1005071 | G | T |
| scaffold46840_1012711_SNP | 1012711 | C | A |
| scaffold46840_1013144_SNP | 1013144 | A | T |
| scaffold46840_1013502_SNP | 1013502 | C | T |
| scaffold46840_1013853_SNP | 1013853 | G | T |
| scaffold46840_1014491_SNP | 1014491 | A | G |
| scaffold46840_1017387_SNP | 1017387 | T | G |
| scaffold46840_1017454_SNP | 1017454 | C | T |
| scaffold46840_1017456_SNP | 1017456 | A | G |
| scaffold46840_1017513_SNP | 1017513 | G | A |
| scaffold46840_1017562_SNP | 1017562 | G | A |
| scaffold46840_1017580_SNP | 1017580 | A | G |
| scaffold46840_1018041_SNP | 1018041 | G | C |
| scaffold46840_1018803_SNP | 1018803 | A | G |
| scaffold46840_1018807_SNP | 1018807 | A | T |
| scaffold46840_1018808_SNP | 1018808 | A | T |
| scaffold46840_1018809_SNP | 1018809 | A | T |
| scaffold46840_1019830_SNP | 1019830 | T | A |
| scaffold46840_1019879_SNP | 1019879 | C | T |
| scaffold46840_1023021_SNP | 1023021 | A | G |
| scaffold46840_1025444_SNP | 1025444 | T | C |
| scaffold46840_1027183_SNP | 1027183 | T | C |
| scaffold46840_1027185_SNP | 1027185 | T | C |
| scaffold46840_1027206_SNP | 1027206 | C | T |
| scaffold46840_1028386_SNP | 1028386 | T | A |
| scaffold46840_1035663_SNP | 1035663 | T | G |
| scaffold46840_1050796_SNP | 1050796 | A | T |
| scaffold46840_1092407_SNP | 1092407 | C | T |

TABLE 1-continued

SNP Positions within SEQ ID NO: 1 that are associated with increased resistance to ASR

| SNP Name | Position | Favorable Allele (Rust Resistant) | Unfavorable Allele (Rust Susceptible) |
|---|---|---|---|
| scaffold46840_1092836_SNP | 1092836 | A | T |
| scaffold46840_1097462_SNP | 1097462 | G | T |
| scaffold46840_1100700_SNP | 1100700 | C | A |
| scaffold46840_1107270_SNP | 1107270 | C | G |
| scaffold46840_1108688_SNP | 1108688 | T | C |
| scaffold46840_1110411_SNP | 1110411 | G | A |
| scaffold46840_1110578_SNP | 1110578 | G | A |
| scaffold46840_1113083_SNP | 1113083 | C | A |
| scaffold46840_1128638_SNP | 1128638 | A | G |
| scaffold46840_1132152_SNP | 1132152 | A | T |
| scaffold46840_1145964_SNP | 1145964 | T | G |
| scaffold46840_1151108_SNP | 1151108 | T | C |
| scaffold46840_1152027_SNP | 1152027 | T | C |
| scaffold46840_1164739_SNP | 1164739 | A | C |
| scaffold46840_1179177_SNP | 1179177 | A | G |
| scaffold46840_1196044_SNP | 1196044 | T | C |
| scaffold46840_1208547_SNP | 1208547 | T | A |
| scaffold46840_1222050_SNP | 1222050 | T | C |
| scaffold46840_1236321_SNP | 1236321 | C | A |
| scaffold46840_1238462_SNP | 1238462 | A | T |
| scaffold46840_1245039_SNP | 1245039 | A | T |

TABLE 2

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652_5217_SNP | 5217 | T | C |
| scaffold49652_17452_SNP | 17452 | T | C |
| scaffold49652_17508_SNP | 17508 | T | C |
| scaffold49652_18133_SNP | 18133 | G | A |
| scaffold49652_23299_SNP | 23299 | T | G |
| scaffold49652_23932_SNP | 23932 | T | A |
| scaffold49652_25316_SNP | 25316 | C | T |
| scaffold49652_27493_SNP | 27493 | C | T |
| scaffold49652_31604_SNP | 31604 | A | C |
| scaffold49652_33717_SNP | 33717 | T | C |
| scaffold49652_33754_SNP | 33754 | G | A |
| scaffold49652_33815_SNP | 33815 | C | T |
| scaffold49652_35579_SNP | 35579 | A | G |
| scaffold49652_42441_SNP | 42441 | C | T |
| scaffold49652_45742_SNP | 45742 | A | G |
| scaffold49652_47403_SNP | 47403 | G | T |
| scaffold49652_50271_SNP | 50271 | C | G |
| scaffold49652_50273_SNP | 50273 | A | C |
| scaffold49652_52163_SNP | 52163 | A | G |
| scaffold49652_53843_SNP | 53843 | T | C |
| scaffold49652_53867_SNP | 53867 | T | C |
| scaffold49652_57089_SNP | 57089 | A | G |
| scaffold49652_60723_SNP | 60723 | C | T |
| scaffold49652_62132_SNP | 62132 | T | C |
| scaffold49652_64164_SNP | 64164 | T | A |
| scaffold49652_65402_SNP | 65402 | G | A |
| scaffold49652_67001_SNP | 67001 | G | T |
| scaffold49652_68551_SNP | 68551 | G | A |
| scaffold49652_88556_SNP | 88556 | A | G |
| scaffold49652_90063_SNP | 90063 | T | C |
| scaffold49652_95177_SNP | 95177 | A | G |
| scaffold49652_95604_SNP | 95604 | C | T |
| scaffold49652_98488_SNP | 98488 | G | A |
| scaffold49652_112122_SNP | 112122 | G | T |
| scaffold49652_119068_SNP | 119068 | T | C |
| scaffold49652_129424_SNP | 129424 | G | A |
| scaffold49652_130808_SNP | 130808 | A | G |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__136261__SNP | 136261 | C | A |
| scaffold49652__159300__SNP | 159300 | G | T |
| scaffold49652__164108__SNP | 164108 | G | A |
| scaffold49652__164267__SNP | 164267 | C | T |
| scaffold49652__164427__SNP | 164427 | A | G |
| scaffold49652__176366__SNP | 176366 | T | A |
| scaffold49652__178148__SNP | 178148 | T | C |
| scaffold49652__181207__SNP | 181207 | T | C |
| scaffold49652__182444__SNP | 182444 | A | G |
| scaffold49652__183913__SNP | 183913 | G | A |
| scaffold49652__185602__SNP | 185602 | A | C |
| scaffold49652__193012__SNP | 193012 | A | G |
| scaffold49652__196752__SNP | 196752 | T | C |
| scaffold49652__197492__SNP | 197492 | G | A |
| scaffold49652__197499__SNP | 197499 | T | C |
| scaffold49652__197616__SNP | 197616 | G | A |
| scaffold49652__199871__SNP | 199871 | G | A |
| scaffold49652__200228__SNP | 200228 | A | G |
| scaffold49652__203298__SNP | 203298 | G | A |
| scaffold49652__205904__SNP | 205904 | G | T |
| scaffold49652__206666__SNP | 206666 | A | G |
| scaffold49652__208874__SNP | 208874 | C | T |
| scaffold49652__215183__SNP | 215183 | G | A |
| scaffold49652__215265__SNP | 215265 | A | G |
| scaffold49652__216104__SNP | 216104 | G | A |
| scaffold49652__217181__SNP | 217181 | C | T |
| scaffold49652__218571__SNP | 218571 | A | G |
| scaffold49652__219511__SNP | 219511 | T | C |
| scaffold49652__219529__SNP | 219529 | A | G |
| scaffold49652__219575__SNP | 219575 | C | T |
| scaffold49652__219952__SNP | 219952 | G | A |
| scaffold49652__219953__SNP | 219953 | G | A |
| scaffold49652__219963__SNP | 219963 | T | C |
| scaffold49652__220068__SNP | 220068 | C | A |
| scaffold49652__220176__SNP | 220176 | G | T |
| scaffold49652__221463__SNP | 221463 | C | A |
| scaffold49652__222090__SNP | 222090 | G | A |
| scaffold49652__222099__SNP | 222099 | A | G |
| scaffold49652__222102__SNP | 222102 | A | G |
| scaffold49652__222109__SNP | 222109 | G | A |
| scaffold49652__222189__SNP | 222189 | G | A |
| scaffold49652__222205__SNP | 222205 | C | A |
| scaffold49652__222306__SNP | 222306 | C | T |
| scaffold49652__222440__SNP | 222440 | T | A |
| scaffold49652__222903__SNP | 222903 | C | A |
| scaffold49652__222937__SNP | 222937 | T | C |
| scaffold49652__222944__SNP | 222944 | G | A |
| scaffold49652__223876__SNP | 223876 | C | G |
| scaffold49652__223933__SNP | 223933 | C | G |
| scaffold49652__224422__SNP | 224422 | C | T |
| scaffold49652__225283__SNP | 225283 | G | C |
| scaffold49652__225922__SNP | 225922 | T | C |
| scaffold49652__226654__SNP | 226654 | G | C |
| scaffold49652__227737__SNP | 227737 | T | C |
| scaffold49652__228474__SNP | 228474 | A | G |
| scaffold49652__229075__SNP | 229075 | A | G |
| scaffold49652__230244__SNP | 230244 | T | C |
| scaffold49652__230528__SNP | 230528 | G | T |
| scaffold49652__238854__SNP | 238854 | C | G |
| scaffold49652__240022__SNP | 240022 | C | T |
| scaffold49652__240304__SNP | 240304 | C | T |
| scaffold49652__250663__SNP | 250663 | G | A |
| scaffold49652__251169__SNP | 251169 | A | G |
| scaffold49652__251304__SNP | 251304 | A | G |
| scaffold49652__252410__SNP | 252410 | T | C |
| scaffold49652__266259__SNP | 266259 | G | A |
| scaffold49652__269948__SNP | 269948 | G | A |
| scaffold49652__276433__SNP | 276433 | A | G |
| scaffold49652__279239__SNP | 279239 | T | A |
| scaffold49652__287492__SNP | 287492 | C | A |
| scaffold49652__287493__SNP | 287493 | A | C |
| scaffold49652__287554__SNP | 287554 | A | C |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__289763__SNP | 289763 | A | T |
| scaffold49652__291185__SNP | 291185 | G | T |
| scaffold49652__291711__SNP | 291711 | C | T |
| scaffold49652__293833__SNP | 293833 | T | C |
| scaffold49652__293985__SNP | 293985 | A | G |
| scaffold49652__294334__SNP | 294334 | A | T |
| scaffold49652__294339__SNP | 294339 | T | G |
| scaffold49652__294569__SNP | 294569 | A | C |
| scaffold49652__294571__SNP | 294571 | T | A |
| scaffold49652__294582__SNP | 294582 | A | G |
| scaffold49652__296085__SNP | 296085 | A | T |
| scaffold49652__297573__SNP | 297573 | A | T |
| scaffold49652__297580__SNP | 297580 | T | C |
| scaffold49652__297847__SNP | 297847 | A | C |
| scaffold49652__298949__SNP | 298949 | A | C |
| scaffold49652__299350__SNP | 299350 | G | C |
| scaffold49652__300420__SNP | 300420 | G | C |
| scaffold49652__300424__SNP | 300424 | A | G |
| scaffold49652__301124__SNP | 301124 | G | A |
| scaffold49652__301167__SNP | 301167 | T | A |
| scaffold49652__301238__SNP | 301238 | T | A |
| scaffold49652__301913__SNP | 301913 | T | C |
| scaffold49652__302027__SNP | 302027 | A | C |
| scaffold49652__302168__SNP | 302168 | G | C |
| scaffold49652__302219__SNP | 302219 | T | C |
| scaffold49652__302434__SNP | 302434 | G | T |
| scaffold49652__302450__SNP | 302450 | T | A |
| scaffold49652__302683__SNP | 302683 | G | T |
| scaffold49652__303688__SNP | 303688 | T | C |
| scaffold49652__303860__SNP | 303860 | C | A |
| scaffold49652__304361__SNP | 304361 | G | A |
| scaffold49652__304888__SNP | 304888 | A | G |
| scaffold49652__304894__SNP | 304894 | A | G |
| scaffold49652__304927__SNP | 304927 | C | T |
| scaffold49652__304978__SNP | 304978 | T | C |
| scaffold49652__305002__SNP | 305002 | C | T |
| scaffold49652__305014__SNP | 305014 | T | A |
| scaffold49652__305380__SNP | 305380 | T | C |
| scaffold49652__306466__SNP | 306466 | C | G |
| scaffold49652__306538__SNP | 306538 | A | C |
| scaffold49652__308411__SNP | 308411 | C | G |
| scaffold49652__308438__SNP | 308438 | C | A |
| scaffold49652__308835__SNP | 308835 | C | T |
| scaffold49652__308836__SNP | 308836 | A | G |
| scaffold49652__308930__SNP | 308930 | T | C |
| scaffold49652__309042__SNP | 309042 | A | G |
| scaffold49652__309062__SNP | 309062 | A | C |
| scaffold49652__309971__SNP | 309971 | A | C |
| scaffold49652__310193__SNP | 310193 | A | C |
| scaffold49652__310385__SNP | 310385 | T | A |
| scaffold49652__310406__SNP | 310406 | T | G |
| scaffold49652__311266__SNP | 311266 | C | A |
| scaffold49652__311330__SNP | 311330 | T | C |
| scaffold49652__311522__SNP | 311522 | T | C |
| scaffold49652__311789__SNP | 311789 | A | G |
| scaffold49652__311935__SNP | 311935 | G | A |
| scaffold49652__311938__SNP | 311938 | T | C |
| scaffold49652__312257__SNP | 312257 | G | A |
| scaffold49652__312289__SNP | 312289 | T | C |
| scaffold49652__313499__SNP | 313499 | C | G |
| scaffold49652__313588__SNP | 313588 | C | T |
| scaffold49652__314672__SNP | 314672 | A | G |
| scaffold49652__315497__SNP | 315497 | A | G |
| scaffold49652__315498__SNP | 315498 | A | G |
| scaffold49652__315527__SNP | 315527 | G | A |
| scaffold49652__316007__SNP | 316007 | G | T |
| scaffold49652__316309__SNP | 316309 | G | A |
| scaffold49652__316425__SNP | 316425 | T | G |
| scaffold49652__317362__SNP | 317362 | C | G |
| scaffold49652__318444__SNP | 318444 | A | T |
| scaffold49652__318600__SNP | 318600 | G | T |
| scaffold49652__318645__SNP | 318645 | C | T |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652_318669_SNP | 318669 | T | C |
| scaffold49652_318696_SNP | 318696 | C | G |
| scaffold49652_319094_SNP | 319094 | T | C |
| scaffold49652_319397_SNP | 319397 | C | A |
| scaffold49652_319704_SNP | 319704 | G | A |
| scaffold49652_320373_SNP | 320373 | A | G |
| scaffold49652_321853_SNP | 321853 | T | A |
| scaffold49652_325751_SNP | 325751 | T | A |
| scaffold49652_326774_SNP | 326774 | G | C |
| scaffold49652_327926_SNP | 327926 | A | C |
| scaffold49652_327964_SNP | 327964 | G | T |
| scaffold49652_328344_SNP | 328344 | C | T |
| scaffold49652_328346_SNP | 328346 | T | G |
| scaffold49652_328748_SNP | 328748 | G | A |
| scaffold49652_329021_SNP | 329021 | T | G |
| scaffold49652_329291_SNP | 329291 | G | T |
| scaffold49652_329315_SNP | 329315 | A | C |
| scaffold49652_329561_SNP | 329561 | G | A |
| scaffold49652_329660_SNP | 329660 | A | T |
| scaffold49652_329903_SNP | 329903 | G | C |
| scaffold49652_330206_SNP | 330206 | C | T |
| scaffold49652_330224_SNP | 330224 | A | T |
| scaffold49652_330593_SNP | 330593 | A | G |
| scaffold49652_331196_SNP | 331196 | T | C |
| scaffold49652_333099_SNP | 333099 | G | A |
| scaffold49652_333133_SNP | 333133 | T | C |
| scaffold49652_333359_SNP | 333359 | T | G |
| scaffold49652_333413_SNP | 333413 | C | T |
| scaffold49652_333453_SNP | 333453 | G | C |
| scaffold49652_334022_SNP | 334022 | C | A |
| scaffold49652_334587_SNP | 334587 | T | C |
| scaffold49652_335926_SNP | 335926 | T | C |
| scaffold49652_336373_SNP | 336373 | C | T |
| scaffold49652_336392_SNP | 336392 | T | C |
| scaffold49652_336422_SNP | 336422 | G | C |
| scaffold49652_336783_SNP | 336783 | C | G |
| scaffold49652_336839_SNP | 336839 | G | T |
| scaffold49652_337703_SNP | 337703 | A | G |
| scaffold49652_337918_SNP | 337918 | A | G |
| scaffold49652_338070_SNP | 338070 | T | G |
| scaffold49652_339859_SNP | 339859 | C | T |
| scaffold49652_340107_SNP | 340107 | A | G |
| scaffold49652_340120_SNP | 340120 | G | C |
| scaffold49652_340174_SNP | 340174 | C | T |
| scaffold49652_341049_SNP | 341049 | G | T |
| scaffold49652_341264_SNP | 341264 | C | A |
| scaffold49652_345335_SNP | 345335 | A | G |
| scaffold49652_345365_SNP | 345365 | A | T |
| scaffold49652_345374_SNP | 345374 | A | G |
| scaffold49652_345484_SNP | 345484 | C | T |
| scaffold49652_345554_SNP | 345554 | G | A |
| scaffold49652_345575_SNP | 345575 | T | C |
| scaffold49652_345600_SNP | 345600 | A | C |
| scaffold49652_347890_SNP | 347890 | A | T |
| scaffold49652_347970_SNP | 347970 | T | G |
| scaffold49652_347974_SNP | 347974 | G | A |
| scaffold49652_347979_SNP | 347979 | G | A |
| scaffold49652_347996_SNP | 347996 | G | T |
| scaffold49652_349930_SNP | 349930 | C | T |
| scaffold49652_349948_SNP | 349948 | T | G |
| scaffold49652_351367_SNP | 351367 | T | A |
| scaffold49652_351556_SNP | 351556 | T | C |
| scaffold49652_351856_SNP | 351856 | G | A |
| scaffold49652_352037_SNP | 352037 | G | A |
| scaffold49652_353477_SNP | 353477 | C | T |
| scaffold49652_353505_SNP | 353505 | G | A |
| scaffold49652_354088_SNP | 354088 | T | C |
| scaffold49652_354298_SNP | 354298 | A | C |
| scaffold49652_354374_SNP | 354374 | C | T |
| scaffold49652_355975_SNP | 355975 | G | T |
| scaffold49652_356979_SNP | 356979 | G | A |
| scaffold49652_358191_SNP | 358191 | A | G |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652_360296_SNP | 360296 | T | C |
| scaffold49652_360986_SNP | 360986 | C | A |
| scaffold49652_362062_SNP | 362062 | G | A |
| scaffold49652_365432_SNP | 365432 | A | G |
| scaffold49652_366972_SNP | 366972 | C | T |
| scaffold49652_367235_SNP | 367235 | C | T |
| scaffold49652_374498_SNP | 374498 | C | A |
| scaffold49652_376756_SNP | 376756 | T | G |
| scaffold49652_381774_SNP | 381774 | G | C |
| scaffold49652_400199_SNP | 400199 | A | G |
| scaffold49652_400786_SNP | 400786 | C | T |
| scaffold49652_402643_SNP | 402643 | T | A |
| scaffold49652_403055_SNP | 403055 | A | T |
| scaffold49652_403379_SNP | 403379 | C | T |
| scaffold49652_403705_SNP | 403705 | C | T |
| scaffold49652_404201_SNP | 404201 | G | A |
| scaffold49652_404905_SNP | 404905 | G | C |
| scaffold49652_409753_SNP | 409753 | C | A |
| scaffold49652_411457_SNP | 411457 | A | C |
| scaffold49652_414901_SNP | 414901 | C | G |
| scaffold49652_416379_SNP | 416379 | G | A |
| scaffold49652_418210_SNP | 418210 | A | G |
| scaffold49652_433538_SNP | 433538 | C | T |
| scaffold49652_440036_SNP | 440036 | T | C |
| scaffold49652_449338_SNP | 449338 | A | T |
| scaffold49652_449339_SNP | 449339 | A | T |
| scaffold49652_453711_SNP | 453711 | G | A |
| scaffold49652_458506_SNP | 458506 | A | G |
| scaffold49652_467749_SNP | 467749 | A | T |
| scaffold49652_468384_SNP | 468384 | C | T |
| scaffold49652_474262_SNP | 474262 | G | A |
| scaffold49652_481700_SNP | 481700 | T | A |
| scaffold49652_481980_SNP | 481980 | A | G |
| scaffold49652_482017_SNP | 482017 | T | A |
| scaffold49652_482729_SNP | 482729 | C | A |
| scaffold49652_483114_SNP | 483114 | T | C |
| scaffold49652_483134_SNP | 483134 | A | T |
| scaffold49652_483238_SNP | 483238 | C | G |
| scaffold49652_483844_SNP | 483844 | T | C |
| scaffold49652_488135_SNP | 488135 | T | C |
| scaffold49652_489130_SNP | 489130 | C | A |
| scaffold49652_489402_SNP | 489402 | A | G |
| scaffold49652_490245_SNP | 490245 | G | A |
| scaffold49652_490567_SNP | 490567 | C | G |
| scaffold49652_490679_SNP | 490679 | A | G |
| scaffold49652_490686_SNP | 490686 | G | A |
| scaffold49652_490712_SNP | 490712 | A | G |
| scaffold49652_499896_SNP | 499896 | C | A |
| scaffold49652_500864_SNP | 500864 | G | A |
| scaffold49652_503510_SNP | 503510 | G | C |
| scaffold49652_504360_SNP | 504360 | A | G |
| scaffold49652_505008_SNP | 505008 | C | T |
| scaffold49652_505051_SNP | 505051 | A | T |
| scaffold49652_510409_SNP | 510409 | T | A |
| scaffold49652_519990_SNP | 519990 | C | A |
| scaffold49652_523968_SNP | 523968 | T | C |
| scaffold49652_531222_SNP | 531222 | A | G |
| scaffold49652_540357_SNP | 540357 | T | A |
| scaffold49652_551070_SNP | 551070 | G | A |
| scaffold49652_559257_SNP | 559257 | C | T |
| scaffold49652_559979_SNP | 559979 | A | G |
| scaffold49652_561291_SNP | 561291 | A | G |
| scaffold49652_567130_SNP | 567130 | A | T |
| scaffold49652_570015_SNP | 570015 | G | A |
| scaffold49652_570373_SNP | 570373 | C | A |
| scaffold49652_582494_SNP | 582494 | A | T |
| scaffold49652_586011_SNP | 586011 | T | A |
| scaffold49652_586012_SNP | 586012 | T | A |
| scaffold49652_591947_SNP | 591947 | G | A |
| scaffold49652_592239_SNP | 592239 | A | T |
| scaffold49652_594778_SNP | 594778 | T | G |
| scaffold49652_596868_SNP | 596868 | G | T |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__599890__SNP | 599890 | T | C |
| scaffold49652__602894__SNP | 602894 | C | T |
| scaffold49652__608314__SNP | 608314 | A | T |
| scaffold49652__608649__SNP | 608649 | A | G |
| scaffold49652__609274__SNP | 609274 | C | G |
| scaffold49652__610620__SNP | 610620 | A | G |
| scaffold49652__610745__SNP | 610745 | G | A |
| scaffold49652__610785__SNP | 610785 | C | T |
| scaffold49652__610978__SNP | 610978 | A | G |
| scaffold49652__611812__SNP | 611812 | G | C |
| scaffold49652__612916__SNP | 612916 | A | T |
| scaffold49652__615662__SNP | 615662 | G | T |
| scaffold49652__615802__SNP | 615802 | T | A |
| scaffold49652__616179__SNP | 616179 | G | A |
| scaffold49652__619723__SNP | 619723 | A | G |
| scaffold49652__623226__SNP | 623226 | T | C |
| scaffold49652__623262__SNP | 623262 | G | A |
| scaffold49652__623316__SNP | 623316 | T | G |
| scaffold49652__623971__SNP | 623971 | A | G |
| scaffold49652__625797__SNP | 625797 | A | T |
| scaffold49652__626033__SNP | 626033 | C | G |
| scaffold49652__626576__SNP | 626576 | C | T |
| scaffold49652__636530__SNP | 636530 | T | C |
| scaffold49652__636591__SNP | 636591 | G | A |
| scaffold49652__640814__SNP | 640814 | T | A |
| scaffold49652__641023__SNP | 641023 | A | G |
| scaffold49652__642961__SNP | 642961 | C | G |
| scaffold49652__645742__SNP | 645742 | T | A |
| scaffold49652__649825__SNP | 649825 | G | A |
| scaffold49652__650622__SNP | 650622 | T | A |
| scaffold49652__650911__SNP | 650911 | G | A |
| scaffold49652__652582__SNP | 652582 | A | G |
| scaffold49652__653269__SNP | 653269 | A | T |
| scaffold49652__655875__SNP | 655875 | T | G |
| scaffold49652__655945__SNP | 655945 | A | G |
| scaffold49652__657235__SNP | 657235 | G | A |
| scaffold49652__657572__SNP | 657572 | C | T |
| scaffold49652__657890__SNP | 657890 | A | G |
| scaffold49652__660730__SNP | 660730 | A | T |
| scaffold49652__661085__SNP | 661085 | A | G |
| scaffold49652__661178__SNP | 661178 | A | T |
| scaffold49652__664050__SNP | 664050 | C | A |
| scaffold49652__671483__SNP | 671483 | A | G |
| scaffold49652__672897__SNP | 672897 | G | A |
| scaffold49652__675995__SNP | 675995 | A | G |
| scaffold49652__677013__SNP | 677013 | T | C |
| scaffold49652__677538__SNP | 677538 | C | T |
| scaffold49652__677686__SNP | 677686 | T | G |
| scaffold49652__677824__SNP | 677824 | G | A |
| scaffold49652__678252__SNP | 678252 | T | C |
| scaffold49652__678661__SNP | 678661 | G | A |
| scaffold49652__680010__SNP | 680010 | G | T |
| scaffold49652__680049__SNP | 680049 | C | A |
| scaffold49652__680102__SNP | 680102 | T | C |
| scaffold49652__681611__SNP | 681611 | C | T |
| scaffold49652__681834__SNP | 681834 | T | C |
| scaffold49652__683219__SNP | 683219 | A | C |
| scaffold49652__683499__SNP | 683499 | A | G |
| scaffold49652__685162__SNP | 685162 | A | T |
| scaffold49652__686427__SNP | 686427 | C | T |
| scaffold49652__686466__SNP | 686466 | G | A |
| scaffold49652__686575__SNP | 686575 | G | A |
| scaffold49652__690420__SNP | 690420 | G | A |
| scaffold49652__691001__SNP | 691001 | C | T |
| scaffold49652__691511__SNP | 691511 | G | A |
| scaffold49652__691562__SNP | 691562 | G | A |
| scaffold49652__694449__SNP | 694449 | T | G |
| scaffold49652__698078__SNP | 698078 | C | T |
| scaffold49652__698468__SNP | 698468 | C | T |
| scaffold49652__699891__SNP | 699891 | T | A |
| scaffold49652__701425__SNP | 701425 | C | T |
| scaffold49652__701847__SNP | 701847 | G | A |
| scaffold49652__702517__SNP | 702517 | T | G |
| scaffold49652__703686__SNP | 703686 | C | A |
| scaffold49652__704754__SNP | 704754 | T | A |
| scaffold49652__704765__SNP | 704765 | G | T |
| scaffold49652__707130__SNP | 707130 | C | A |
| scaffold49652__707457__SNP | 707457 | C | T |
| scaffold49652__708022__SNP | 708022 | C | T |
| scaffold49652__708235__SNP | 708235 | C | T |
| scaffold49652__711647__SNP | 711647 | C | G |
| scaffold49652__712665__SNP | 712665 | A | G |
| scaffold49652__718466__SNP | 718466 | T | G |
| scaffold49652__721386__SNP | 721386 | G | T |
| scaffold49652__722079__SNP | 722079 | G | A |
| scaffold49652__722931__SNP | 722931 | T | A |
| scaffold49652__724109__SNP | 724109 | C | A |
| scaffold49652__728106__SNP | 728106 | C | T |
| scaffold49652__729138__SNP | 729138 | A | T |
| scaffold49652__729202__SNP | 729202 | A | G |
| scaffold49652__731436__SNP | 731436 | C | G |
| scaffold49652__731484__SNP | 731484 | T | A |
| scaffold49652__731952__SNP | 731952 | C | T |
| scaffold49652__731997__SNP | 731997 | G | A |
| scaffold49652__732184__SNP | 732184 | C | T |
| scaffold49652__732236__SNP | 732236 | G | A |
| scaffold49652__732255__SNP | 732255 | T | C |
| scaffold49652__732256__SNP | 732256 | C | T |
| scaffold49652__732274__SNP | 732274 | A | G |
| scaffold49652__732285__SNP | 732285 | C | T |
| scaffold49652__732447__SNP | 732447 | T | C |
| scaffold49652__732546__SNP | 732546 | G | A |
| scaffold49652__732958__SNP | 732958 | T | C |
| scaffold49652__733147__SNP | 733147 | A | G |
| scaffold49652__733195__SNP | 733195 | C | A |
| scaffold49652__733199__SNP | 733199 | A | G |
| scaffold49652__733207__SNP | 733207 | A | G |
| scaffold49652__733321__SNP | 733321 | T | C |
| scaffold49652__733978__SNP | 733978 | A | G |
| scaffold49652__734856__SNP | 734856 | G | T |
| scaffold49652__735577__SNP | 735577 | C | T |
| scaffold49652__736430__SNP | 736430 | A | G |
| scaffold49652__737005__SNP | 737005 | C | T |
| scaffold49652__737576__SNP | 737576 | C | G |
| scaffold49652__740567__SNP | 740567 | C | T |
| scaffold49652__743622__SNP | 743622 | C | T |
| scaffold49652__748166__SNP | 748166 | T | A |
| scaffold49652__748594__SNP | 748594 | C | T |
| scaffold49652__762558__SNP | 762558 | T | C |
| scaffold49652__763277__SNP | 763277 | A | G |
| scaffold49652__767299__SNP | 767299 | G | T |
| scaffold49652__769480__SNP | 769480 | C | T |
| scaffold49652__769644__SNP | 769644 | A | G |
| scaffold49652__778065__SNP | 778065 | A | G |
| scaffold49652__780345__SNP | 780345 | T | A |
| scaffold49652__782788__SNP | 782788 | C | T |
| scaffold49652__783110__SNP | 783110 | C | T |
| scaffold49652__783990__SNP | 783990 | C | T |
| scaffold49652__787357__SNP | 787357 | T | C |
| scaffold49652__787629__SNP | 787629 | A | G |
| scaffold49652__790141__SNP | 790141 | G | A |
| scaffold49652__794383__SNP | 794383 | A | C |
| scaffold49652__794508__SNP | 794508 | G | A |
| scaffold49652__796408__SNP | 796408 | A | T |
| scaffold49652__796483__SNP | 796483 | C | T |
| scaffold49652__797153__SNP | 797153 | T | C |
| scaffold49652__797737__SNP | 797737 | A | T |
| scaffold49652__798218__SNP | 798218 | G | T |
| scaffold49652__798222__SNP | 798222 | T | A |
| scaffold49652__798260__SNP | 798260 | T | A |
| scaffold49652__800544__SNP | 800544 | T | C |
| scaffold49652__804203__SNP | 804203 | G | A |
| scaffold49652__805118__SNP | 805118 | T | C |
| scaffold49652__805150__SNP | 805150 | A | G |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__805244__SNP | 805244 | G | A |
| scaffold49652__805264__SNP | 805264 | T | C |
| scaffold49652__805452__SNP | 805452 | T | C |
| scaffold49652__805642__SNP | 805642 | G | A |
| scaffold49652__805649__SNP | 805649 | G | A |
| scaffold49652__805890__SNP | 805890 | T | G |
| scaffold49652__807572__SNP | 807572 | C | T |
| scaffold49652__807576__SNP | 807576 | G | T |
| scaffold49652__808401__SNP | 808401 | A | T |
| scaffold49652__809462__SNP | 809462 | T | C |
| scaffold49652__817467__SNP | 817467 | A | G |
| scaffold49652__818447__SNP | 818447 | G | A |
| scaffold49652__818500__SNP | 818500 | G | A |
| scaffold49652__820447__SNP | 820447 | G | A |
| scaffold49652__821025__SNP | 821025 | T | C |
| scaffold49652__821660__SNP | 821660 | T | C |
| scaffold49652__821725__SNP | 821725 | C | T |
| scaffold49652__821732__SNP | 821732 | T | C |
| scaffold49652__821777__SNP | 821777 | A | G |
| scaffold49652__821778__SNP | 821778 | G | A |
| scaffold49652__822296__SNP | 822296 | A | T |
| scaffold49652__822527__SNP | 822527 | C | A |
| scaffold49652__824023__SNP | 824023 | T | C |
| scaffold49652__824548__SNP | 824548 | C | T |
| scaffold49652__827798__SNP | 827798 | C | G |
| scaffold49652__832297__SNP | 832297 | T | A |
| scaffold49652__833104__SNP | 833104 | A | T |
| scaffold49652__833445__SNP | 833445 | A | G |
| scaffold49652__834051__SNP | 834051 | G | T |
| scaffold49652__840395__SNP | 840395 | G | A |
| scaffold49652__843919__SNP | 843919 | T | C |
| scaffold49652__844263__SNP | 844263 | T | G |
| scaffold49652__849536__SNP | 849536 | G | C |
| scaffold49652__853686__SNP | 853686 | G | A |
| scaffold49652__853931__SNP | 853931 | G | A |
| scaffold49652__854014__SNP | 854014 | T | C |
| scaffold49652__854088__SNP | 854088 | G | T |
| scaffold49652__855619__SNP | 855619 | T | C |
| scaffold49652__860176__SNP | 860176 | A | G |
| scaffold49652__860721__SNP | 860721 | C | T |
| scaffold49652__866753__SNP | 866753 | T | C |
| scaffold49652__868488__SNP | 868488 | T | A |
| scaffold49652__875802__SNP | 875802 | G | C |
| scaffold49652__876164__SNP | 876164 | A | G |
| scaffold49652__879195__SNP | 879195 | T | C |
| scaffold49652__879309__SNP | 879309 | A | G |
| scaffold49652__881100__SNP | 881100 | G | A |
| scaffold49652__881391__SNP | 881391 | C | T |
| scaffold49652__882276__SNP | 882276 | C | T |
| scaffold49652__883184__SNP | 883184 | G | A |
| scaffold49652__883722__SNP | 883722 | A | T |
| scaffold49652__883731__SNP | 883731 | A | T |
| scaffold49652__883732__SNP | 883732 | T | C |
| scaffold49652__883744__SNP | 883744 | G | A |
| scaffold49652__883848__SNP | 883848 | G | A |
| scaffold49652__883854__SNP | 883854 | T | C |
| scaffold49652__883889__SNP | 883889 | G | A |
| scaffold49652__884086__SNP | 884086 | C | A |
| scaffold49652__884823__SNP | 884823 | C | G |
| scaffold49652__885116__SNP | 885116 | T | G |
| scaffold49652__885850__SNP | 885850 | A | G |
| scaffold49652__885852__SNP | 885852 | G | C |
| scaffold49652__885862__SNP | 885862 | A | G |
| scaffold49652__886294__SNP | 886294 | G | C |
| scaffold49652__886462__SNP | 886462 | C | T |
| scaffold49652__886996__SNP | 886996 | G | A |
| scaffold49652__887437__SNP | 887437 | A | T |
| scaffold49652__888216__SNP | 888216 | G | A |
| scaffold49652__888454__SNP | 888454 | A | G |
| scaffold49652__888727__SNP | 888727 | T | A |
| scaffold49652__889850__SNP | 889850 | T | A |
| scaffold49652__891032__SNP | 891032 | G | C |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__892594__SNP | 892594 | A | G |
| scaffold49652__893679__SNP | 893679 | G | A |
| scaffold49652__893906__SNP | 893906 | G | A |
| scaffold49652__896197__SNP | 896197 | G | A |
| scaffold49652__897517__SNP | 897517 | A | C |
| scaffold49652__897932__SNP | 897932 | G | C |
| scaffold49652__898111__SNP | 898111 | C | A |
| scaffold49652__898112__SNP | 898112 | G | A |
| scaffold49652__898655__SNP | 898655 | T | C |
| scaffold49652__898950__SNP | 898950 | T | C |
| scaffold49652__899021__SNP | 899021 | G | A |
| scaffold49652__899148__SNP | 899148 | A | G |
| scaffold49652__899227__SNP | 899227 | G | T |
| scaffold49652__899335__SNP | 899335 | A | T |
| scaffold49652__899543__SNP | 899543 | T | G |
| scaffold49652__899625__SNP | 899625 | G | T |
| scaffold49652__900624__SNP | 900624 | C | T |
| scaffold49652__901177__SNP | 901177 | G | A |
| scaffold49652__901340__SNP | 901340 | T | C |
| scaffold49652__902549__SNP | 902549 | C | A |
| scaffold49652__903454__SNP | 903454 | T | C |
| scaffold49652__905830__SNP | 905830 | C | T |
| scaffold49652__905860__SNP | 905860 | G | A |
| scaffold49652__906056__SNP | 906056 | T | A |
| scaffold49652__906604__SNP | 906604 | A | G |
| scaffold49652__908695__SNP | 908695 | C | T |
| scaffold49652__909403__SNP | 909403 | C | T |
| scaffold49652__911183__SNP | 911183 | T | C |
| scaffold49652__911607__SNP | 911607 | A | G |
| scaffold49652__911780__SNP | 911780 | T | C |
| scaffold49652__920299__SNP | 920299 | A | G |
| scaffold49652__923770__SNP | 923770 | C | A |
| scaffold49652__924722__SNP | 924722 | G | A |
| scaffold49652__926562__SNP | 926562 | A | T |
| scaffold49652__927214__SNP | 927214 | G | A |
| scaffold49652__943083__SNP | 943083 | T | G |
| scaffold49652__948039__SNP | 948039 | G | A |
| scaffold49652__950135__SNP | 950135 | C | T |
| scaffold49652__951616__SNP | 951616 | C | A |
| scaffold49652__957995__SNP | 957995 | C | T |
| scaffold49652__958508__SNP | 958508 | A | C |
| scaffold49652__967938__SNP | 967938 | C | A |
| scaffold49652__968437__SNP | 968437 | T | C |
| scaffold49652__974414__SNP | 974414 | C | A |
| scaffold49652__979062__SNP | 979062 | C | T |
| scaffold49652__981337__SNP | 981337 | G | A |
| scaffold49652__982834__SNP | 982834 | G | A |
| scaffold49652__998825__SNP | 998825 | T | G |
| scaffold49652__1012367__SNP | 1012367 | A | T |
| scaffold49652__1019615__SNP | 1019615 | T | C |
| scaffold49652__1025554__SNP | 1025554 | A | G |
| scaffold49652__1026033__SNP | 1026033 | A | G |
| scaffold49652__1033935__SNP | 1033935 | G | A |
| scaffold49652__1035086__SNP | 1035086 | A | G |
| scaffold49652__1039213__SNP | 1039213 | T | A |
| scaffold49652__1040045__SNP | 1040045 | A | C |
| scaffold49652__1050328__SNP | 1050328 | C | T |
| scaffold49652__1060132__SNP | 1060132 | A | T |
| scaffold49652__1065677__SNP | 1065677 | G | A |
| scaffold49652__1065813__SNP | 1065813 | G | A |
| scaffold49652__1068136__SNP | 1068136 | T | C |
| scaffold49652__1077026__SNP | 1077026 | G | C |
| scaffold49652__1079091__SNP | 1079091 | A | G |
| scaffold49652__1089823__SNP | 1089823 | T | C |
| scaffold49652__1090444__SNP | 1090444 | A | G |
| scaffold49652__1091054__SNP | 1091054 | T | C |
| scaffold49652__1094373__SNP | 1094373 | G | T |
| scaffold49652__1094567__SNP | 1094567 | T | A |
| scaffold49652__1095586__SNP | 1095586 | G | T |
| scaffold49652__1096330__SNP | 1096330 | C | G |
| scaffold49652__1096345__SNP | 1096345 | C | T |
| scaffold49652__1097283__SNP | 1097283 | T | A |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__1098183__SNP | 1098183 | T | C |
| scaffold49652__1098188__SNP | 1098188 | T | C |
| scaffold49652__1098428__SNP | 1098428 | G | A |
| scaffold49652__1098776__SNP | 1098776 | G | A |
| scaffold49652__1098789__SNP | 1098789 | G | A |
| scaffold49652__1099064__SNP | 1099064 | G | C |
| scaffold49652__1099104__SNP | 1099104 | A | G |
| scaffold49652__1099204__SNP | 1099204 | C | G |
| scaffold49652__1099381__SNP | 1099381 | C | A |
| scaffold49652__1101177__SNP | 1101177 | G | A |
| scaffold49652__1105870__SNP | 1105870 | G | A |
| scaffold49652__1106259__SNP | 1106259 | T | C |
| scaffold49652__1106268__SNP | 1106268 | T | G |
| scaffold49652__1107450__SNP | 1107450 | A | T |
| scaffold49652__1111008__SNP | 1111008 | C | A |
| scaffold49652__1113214__SNP | 1113214 | T | G |
| scaffold49652__1115505__SNP | 1115505 | C | T |
| scaffold49652__1115579__SNP | 1115579 | G | A |
| scaffold49652__1117895__SNP | 1117895 | C | A |
| scaffold49652__1118621__SNP | 1118621 | A | G |
| scaffold49652__1119640__SNP | 1119640 | A | G |
| scaffold49652__1120313__SNP | 1120313 | T | C |
| scaffold49652__1120591__SNP | 1120591 | G | A |
| scaffold49652__1120734__SNP | 1120734 | T | C |
| scaffold49652__1120836__SNP | 1120836 | G | A |
| scaffold49652__1121086__SNP | 1121086 | A | G |
| scaffold49652__1121309__SNP | 1121309 | T | C |
| scaffold49652__1122559__SNP | 1122559 | A | T |
| scaffold49652__1123165__SNP | 1123165 | A | C |
| scaffold49652__1124824__SNP | 1124824 | A | G |
| scaffold49652__1125027__SNP | 1125027 | C | G |
| scaffold49652__1125210__SNP | 1125210 | T | C |
| scaffold49652__1125225__SNP | 1125225 | T | C |
| scaffold49652__1125331__SNP | 1125331 | A | G |
| scaffold49652__1125495__SNP | 1125495 | C | T |
| scaffold49652__1125680__SNP | 1125680 | C | G |
| scaffold49652__1126353__SNP | 1126353 | T | A |
| scaffold49652__1126379__SNP | 1126379 | A | T |
| scaffold49652__1126987__SNP | 1126987 | G | T |
| scaffold49652__1128639__SNP | 1128639 | T | G |
| scaffold49652__1130083__SNP | 1130083 | A | T |
| scaffold49652__1132532__SNP | 1132532 | T | C |
| scaffold49652__1133562__SNP | 1133562 | C | A |
| scaffold49652__1138025__SNP | 1138025 | A | G |
| scaffold49652__1138114__SNP | 1138114 | A | G |
| scaffold49652__1138128__SNP | 1138128 | T | C |
| scaffold49652__1138158__SNP | 1138158 | C | A |
| scaffold49652__1138340__SNP | 1138340 | A | C |
| scaffold49652__1138444__SNP | 1138444 | A | T |
| scaffold49652__1138486__SNP | 1138486 | G | T |
| scaffold49652__1138569__SNP | 1138569 | C | T |
| scaffold49652__1138892__SNP | 1138892 | G | A |
| scaffold49652__1138915__SNP | 1138915 | T | C |
| scaffold49652__1138942__SNP | 1138942 | T | G |
| scaffold49652__1138948__SNP | 1138948 | A | G |
| scaffold49652__1138972__SNP | 1138972 | T | C |
| scaffold49652__1143904__SNP | 1143904 | T | A |
| scaffold49652__1145401__SNP | 1145401 | G | A |
| scaffold49652__1145644__SNP | 1145644 | A | G |
| scaffold49652__1147593__SNP | 1147593 | T | C |
| scaffold49652__1149884__SNP | 1149884 | T | G |
| scaffold49652__1156135__SNP | 1156135 | C | T |
| scaffold49652__1156749__SNP | 1156749 | T | A |
| scaffold49652__1160712__SNP | 1160712 | T | C |
| scaffold49652__1161165__SNP | 1161165 | A | G |
| scaffold49652__1161234__SNP | 1161234 | A | C |
| scaffold49652__1161762__SNP | 1161762 | C | A |
| scaffold49652__1161951__SNP | 1161951 | C | T |
| scaffold49652__1161984__SNP | 1161984 | C | T |
| scaffold49652__1161994__SNP | 1161994 | C | T |
| scaffold49652__1162010__SNP | 1162010 | T | C |
| scaffold49652__1162087__SNP | 1162087 | T | A |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__1162117__SNP | 1162117 | C | T |
| scaffold49652__1163148__SNP | 1163148 | G | A |
| scaffold49652__1163858__SNP | 1163858 | C | T |
| scaffold49652__1165241__SNP | 1165241 | A | G |
| scaffold49652__1165983__SNP | 1165983 | G | A |
| scaffold49652__1166553__SNP | 1166553 | T | G |
| scaffold49652__1167905__SNP | 1167905 | G | A |
| scaffold49652__1168063__SNP | 1168063 | G | C |
| scaffold49652__1168123__SNP | 1168123 | C | G |
| scaffold49652__1168144__SNP | 1168144 | G | A |
| scaffold49652__1168354__SNP | 1168354 | G | A |
| scaffold49652__1168382__SNP | 1168382 | A | G |
| scaffold49652__1168402__SNP | 1168402 | C | T |
| scaffold49652__1168415__SNP | 1168415 | C | G |
| scaffold49652__1168591__SNP | 1168591 | A | G |
| scaffold49652__1168598__SNP | 1168598 | T | C |
| scaffold49652__1168676__SNP | 1168676 | A | G |
| scaffold49652__1173678__SNP | 1173678 | C | T |
| scaffold49652__1174439__SNP | 1174439 | G | A |
| scaffold49652__1174739__SNP | 1174739 | T | C |
| scaffold49652__1174886__SNP | 1174886 | G | C |
| scaffold49652__1174957__SNP | 1174957 | T | C |
| scaffold49652__1175137__SNP | 1175137 | T | C |
| scaffold49652__1176562__SNP | 1176562 | T | C |
| scaffold49652__1176601__SNP | 1176601 | A | G |
| scaffold49652__1176744__SNP | 1176744 | A | G |
| scaffold49652__1176824__SNP | 1176824 | T | C |
| scaffold49652__1176918__SNP | 1176918 | T | A |
| scaffold49652__1177011__SNP | 1177011 | T | C |
| scaffold49652__1177564__SNP | 1177564 | C | T |
| scaffold49652__1178504__SNP | 1178504 | G | C |
| scaffold49652__1178688__SNP | 1178688 | G | A |
| scaffold49652__1178845__SNP | 1178845 | T | C |
| scaffold49652__1180897__SNP | 1180897 | G | C |
| scaffold49652__1181191__SNP | 1181191 | C | A |
| scaffold49652__1182912__SNP | 1182912 | A | T |
| scaffold49652__1185115__SNP | 1185115 | A | T |
| scaffold49652__1185149__SNP | 1185149 | G | A |
| scaffold49652__1185173__SNP | 1185173 | T | C |
| scaffold49652__1185483__SNP | 1185483 | A | G |
| scaffold49652__1185495__SNP | 1185495 | A | G |
| scaffold49652__1185519__SNP | 1185519 | C | T |
| scaffold49652__1185550__SNP | 1185550 | C | T |
| scaffold49652__1186445__SNP | 1186445 | T | A |
| scaffold49652__1187282__SNP | 1187282 | T | C |
| scaffold49652__1187782__SNP | 1187782 | C | T |
| scaffold49652__1187807__SNP | 1187807 | G | C |
| scaffold49652__1187833__SNP | 1187833 | A | G |
| scaffold49652__1187867__SNP | 1187867 | C | T |
| scaffold49652__1189518__SNP | 1189518 | A | G |
| scaffold49652__1195840__SNP | 1195840 | C | A |
| scaffold49652__1197189__SNP | 1197189 | G | A |
| scaffold49652__1197456__SNP | 1197456 | A | G |
| scaffold49652__1197501__SNP | 1197501 | T | G |
| scaffold49652__1198166__SNP | 1198166 | A | G |
| scaffold49652__1198222__SNP | 1198222 | A | C |
| scaffold49652__1198541__SNP | 1198541 | A | T |
| scaffold49652__1198622__SNP | 1198622 | A | T |
| scaffold49652__1198980__SNP | 1198980 | C | T |
| scaffold49652__1199022__SNP | 1199022 | T | C |
| scaffold49652__1199906__SNP | 1199906 | A | C |
| scaffold49652__1200447__SNP | 1200447 | A | G |
| scaffold49652__1201288__SNP | 1201288 | T | C |
| scaffold49652__1201696__SNP | 1201696 | C | T |
| scaffold49652__1201765__SNP | 1201765 | T | G |
| scaffold49652__1202166__SNP | 1202166 | C | T |
| scaffold49652__1202941__SNP | 1202941 | T | G |
| scaffold49652__1203263__SNP | 1203263 | C | T |
| scaffold49652__1203989__SNP | 1203989 | G | A |
| scaffold49652__1204064__SNP | 1204064 | G | A |
| scaffold49652__1204476__SNP | 1204476 | T | C |
| scaffold49652__1204977__SNP | 1204977 | A | T |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__1205446__SNP | 1205446 | A | G |
| scaffold49652__1205510__SNP | 1205510 | A | G |
| scaffold49652__1205721__SNP | 1205721 | A | G |
| scaffold49652__1205762__SNP | 1205762 | T | A |
| scaffold49652__1205797__SNP | 1205797 | A | C |
| scaffold49652__1205865__SNP | 1205865 | T | A |
| scaffold49652__1205903__SNP | 1205903 | A | G |
| scaffold49652__1206037__SNP | 1206037 | T | G |
| scaffold49652__1206135__SNP | 1206135 | A | T |
| scaffold49652__1206148__SNP | 1206148 | T | C |
| scaffold49652__1206150__SNP | 1206150 | A | T |
| scaffold49652__1206333__SNP | 1206333 | A | G |
| scaffold49652__1206709__SNP | 1206709 | A | G |
| scaffold49652__1207012__SNP | 1207012 | G | A |
| scaffold49652__1207348__SNP | 1207348 | A | G |
| scaffold49652__1207374__SNP | 1207374 | C | A |
| scaffold49652__1207430__SNP | 1207430 | T | A |
| scaffold49652__1207492__SNP | 1207492 | G | A |
| scaffold49652__1207513__SNP | 1207513 | C | T |
| scaffold49652__1209506__SNP | 1209506 | G | C |
| scaffold49652__1209518__SNP | 1209518 | T | C |
| scaffold49652__1209544__SNP | 1209544 | A | G |
| scaffold49652__1211198__SNP | 1211198 | T | C |
| scaffold49652__1211200__SNP | 1211200 | T | A |
| scaffold49652__1213512__SNP | 1213512 | T | C |
| scaffold49652__1214402__SNP | 1214402 | G | A |
| scaffold49652__1215784__SNP | 1215784 | T | A |
| scaffold49652__1216069__SNP | 1216069 | G | A |
| scaffold49652__1217956__SNP | 1217956 | T | C |
| scaffold49652__1219424__SNP | 1219424 | G | A |
| scaffold49652__1220232__SNP | 1220232 | A | G |
| scaffold49652__1220233__SNP | 1220233 | C | T |
| scaffold49652__1221995__SNP | 1221995 | C | T |
| scaffold49652__1222469__SNP | 1222469 | T | C |
| scaffold49652__1222668__SNP | 1222668 | T | C |
| scaffold49652__1224176__SNP | 1224176 | A | G |
| scaffold49652__1225431__SNP | 1225431 | A | C |
| scaffold49652__1227822__SNP | 1227822 | G | T |
| scaffold49652__1229006__SNP | 1229006 | G | A |
| scaffold49652__1229064__SNP | 1229064 | T | C |
| scaffold49652__1229326__SNP | 1229326 | C | G |
| scaffold49652__1231604__SNP | 1231604 | T | C |
| scaffold49652__1232591__SNP | 1232591 | G | C |
| scaffold49652__1233258__SNP | 1233258 | T | C |
| scaffold49652__1233269__SNP | 1233269 | G | A |
| scaffold49652__1233617__SNP | 1233617 | G | A |
| scaffold49652__1233633__SNP | 1233633 | T | C |
| scaffold49652__1234922__SNP | 1234922 | A | C |
| scaffold49652__1235646__SNP | 1235646 | T | C |
| scaffold49652__1242212__SNP | 1242212 | T | G |
| scaffold49652__1245007__SNP | 1245007 | C | T |
| scaffold49652__1245040__SNP | 1245040 | A | G |
| scaffold49652__1247417__SNP | 1247417 | A | T |
| scaffold49652__1248388__SNP | 1248388 | A | C |
| scaffold49652__1249563__SNP | 1249563 | C | T |
| scaffold49652__1249616__SNP | 1249616 | G | A |
| scaffold49652__1249760__SNP | 1249760 | G | A |
| scaffold49652__1249992__SNP | 1249992 | G | A |
| scaffold49652__1253370__SNP | 1253370 | T | G |
| scaffold49652__1254006__SNP | 1254006 | C | T |
| scaffold49652__1257900__SNP | 1257900 | A | G |
| scaffold49652__1260621__SNP | 1260621 | G | C |
| scaffold49652__1260771__SNP | 1260771 | T | C |
| scaffold49652__1261627__SNP | 1261627 | A | T |
| scaffold49652__1261954__SNP | 1261954 | C | A |
| scaffold49652__1262618__SNP | 1262618 | A | C |
| scaffold49652__1262670__SNP | 1262670 | G | C |
| scaffold49652__1263002__SNP | 1263002 | T | C |
| scaffold49652__1263917__SNP | 1263917 | T | C |
| scaffold49652__1263984__SNP | 1263984 | G | T |
| scaffold49652__1265551__SNP | 1265551 | G | C |
| scaffold49652__1266148__SNP | 1266148 | A | G |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__1266149__SNP | 1266149 | G | A |
| scaffold49652__1266165__SNP | 1266165 | T | C |
| scaffold49652__1266173__SNP | 1266173 | G | A |
| scaffold49652__1266252__SNP | 1266252 | T | C |
| scaffold49652__1267716__SNP | 1267716 | T | C |
| scaffold49652__1268719__SNP | 1268719 | T | A |
| scaffold49652__1269754__SNP | 1269754 | A | G |
| scaffold49652__1272386__SNP | 1272386 | C | G |
| scaffold49652__1274965__SNP | 1274965 | C | T |
| scaffold49652__1275187__SNP | 1275187 | G | C |
| scaffold49652__1275978__SNP | 1275978 | G | A |
| scaffold49652__1276158__SNP | 1276158 | A | G |
| scaffold49652__1285645__SNP | 1285645 | C | T |
| scaffold49652__1285703__SNP | 1285703 | G | A |
| scaffold49652__1287076__SNP | 1287076 | T | A |
| scaffold49652__1287285__SNP | 1287285 | A | G |
| scaffold49652__1287342__SNP | 1287342 | C | T |
| scaffold49652__1288020__SNP | 1288020 | A | G |
| scaffold49652__1288039__SNP | 1288039 | C | A |
| scaffold49652__1288110__SNP | 1288110 | G | A |
| scaffold49652__1288261__SNP | 1288261 | G | T |
| scaffold49652__1288298__SNP | 1288298 | A | G |
| scaffold49652__1288817__SNP | 1288817 | T | C |
| scaffold49652__1289315__SNP | 1289315 | A | G |
| scaffold49652__1289365__SNP | 1289365 | A | G |
| scaffold49652__1290541__SNP | 1290541 | C | A |
| scaffold49652__1290877__SNP | 1290877 | C | T |
| scaffold49652__1292092__SNP | 1292092 | G | T |
| scaffold49652__1296215__SNP | 1296215 | T | G |
| scaffold49652__1300497__SNP | 1300497 | A | C |
| scaffold49652__1301168__SNP | 1301168 | T | G |
| scaffold49652__1301459__SNP | 1301459 | G | T |
| scaffold49652__1304023__SNP | 1304023 | T | C |
| scaffold49652__1304442__SNP | 1304442 | T | A |
| scaffold49652__1305544__SNP | 1305544 | G | A |
| scaffold49652__1305909__SNP | 1305909 | T | C |
| scaffold49652__1307320__SNP | 1307320 | A | G |
| scaffold49652__1308573__SNP | 1308573 | T | G |
| scaffold49652__1309111__SNP | 1309111 | A | T |
| scaffold49652__1309910__SNP | 1309910 | A | G |
| scaffold49652__1310627__SNP | 1310627 | A | G |
| scaffold49652__1311366__SNP | 1311366 | A | G |
| scaffold49652__1311661__SNP | 1311661 | G | C |
| scaffold49652__1312620__SNP | 1312620 | G | A |
| scaffold49652__1312688__SNP | 1312688 | A | T |
| scaffold49652__1314839__SNP | 1314839 | G | A |
| scaffold49652__1318161__SNP | 1318161 | G | A |
| scaffold49652__1319905__SNP | 1319905 | T | A |
| scaffold49652__1319927__SNP | 1319927 | A | T |
| scaffold49652__1325373__SNP | 1325373 | A | G |
| scaffold49652__1327039__SNP | 1327039 | C | A |
| scaffold49652__1327125__SNP | 1327125 | G | A |
| scaffold49652__1330359__SNP | 1330359 | C | T |
| scaffold49652__1330510__SNP | 1330510 | G | A |
| scaffold49652__1330691__SNP | 1330691 | C | T |
| scaffold49652__1331569__SNP | 1331569 | G | A |
| scaffold49652__1337671__SNP | 1337671 | A | C |
| scaffold49652__1338851__SNP | 1338851 | T | C |
| scaffold49652__1342039__SNP | 1342039 | T | C |
| scaffold49652__1349150__SNP | 1349150 | T | G |
| scaffold49652__1349305__SNP | 1349305 | C | G |
| scaffold49652__1349459__SNP | 1349459 | G | A |
| scaffold49652__1350228__SNP | 1350228 | C | A |
| scaffold49652__1350475__SNP | 1350475 | A | T |
| scaffold49652__1350767__SNP | 1350767 | A | G |
| scaffold49652__1350817__SNP | 1350817 | G | A |
| scaffold49652__1351683__SNP | 1351683 | C | T |
| scaffold49652__1351871__SNP | 1351871 | T | C |
| scaffold49652__1353291__SNP | 1353291 | C | T |
| scaffold49652__1355147__SNP | 1355147 | A | C |
| scaffold49652__1355187__SNP | 1355187 | A | G |
| scaffold49652__1355230__SNP | 1355230 | T | C |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652_1355250_SNP | 1355250 | A | G |
| scaffold49652_1355677_SNP | 1355677 | T | A |
| scaffold49652_1356300_SNP | 1356300 | T | C |
| scaffold49652_1356305_SNP | 1356305 | G | A |
| scaffold49652_1356320_SNP | 1356320 | G | C |
| scaffold49652_1359144_SNP | 1359144 | T | A |
| scaffold49652_1359155_SNP | 1359155 | A | T |
| scaffold49652_1360507_SNP | 1360507 | A | G |
| scaffold49652_1360522_SNP | 1360522 | C | T |
| scaffold49652_1360564_SNP | 1360564 | A | G |
| scaffold49652_1360872_SNP | 1360872 | C | T |
| scaffold49652_1370489_SNP | 1370489 | A | G |
| scaffold49652_1370564_SNP | 1370564 | A | G |
| scaffold49652_1372158_SNP | 1372158 | G | C |
| scaffold49652_1372159_SNP | 1372159 | T | C |
| scaffold49652_1373213_SNP | 1373213 | C | A |
| scaffold49652_1377409_SNP | 1377409 | T | C |
| scaffold49652_1378219_SNP | 1378219 | A | C |
| scaffold49652_1379478_SNP | 1379478 | A | G |
| scaffold49652_1379538_SNP | 1379538 | T | A |
| scaffold49652_1380960_SNP | 1380960 | T | C |
| scaffold49652_1381295_SNP | 1381295 | G | A |
| scaffold49652_1381522_SNP | 1381522 | G | A |
| scaffold49652_1381720_SNP | 1381720 | G | A |
| scaffold49652_1382796_SNP | 1382796 | A | G |
| scaffold49652_1384076_SNP | 1384076 | C | T |
| scaffold49652_1384083_SNP | 1384083 | C | T |
| scaffold49652_1384210_SNP | 1384210 | G | A |
| scaffold49652_1384225_SNP | 1384225 | T | C |
| scaffold49652_1384233_SNP | 1384233 | A | G |
| scaffold49652_1384646_SNP | 1384646 | C | G |
| scaffold49652_1386487_SNP | 1386487 | C | T |
| scaffold49652_1387398_SNP | 1387398 | T | C |
| scaffold49652_1388592_SNP | 1388592 | T | C |
| scaffold49652_1389373_SNP | 1389373 | A | G |
| scaffold49652_1390362_SNP | 1390362 | C | T |
| scaffold49652_1390399_SNP | 1390399 | C | A |
| scaffold49652_1391282_SNP | 1391282 | G | T |
| scaffold49652_1391283_SNP | 1391283 | G | T |
| scaffold49652_1391328_SNP | 1391328 | A | G |
| scaffold49652_1391432_SNP | 1391432 | G | A |
| scaffold49652_1392482_SNP | 1392482 | T | G |
| scaffold49652_1393382_SNP | 1393382 | A | G |
| scaffold49652_1394841_SNP | 1394841 | A | G |
| scaffold49652_1395450_SNP | 1395450 | C | A |
| scaffold49652_1396427_SNP | 1396427 | G | T |
| scaffold49652_1397384_SNP | 1397384 | G | C |
| scaffold49652_1397840_SNP | 1397840 | C | T |
| scaffold49652_1398988_SNP | 1398988 | G | T |
| scaffold49652_1398997_SNP | 1398997 | A | C |
| scaffold49652_1400236_SNP | 1400236 | T | C |
| scaffold49652_1406135_SNP | 1406135 | C | T |
| scaffold49652_1406929_SNP | 1406929 | T | C |
| scaffold49652_1406970_SNP | 1406970 | G | A |
| scaffold49652_1412574_SNP | 1412574 | G | A |
| scaffold49652_1412984_SNP | 1412984 | A | G |
| scaffold49652_1413190_SNP | 1413190 | T | G |
| scaffold49652_1413578_SNP | 1413578 | T | A |
| scaffold49652_1414567_SNP | 1414567 | T | A |
| scaffold49652_1414947_SNP | 1414947 | T | A |
| scaffold49652_1415171_SNP | 1415171 | A | G |
| scaffold49652_1420459_SNP | 1420459 | G | A |
| scaffold49652_1425012_SNP | 1425012 | A | G |
| scaffold49652_1425787_SNP | 1425787 | A | T |
| scaffold49652_1427691_SNP | 1427691 | A | T |
| scaffold49652_1439691_SNP | 1439691 | G | T |
| scaffold49652_1441763_SNP | 1441763 | A | T |
| scaffold49652_1446012_SNP | 1446012 | T | A |
| scaffold49652_1448318_SNP | 1448318 | G | A |
| scaffold49652_1452330_SNP | 1452330 | T | C |
| scaffold49652_1455958_SNP | 1455958 | A | G |
| scaffold49652_1458870_SNP | 1458870 | T | A |
| scaffold49652_1459287_SNP | 1459287 | C | A |
| scaffold49652_1464696_SNP | 1464696 | C | T |
| scaffold49652_1473688_SNP | 1473688 | C | A |
| scaffold49652_1477682_SNP | 1477682 | A | C |
| scaffold49652_1482016_SNP | 1482016 | G | A |
| scaffold49652_1484394_SNP | 1484394 | G | A |
| scaffold49652_1484736_SNP | 1484736 | A | T |
| scaffold49652_1486437_SNP | 1486437 | T | A |
| scaffold49652_1486718_SNP | 1486718 | A | G |
| scaffold49652_1487392_SNP | 1487392 | A | C |
| scaffold49652_1490346_SNP | 1490346 | A | G |
| scaffold49652_1490664_SNP | 1490664 | A | T |
| scaffold49652_1497465_SNP | 1497465 | G | A |
| scaffold49652_1498098_SNP | 1498098 | A | G |
| scaffold49652_1498277_SNP | 1498277 | G | A |
| scaffold49652_1498726_SNP | 1498726 | A | C |
| scaffold49652_1498730_SNP | 1498730 | G | A |
| scaffold49652_1498784_SNP | 1498784 | C | T |
| scaffold49652_1499589_SNP | 1499589 | T | C |
| scaffold49652_1499694_SNP | 1499694 | C | A |
| scaffold49652_1499831_SNP | 1499831 | T | C |
| scaffold49652_1499964_SNP | 1499964 | G | C |
| scaffold49652_1500119_SNP | 1500119 | C | T |
| scaffold49652_1500300_SNP | 1500300 | G | A |
| scaffold49652_1500589_SNP | 1500589 | C | T |
| scaffold49652_1500834_SNP | 1500834 | G | A |
| scaffold49652_1501563_SNP | 1501563 | G | C |
| scaffold49652_1501587_SNP | 1501587 | A | C |
| scaffold49652_1501646_SNP | 1501646 | C | T |
| scaffold49652_1502068_SNP | 1502068 | T | G |
| scaffold49652_1502597_SNP | 1502597 | A | G |
| scaffold49652_1502635_SNP | 1502635 | C | A |
| scaffold49652_1503077_SNP | 1503077 | C | A |
| scaffold49652_1503219_SNP | 1503219 | G | A |
| scaffold49652_1503270_SNP | 1503270 | T | C |
| scaffold49652_1503416_SNP | 1503416 | G | T |
| scaffold49652_1503427_SNP | 1503427 | T | C |
| scaffold49652_1503442_SNP | 1503442 | C | A |
| scaffold49652_1503443_SNP | 1503443 | G | A |
| scaffold49652_1503849_SNP | 1503849 | A | C |
| scaffold49652_1504038_SNP | 1504038 | A | G |
| scaffold49652_1504047_SNP | 1504047 | C | G |
| scaffold49652_1504065_SNP | 1504065 | G | A |
| scaffold49652_1504101_SNP | 1504101 | C | T |
| scaffold49652_1504276_SNP | 1504276 | G | C |
| scaffold49652_1504328_SNP | 1504328 | A | C |
| scaffold49652_1504542_SNP | 1504542 | C | T |
| scaffold49652_1504575_SNP | 1504575 | A | T |
| scaffold49652_1504595_SNP | 1504595 | T | C |
| scaffold49652_1504723_SNP | 1504723 | T | G |
| scaffold49652_1505015_SNP | 1505015 | A | T |
| scaffold49652_1505026_SNP | 1505026 | G | A |
| scaffold49652_1505111_SNP | 1505111 | T | A |
| scaffold49652_1505201_SNP | 1505201 | G | A |
| scaffold49652_1505243_SNP | 1505243 | G | A |
| scaffold49652_1506602_SNP | 1506602 | G | C |
| scaffold49652_1506823_SNP | 1506823 | C | T |
| scaffold49652_1506945_SNP | 1506945 | C | T |
| scaffold49652_1507115_SNP | 1507115 | A | C |
| scaffold49652_1507459_SNP | 1507459 | A | G |
| scaffold49652_1508337_SNP | 1508337 | A | C |
| scaffold49652_1508384_SNP | 1508384 | C | A |
| scaffold49652_1508840_SNP | 1508840 | G | A |
| scaffold49652_1509261_SNP | 1509261 | C | T |
| scaffold49652_1509579_SNP | 1509579 | T | A |
| scaffold49652_1509633_SNP | 1509633 | A | G |
| scaffold49652_1509837_SNP | 1509837 | A | C |
| scaffold49652_1509840_SNP | 1509840 | T | C |
| scaffold49652_1510029_SNP | 1510029 | G | T |
| scaffold49652_1510081_SNP | 1510081 | G | A |
| scaffold49652_1510310_SNP | 1510310 | G | A |
| scaffold49652_1510352_SNP | 1510352 | A | G |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__1510865__SNP | 1510865 | C | T |
| scaffold49652__1511280__SNP | 1511280 | T | C |
| scaffold49652__1511395__SNP | 1511395 | T | C |
| scaffold49652__1511421__SNP | 1511421 | C | A |
| scaffold49652__1511424__SNP | 1511424 | A | T |
| scaffold49652__1511426__SNP | 1511426 | C | T |
| scaffold49652__1511469__SNP | 1511469 | C | T |
| scaffold49652__1511592__SNP | 1511592 | T | A |
| scaffold49652__1511657__SNP | 1511657 | T | G |
| scaffold49652__1511748__SNP | 1511748 | G | C |
| scaffold49652__1511995__SNP | 1511995 | C | A |
| scaffold49652__1512321__SNP | 1512321 | T | G |
| scaffold49652__1512638__SNP | 1512638 | A | G |
| scaffold49652__1512709__SNP | 1512709 | C | T |
| scaffold49652__1519579__SNP | 1519579 | T | C |
| scaffold49652__1525812__SNP | 1525812 | G | T |
| scaffold49652__1526777__SNP | 1526777 | T | C |
| scaffold49652__1527451__SNP | 1527451 | A | C |
| scaffold49652__1527474__SNP | 1527474 | T | C |
| scaffold49652__1527528__SNP | 1527528 | A | G |
| scaffold49652__1527697__SNP | 1527697 | G | C |
| scaffold49652__1529671__SNP | 1529671 | G | A |
| scaffold49652__1529889__SNP | 1529889 | C | A |
| scaffold49652__1529893__SNP | 1529893 | G | T |
| scaffold49652__1530108__SNP | 1530108 | A | C |
| scaffold49652__1532466__SNP | 1532466 | T | C |
| scaffold49652__1533033__SNP | 1533033 | C | T |
| scaffold49652__1533101__SNP | 1533101 | T | A |
| scaffold49652__1533473__SNP | 1533473 | G | C |
| scaffold49652__1533647__SNP | 1533647 | A | C |
| scaffold49652__1533653__SNP | 1533653 | T | C |
| scaffold49652__1533761__SNP | 1533761 | G | A |
| scaffold49652__1533817__SNP | 1533817 | T | C |
| scaffold49652__1533820__SNP | 1533820 | G | T |
| scaffold49652__1533913__SNP | 1533913 | C | T |
| scaffold49652__1533992__SNP | 1533992 | A | T |
| scaffold49652__1534122__SNP | 1534122 | C | T |
| scaffold49652__1534370__SNP | 1534370 | G | A |
| scaffold49652__1534594__SNP | 1534594 | G | T |
| scaffold49652__1534861__SNP | 1534861 | C | T |
| scaffold49652__1534901__SNP | 1534901 | T | C |
| scaffold49652__1534951__SNP | 1534951 | T | G |
| scaffold49652__1534973__SNP | 1534973 | T | C |
| scaffold49652__1535397__SNP | 1535397 | T | A |
| scaffold49652__1535471__SNP | 1535471 | A | G |
| scaffold49652__1535713__SNP | 1535713 | G | C |
| scaffold49652__1535759__SNP | 1535759 | G | T |
| scaffold49652__1535787__SNP | 1535787 | T | C |
| scaffold49652__1536164__SNP | 1536164 | T | A |
| scaffold49652__1536203__SNP | 1536203 | C | T |
| scaffold49652__1536208__SNP | 1536208 | C | T |
| scaffold49652__1536258__SNP | 1536258 | A | G |
| scaffold49652__1536492__SNP | 1536492 | T | A |
| scaffold49652__1536668__SNP | 1536668 | G | T |
| scaffold49652__1536874__SNP | 1536874 | C | G |
| scaffold49652__1536947__SNP | 1536947 | G | A |
| scaffold49652__1537026__SNP | 1537026 | T | C |
| scaffold49652__1537049__SNP | 1537049 | G | T |
| scaffold49652__1537209__SNP | 1537209 | C | T |
| scaffold49652__1537396__SNP | 1537396 | C | T |
| scaffold49652__1537400__SNP | 1537400 | A | G |
| scaffold49652__1537466__SNP | 1537466 | G | A |
| scaffold49652__1537469__SNP | 1537469 | A | G |
| scaffold49652__1537508__SNP | 1537508 | T | C |
| scaffold49652__1537761__SNP | 1537761 | A | C |
| scaffold49652__1537782__SNP | 1537782 | G | T |
| scaffold49652__1538460__SNP | 1538460 | T | A |
| scaffold49652__1538522__SNP | 1538522 | G | A |
| scaffold49652__1539298__SNP | 1539298 | T | C |
| scaffold49652__1539596__SNP | 1539596 | G | A |
| scaffold49652__1539844__SNP | 1539844 | A | G |
| scaffold49652__1539846__SNP | 1539846 | T | C |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__1540106__SNP | 1540106 | C | T |
| scaffold49652__1540355__SNP | 1540355 | T | A |
| scaffold49652__1540361__SNP | 1540361 | T | C |
| scaffold49652__1542105__SNP | 1542105 | G | T |
| scaffold49652__1542192__SNP | 1542192 | A | G |
| scaffold49652__1542903__SNP | 1542903 | T | C |
| scaffold49652__1542948__SNP | 1542948 | G | A |
| scaffold49652__1542985__SNP | 1542985 | A | G |
| scaffold49652__1543326__SNP | 1543326 | G | A |
| scaffold49652__1543480__SNP | 1543480 | T | C |
| scaffold49652__1543521__SNP | 1543521 | T | C |
| scaffold49652__1543573__SNP | 1543573 | G | A |
| scaffold49652__1544029__SNP | 1544029 | G | T |
| scaffold49652__1544098__SNP | 1544098 | G | A |
| scaffold49652__1544113__SNP | 1544113 | C | T |
| scaffold49652__1544156__SNP | 1544156 | C | T |
| scaffold49652__1544767__SNP | 1544767 | A | G |
| scaffold49652__1544768__SNP | 1544768 | C | A |
| scaffold49652__1545344__SNP | 1545344 | T | C |
| scaffold49652__1545580__SNP | 1545580 | C | T |
| scaffold49652__1545677__SNP | 1545677 | G | C |
| scaffold49652__1546183__SNP | 1546183 | T | G |
| scaffold49652__1546253__SNP | 1546253 | G | C |
| scaffold49652__1547303__SNP | 1547303 | G | T |
| scaffold49652__1549454__SNP | 1549454 | G | C |
| scaffold49652__1550953__SNP | 1550953 | G | T |
| scaffold49652__1551454__SNP | 1551454 | G | T |
| scaffold49652__1551466__SNP | 1551466 | C | G |
| scaffold49652__1551516__SNP | 1551516 | C | T |
| scaffold49652__1551524__SNP | 1551524 | T | C |
| scaffold49652__1551889__SNP | 1551889 | T | C |
| scaffold49652__1551893__SNP | 1551893 | A | T |
| scaffold49652__1552041__SNP | 1552041 | A | C |
| scaffold49652__1552920__SNP | 1552920 | G | C |
| scaffold49652__1553019__SNP | 1553019 | A | T |
| scaffold49652__1553020__SNP | 1553020 | C | T |
| scaffold49652__1553247__SNP | 1553247 | G | A |
| scaffold49652__1553264__SNP | 1553264 | A | C |
| scaffold49652__1553305__SNP | 1553305 | T | C |
| scaffold49652__1553323__SNP | 1553323 | C | G |
| scaffold49652__1553641__SNP | 1553641 | C | G |
| scaffold49652__1554381__SNP | 1554381 | A | G |
| scaffold49652__1554522__SNP | 1554522 | A | C |
| scaffold49652__1555756__SNP | 1555756 | C | A |
| scaffold49652__1555802__SNP | 1555802 | A | G |
| scaffold49652__1556023__SNP | 1556023 | A | T |
| scaffold49652__1556301__SNP | 1556301 | T | C |
| scaffold49652__1556314__SNP | 1556314 | G | A |
| scaffold49652__1556354__SNP | 1556354 | G | A |
| scaffold49652__1556356__SNP | 1556356 | C | T |
| scaffold49652__1556398__SNP | 1556398 | C | T |
| scaffold49652__1556825__SNP | 1556825 | C | G |
| scaffold49652__1557388__SNP | 1557388 | T | C |
| scaffold49652__1557402__SNP | 1557402 | A | C |
| scaffold49652__1557403__SNP | 1557403 | G | T |
| scaffold49652__1558327__SNP | 1558327 | G | A |
| scaffold49652__1558999__SNP | 1558999 | C | T |
| scaffold49652__1559045__SNP | 1559045 | T | G |
| scaffold49652__1559075__SNP | 1559075 | T | A |
| scaffold49652__1559076__SNP | 1559076 | T | A |
| scaffold49652__1559133__SNP | 1559133 | T | C |
| scaffold49652__1561075__SNP | 1561075 | A | G |
| scaffold49652__1563948__SNP | 1563948 | C | T |
| scaffold49652__1563987__SNP | 1563987 | G | A |
| scaffold49652__1564295__SNP | 1564295 | G | A |
| scaffold49652__1564405__SNP | 1564405 | G | T |
| scaffold49652__1564547__SNP | 1564547 | A | G |
| scaffold49652__1564651__SNP | 1564651 | C | G |
| scaffold49652__1564876__SNP | 1564876 | A | C |
| scaffold49652__1565656__SNP | 1565656 | G | A |
| scaffold49652__1566960__SNP | 1566960 | G | A |
| scaffold49652__1568459__SNP | 1568459 | G | A |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652__1568469__SNP | 1568469 | T | C |
| scaffold49652__1568476__SNP | 1568476 | G | A |
| scaffold49652__1568909__SNP | 1568909 | T | C |
| scaffold49652__1569191__SNP | 1569191 | A | G |
| scaffold49652__1569222__SNP | 1569222 | C | T |
| scaffold49652__1569352__SNP | 1569352 | G | A |
| scaffold49652__1569521__SNP | 1569521 | C | T |
| scaffold49652__1569522__SNP | 1569522 | C | T |
| scaffold49652__1569581__SNP | 1569581 | C | T |
| scaffold49652__1569654__SNP | 1569654 | T | G |
| scaffold49652__1569941__SNP | 1569941 | G | T |
| scaffold49652__1569964__SNP | 1569964 | G | A |
| scaffold49652__1570030__SNP | 1570030 | A | G |
| scaffold49652__1570384__SNP | 1570384 | T | A |
| scaffold49652__1570684__SNP | 1570684 | T | G |
| scaffold49652__1570738__SNP | 1570738 | G | A |
| scaffold49652__1571106__SNP | 1571106 | C | A |
| scaffold49652__1571967__SNP | 1571967 | T | C |
| scaffold49652__1572221__SNP | 1572221 | C | A |
| scaffold49652__1572383__SNP | 1572383 | T | A |
| scaffold49652__1572517__SNP | 1572517 | G | A |
| scaffold49652__1573983__SNP | 1573983 | C | A |
| scaffold49652__1574213__SNP | 1574213 | T | C |
| scaffold49652__1574333__SNP | 1574333 | G | A |
| scaffold49652__1574676__SNP | 1574676 | G | A |
| scaffold49652__1574783__SNP | 1574783 | G | T |
| scaffold49652__1574817__SNP | 1574817 | T | C |
| scaffold49652__1574821__SNP | 1574821 | A | T |
| scaffold49652__1576691__SNP | 1576691 | G | A |
| scaffold49652__1578153__SNP | 1578153 | T | C |
| scaffold49652__1578410__SNP | 1578410 | T | A |
| scaffold49652__1579480__SNP | 1579480 | G | A |
| scaffold49652__1580162__SNP | 1580162 | G | A |
| scaffold49652__1585124__SNP | 1585124 | G | A |
| scaffold49652__1591552__SNP | 1591552 | G | C |
| scaffold49652__1593734__SNP | 1593734 | T | A |
| scaffold49652__1593979__SNP | 1593979 | G | A |
| scaffold49652__1594860__SNP | 1594860 | A | G |
| scaffold49652__1595032__SNP | 1595032 | C | T |
| scaffold49652__1596156__SNP | 1596156 | T | C |
| scaffold49652__1598089__SNP | 1598089 | C | A |
| scaffold49652__1598664__SNP | 1598664 | T | C |
| scaffold49652__1600217__SNP | 1600217 | G | C |
| scaffold49652__1600861__SNP | 1600861 | T | G |
| scaffold49652__1601108__SNP | 1601108 | A | G |
| scaffold49652__1606896__SNP | 1606896 | G | A |
| scaffold49652__1606901__SNP | 1606901 | A | C |
| scaffold49652__1606946__SNP | 1606946 | A | T |
| scaffold49652__1607051__SNP | 1607051 | C | T |
| scaffold49652__1607970__SNP | 1607970 | A | T |
| scaffold49652__1608931__SNP | 1608931 | C | T |
| scaffold49652__1611052__SNP | 1611052 | C | G |
| scaffold49652__1611319__SNP | 1611319 | T | C |
| scaffold49652__1611324__SNP | 1611324 | G | T |
| scaffold49652__1611669__SNP | 1611669 | T | C |
| scaffold49652__1612160__SNP | 1612160 | G | A |
| scaffold49652__1612262__SNP | 1612262 | A | G |
| scaffold49652__1612278__SNP | 1612278 | T | G |
| scaffold49652__1612872__SNP | 1612872 | A | G |
| scaffold49652__1613879__SNP | 1613879 | C | T |
| scaffold49652__1614448__SNP | 1614448 | G | A |
| scaffold49652__1614630__SNP | 1614630 | A | G |
| scaffold49652__1615422__SNP | 1615422 | T | C |
| scaffold49652__1615483__SNP | 1615483 | C | A |
| scaffold49652__1615540__SNP | 1615540 | T | C |
| scaffold49652__1615851__SNP | 1615851 | T | C |
| scaffold49652__1615852__SNP | 1615852 | G | A |
| scaffold49652__1616125__SNP | 1616125 | G | A |
| scaffold49652__1616178__SNP | 1616178 | A | G |
| scaffold49652__1616195__SNP | 1616195 | A | G |
| scaffold49652__1616403__SNP | 1616403 | G | A |
| scaffold49652__1617007__SNP | 1617007 | T | G |
| scaffold49652__1617865__SNP | 1617865 | G | C |
| scaffold49652__1618890__SNP | 1618890 | A | C |
| scaffold49652__1618892__SNP | 1618892 | T | A |
| scaffold49652__1619290__SNP | 1619290 | A | G |
| scaffold49652__1619574__SNP | 1619574 | C | A |
| scaffold49652__1619632__SNP | 1619632 | T | G |
| scaffold49652__1619917__SNP | 1619917 | G | A |
| scaffold49652__1621408__SNP | 1621408 | A | G |
| scaffold49652__1621878__SNP | 1621878 | G | A |
| scaffold49652__1622798__SNP | 1622798 | A | G |
| scaffold49652__1622821__SNP | 1622821 | C | T |
| scaffold49652__1626988__SNP | 1626988 | G | A |
| scaffold49652__1627444__SNP | 1627444 | G | A |
| scaffold49652__1627969__SNP | 1627969 | G | A |
| scaffold49652__1628615__SNP | 1628615 | C | T |
| scaffold49652__1630497__SNP | 1630497 | C | G |
| scaffold49652__1631111__SNP | 1631111 | C | G |
| scaffold49652__1631190__SNP | 1631190 | G | C |
| scaffold49652__1631597__SNP | 1631597 | C | G |
| scaffold49652__1632497__SNP | 1632497 | A | G |
| scaffold49652__1633787__SNP | 1633787 | A | G |
| scaffold49652__1635028__SNP | 1635028 | A | C |
| scaffold49652__1635345__SNP | 1635345 | A | T |
| scaffold49652__1636124__SNP | 1636124 | A | G |
| scaffold49652__1637672__SNP | 1637672 | A | G |
| scaffold49652__1637924__SNP | 1637924 | C | T |
| scaffold49652__1638248__SNP | 1638248 | C | A |
| scaffold49652__1638634__SNP | 1638634 | A | G |
| scaffold49652__1639333__SNP | 1639333 | C | G |
| scaffold49652__1639344__SNP | 1639344 | A | T |
| scaffold49652__1640567__SNP | 1640567 | T | A |
| scaffold49652__1640589__SNP | 1640589 | C | T |
| scaffold49652__1641369__SNP | 1641369 | T | A |
| scaffold49652__1642436__SNP | 1642436 | T | C |
| scaffold49652__1642517__SNP | 1642517 | A | G |
| scaffold49652__1642930__SNP | 1642930 | G | T |
| scaffold49652__1645749__SNP | 1645749 | G | A |
| scaffold49652__1645778__SNP | 1645778 | G | A |
| scaffold49652__1646272__SNP | 1646272 | T | C |
| scaffold49652__1648632__SNP | 1648632 | C | T |
| scaffold49652__1650650__SNP | 1650650 | C | T |
| scaffold49652__1653321__SNP | 1653321 | C | T |
| scaffold49652__1653395__SNP | 1653395 | T | G |
| scaffold49652__1653923__SNP | 1653923 | T | A |
| scaffold49652__1654022__SNP | 1654022 | T | C |
| scaffold49652__1654024__SNP | 1654024 | C | T |
| scaffold49652__1654082__SNP | 1654082 | C | A |
| scaffold49652__1654121__SNP | 1654121 | A | G |
| scaffold49652__1657071__SNP | 1657071 | C | T |
| scaffold49652__1657306__SNP | 1657306 | A | G |
| scaffold49652__1657419__SNP | 1657419 | C | G |
| scaffold49652__1659632__SNP | 1659632 | T | C |
| scaffold49652__1659667__SNP | 1659667 | C | T |
| scaffold49652__1660987__SNP | 1660987 | G | T |
| scaffold49652__1662158__SNP | 1662158 | G | C |
| scaffold49652__1668419__SNP | 1668419 | C | T |
| scaffold49652__1673502__SNP | 1673502 | G | T |
| scaffold49652__1683393__SNP | 1683393 | T | C |
| scaffold49652__1691712__SNP | 1691712 | G | A |
| scaffold49652__1706511__SNP | 1706511 | G | C |
| scaffold49652__1706512__SNP | 1706512 | G | A |
| scaffold49652__1708631__SNP | 1708631 | C | T |
| scaffold49652__1714596__SNP | 1714596 | G | A |
| scaffold49652__1715039__SNP | 1715039 | T | C |
| scaffold49652__1717036__SNP | 1717036 | G | A |
| scaffold49652__1724262__SNP | 1724262 | A | C |
| scaffold49652__1726873__SNP | 1726873 | T | A |
| scaffold49652__1728573__SNP | 1728573 | T | C |
| scaffold49652__1729370__SNP | 1729370 | G | A |
| scaffold49652__1731936__SNP | 1731936 | A | G |
| scaffold49652__1731965__SNP | 1731965 | A | G |
| scaffold49652__1733030__SNP | 1733030 | C | T |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652_1733331_SNP | 1733331 | G | A |
| scaffold49652_1733615_SNP | 1733615 | C | T |
| scaffold49652_1744444_SNP | 1744444 | G | A |
| scaffold49652_1744567_SNP | 1744567 | G | T |
| scaffold49652_1749854_SNP | 1749854 | G | A |
| scaffold49652_1752330_SNP | 1752330 | T | A |
| scaffold49652_1760004_SNP | 1760004 | C | T |
| scaffold49652_1764534_SNP | 1764534 | A | G |
| scaffold49652_1781766_SNP | 1781766 | G | C |
| scaffold49652_1781798_SNP | 1781798 | C | G |
| scaffold49652_1782420_SNP | 1782420 | A | C |
| scaffold49652_1784250_SNP | 1784250 | A | G |
| scaffold49652_1790651_SNP | 1790651 | T | G |
| scaffold49652_1801261_SNP | 1801261 | C | T |
| scaffold49652_1803941_SNP | 1803941 | G | A |
| scaffold49652_1817041_SNP | 1817041 | T | A |
| scaffold49652_1823072_SNP | 1823072 | T | C |
| scaffold49652_1830747_SNP | 1830747 | T | C |
| scaffold49652_1833496_SNP | 1833496 | A | G |
| scaffold49652_1834606_SNP | 1834606 | G | A |
| scaffold49652_1837409_SNP | 1837409 | A | G |
| scaffold49652_1843144_SNP | 1843144 | A | G |
| scaffold49652_1846505_SNP | 1846505 | G | A |
| scaffold49652_1846953_SNP | 1846953 | T | C |
| scaffold49652_1846990_SNP | 1846990 | A | C |
| scaffold49652_1847290_SNP | 1847290 | A | G |
| scaffold49652_1848210_SNP | 1848210 | T | C |
| scaffold49652_1848375_SNP | 1848375 | G | T |
| scaffold49652_1848606_SNP | 1848606 | C | A |
| scaffold49652_1850004_SNP | 1850004 | T | C |
| scaffold49652_1850077_SNP | 1850077 | A | G |
| scaffold49652_1851455_SNP | 1851455 | T | C |
| scaffold49652_1853986_SNP | 1853986 | T | C |
| scaffold49652_1854890_SNP | 1854890 | T | G |
| scaffold49652_1858706_SNP | 1858706 | G | T |
| scaffold49652_1859460_SNP | 1859460 | G | A |
| scaffold49652_1861379_SNP | 1861379 | A | C |
| scaffold49652_1861990_SNP | 1861990 | T | C |
| scaffold49652_1862056_SNP | 1862056 | G | C |
| scaffold49652_1862087_SNP | 1862087 | C | A |
| scaffold49652_1880564_SNP | 1880564 | T | C |
| scaffold49652_1882681_SNP | 1882681 | A | T |
| scaffold49652_1884227_SNP | 1884227 | G | A |
| scaffold49652_1889340_SNP | 1889340 | C | A |
| scaffold49652_1894466_SNP | 1894466 | A | C |
| scaffold49652_1894728_SNP | 1894728 | A | G |
| scaffold49652_1895837_SNP | 1895837 | C | T |
| scaffold49652_1896550_SNP | 1896550 | T | G |
| scaffold49652_1897010_SNP | 1897010 | C | T |
| scaffold49652_1899601_SNP | 1899601 | T | A |
| scaffold49652_1914992_SNP | 1914992 | T | A |
| scaffold49652_1929057_SNP | 1929057 | G | A |
| scaffold49652_1947534_SNP | 1947534 | A | T |
| scaffold49652_1950635_SNP | 1950635 | G | A |
| scaffold49652_1952814_SNP | 1952814 | C | T |
| scaffold49652_1952944_SNP | 1952944 | A | G |
| scaffold49652_1955067_SNP | 1955067 | G | T |
| scaffold49652_1955972_SNP | 1955972 | A | C |
| scaffold49652_1957208_SNP | 1957208 | T | G |
| scaffold49652_1957376_SNP | 1957376 | A | G |
| scaffold49652_1957591_SNP | 1957591 | C | T |
| scaffold49652_1957619_SNP | 1957619 | T | C |
| scaffold49652_1957630_SNP | 1957630 | G | T |
| scaffold49652_1969812_SNP | 1969812 | A | C |
| scaffold49652_1970984_SNP | 1970984 | T | C |
| scaffold49652_1973861_SNP | 1973861 | T | C |
| scaffold49652_1975056_SNP | 1975056 | T | G |
| scaffold49652_1993051_SNP | 1993051 | A | G |
| scaffold49652_1994772_SNP | 1994772 | G | A |
| scaffold49652_1994940_SNP | 1994940 | A | G |
| scaffold49652_1995121_SNP | 1995121 | G | A |
| scaffold49652_1996301_SNP | 1996301 | A | G |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652_1996348_SNP | 1996348 | A | G |
| scaffold49652_2002224_SNP | 2002224 | T | G |
| scaffold49652_2002613_SNP | 2002613 | C | A |
| scaffold49652_2007617_SNP | 2007617 | T | C |
| scaffold49652_2010119_SNP | 2010119 | A | G |
| scaffold49652_2010941_SNP | 2010941 | G | A |
| scaffold49652_2012896_SNP | 2012896 | C | T |
| scaffold49652_2019626_SNP | 2019626 | T | C |
| scaffold49652_2020758_SNP | 2020758 | C | T |
| scaffold49652_2021039_SNP | 2021039 | T | C |
| scaffold49652_2021994_SNP | 2021994 | C | T |
| scaffold49652_2031624_SNP | 2031624 | G | T |
| scaffold49652_2059291_SNP | 2059291 | G | A |
| scaffold49652_2064077_SNP | 2064077 | C | T |
| scaffold49652_2068668_SNP | 2068668 | T | C |
| scaffold49652_2075781_SNP | 2075781 | C | T |
| scaffold49652_2076365_SNP | 2076365 | C | T |
| scaffold49652_2076469_SNP | 2076469 | T | C |
| scaffold49652_2092527_SNP | 2092527 | T | C |
| scaffold49652_2092549_SNP | 2092549 | T | C |
| scaffold49652_2092809_SNP | 2092809 | C | G |
| scaffold49652_2094093_SNP | 2094093 | C | A |
| scaffold49652_2105568_SNP | 2105568 | A | G |
| scaffold49652_2115691_SNP | 2115691 | T | A |
| scaffold49652_2125447_SNP | 2125447 | C | T |
| scaffold49652_2126155_SNP | 2126155 | G | A |
| scaffold49652_2133188_SNP | 2133188 | T | C |
| scaffold49652_2138716_SNP | 2138716 | T | C |
| scaffold49652_2138774_SNP | 2138774 | T | C |
| scaffold49652_2156405_SNP | 2156405 | G | C |
| scaffold49652_2161240_SNP | 2161240 | C | T |
| scaffold49652_2178581_SNP | 2178581 | C | G |
| scaffold49652_2185469_SNP | 2185469 | A | T |
| scaffold49652_2187968_SNP | 2187968 | T | C |
| scaffold49652_2188098_SNP | 2188098 | T | C |
| scaffold49652_2188172_SNP | 2188172 | C | T |
| scaffold49652_2188805_SNP | 2188805 | G | C |
| scaffold49652_2198605_SNP | 2198605 | G | A |
| scaffold49652_2201366_SNP | 2201366 | A | C |
| scaffold49652_2216007_SNP | 2216007 | C | T |
| scaffold49652_2216622_SNP | 2216622 | G | A |
| scaffold49652_2227103_SNP | 2227103 | T | G |
| scaffold49652_2252002_SNP | 2252002 | A | C |
| scaffold49652_2267719_SNP | 2267719 | G | T |
| scaffold49652_2267778_SNP | 2267778 | G | C |
| scaffold49652_2275369_SNP | 2275369 | A | T |
| scaffold49652_2278763_SNP | 2278763 | A | G |
| scaffold49652_2284434_SNP | 2284434 | G | T |
| scaffold49652_2289155_SNP | 2289155 | G | A |
| scaffold49652_2293585_SNP | 2293585 | G | A |
| scaffold49652_2295350_SNP | 2295350 | A | G |
| scaffold49652_2319323_SNP | 2319323 | A | T |
| scaffold49652_2319892_SNP | 2319892 | A | G |
| scaffold49652_2340651_SNP | 2340651 | G | C |
| scaffold49652_2342022_SNP | 2342022 | G | T |
| scaffold49652_2350721_SNP | 2350721 | C | A |
| scaffold49652_2353391_SNP | 2353391 | T | G |
| scaffold49652_2368805_SNP | 2368805 | A | G |
| scaffold49652_2380689_SNP | 2380689 | T | C |
| scaffold49652_2380714_SNP | 2380714 | A | C |
| scaffold49652_2382130_SNP | 2382130 | T | C |
| scaffold49652_2383282_SNP | 2383282 | C | T |
| scaffold49652_2383554_SNP | 2383554 | T | C |
| scaffold49652_2384963_SNP | 2384963 | C | T |
| scaffold49652_2387325_SNP | 2387325 | C | T |
| scaffold49652_2387645_SNP | 2387645 | G | A |
| scaffold49652_2388437_SNP | 2388437 | A | C |
| scaffold49652_2400554_SNP | 2400554 | T | G |
| scaffold49652_2402164_SNP | 2402164 | T | C |
| scaffold49652_2405435_SNP | 2405435 | A | G |
| scaffold49652_2409799_SNP | 2409799 | C | T |
| scaffold49652_2410701_SNP | 2410701 | C | T |

TABLE 2-continued

SNP Positions within SEQ ID NO: 2 that are associated with increased resistance to ASR

| SNP Name | Position | Favorable Allele (Rust Resistant) | Unfavorable Allele (Rust Susceptible) |
|---|---|---|---|
| scaffold49652_2415748_SNP | 2415748 | A | G |
| scaffold49652_2415764_SNP | 2415764 | T | C |
| scaffold49652_2422192_SNP | 2422192 | T | G |
| scaffold49652_2442690_SNP | 2442690 | A | G |
| scaffold49652_2444153_SNP | 2444153 | A | C |
| scaffold49652_2458358_SNP | 2458358 | G | T |
| scaffold49652_2460701_SNP | 2460701 | G | C |
| scaffold49652_2471976_SNP | 2471976 | T | A |
| scaffold49652_2475982_SNP | 2475982 | G | C |
| scaffold49652_2476211_SNP | 2476211 | A | C |
| scaffold49652_2483904_SNP | 2483904 | C | A |
| scaffold49652_2492670_SNP | 2492670 | G | T |
| scaffold49652_2492681_SNP | 2492681 | C | T |
| scaffold49652_2503387_SNP | 2503387 | A | G |
| scaffold49652_2512568_SNP | 2512568 | C | A |
| scaffold49652_2513576_SNP | 2513576 | C | A |

TABLE 3

SNP Positions within SEQ ID NO: 3 that are associated with increased resistance to ASR

| SNP Name | Position | Favorable Allele (Rust Resistant) | Unfavorable Allele (Rust Susceptible) |
|---|---|---|---|
| 002687F_347209_SNP\|\|S_164680479 | 347209 | C | T |
| 002687F_205199_SNP\|\|S_164660488 | 205199 | A | C |
| 002687F_219471_SNP\|\|S_164662254 | 219471 | A | T |
| 002687F_219766_SNP\|\|S_164662304 | 219766 | A | C |
| 002687F_342670_SNP\|\|S_164679830 | 342670 | T | A |
| 002687F_347216_SNP\|\|S_164680481 | 347216 | C | T |
| 002687F_214317_SNP\|\|S_164661625 | 214317 | G | T |
| 002687F_214627_SNP\|\|S_164661653 | 214627 | T | A |
| 002687F_214883_SNP\|\|S_164661676 | 214883 | T | C |
| 002687F_223183_SNP\|\|S_164662750 | 223183 | C | T |
| 002687F_224184_SNP\|\|S_164662864 | 224184 | T | G |
| 002687F_224879_SNP\|\|S_164662947 | 224879 | T | C |
| 002687F_347638_SNP\|\|S_164680535 | 347638 | G | A |
| 002687F_213909_SNP\|\|S_164661595 | 213909 | C | A |
| 002687F_342685_SNP\|\|S_164679832 | 342685 | A | C |
| 002687F_355543_SNP\|\|S_164681678 | 355543 | G | A |
| 002687F_220657_SNP\|\|S_164662418 | 220657 | A | G |
| 002687F_208869_SNP\|\|S_164661018 | 208869 | G | A |
| 002687F_220760_SNP\|\|S_164662425 | 220760 | C | A |
| 002687F_221002_SNP\|\|S_164662446 | 221002 | G | A |
| 002687F_279573_SNP\|\|S_164670418 | 279573 | C | G |
| 002687F_215594_SNP\|\|S_164661771 | 215594 | T | C |
| 002687F_236335_SNP\|\|S_164664304 | 236335 | T | C |
| 002687F_213017_SNP\|\|S_164661504 | 213017 | T | G |
| 002687F_220051_SNP\|\|S_164662335 | 220051 | A | T |
| 002687F_4944_SNP\|\|S_164619728 | 4944 | T | C |
| 002687F_343869_SNP\|\|S_164679986 | 343869 | T | A |
| 002687F_227603_SNP\|\|S_164663273 | 227603 | A | G |
| 002687F_200922_SNP\|\|S_164659943 | 200922 | C | T |
| 002687F_202410_SNP\|\|S_164660103 | 202410 | T | C |
| 002687F_257232_SNP\|\|S_164667413 | 257232 | C | T |
| 002687F_258539_SNP\|\|S_164667602 | 258539 | A | C |
| 002687F_264907_SNP\|\|S_164668587 | 264907 | T | A |
| 002687F_265651_SNP\|\|S_164668676 | 265651 | C | T |
| 002687F_271932_SNP\|\|S_164669551 | 271932 | T | C |
| 002687F_283205_SNP\|\|S_164670839 | 283205 | C | T |
| 002687F_204093_SNP\|\|S_164660340 | 204093 | C | T |
| 002687F_210615_SNP | 210615 | T | C |
| 002687F_237462_SNP\|\|S_164664507 | 237462 | T | A |
| 002687F_244322_SNP\|\|S_164665473 | 244322 | G | C |
| 002687F_262053_SNP\|\|S_164668143 | 262053 | C | T |
| 002687F_236247_SNP\|\|S_164664292 | 236247 | C | T |
| 002687F_236323_SNP\|\|S_164664301 | 236323 | T | C |
| 002687F_154489_SNP\|\|S_164653160 | 154489 | A | G |
| 002687F_233977_SNP\|\|S_164664019 | 233977 | A | G |
| 002687F_257999_SNP\|\|S_164667512 | 257999 | G | A |
| 002687F_279277_SNP\|\|S_164670387 | 279277 | A | G |
| 002687F_282755_SNP\|\|S_164670788 | 282755 | G | A |
| 002687F_283768_SNP\|\|S_164670937 | 283768 | T | C |
| 002687F_302554_SNP\|\|S_164673590 | 302554 | A | G |
| 002687F_164869_SNP\|\|S_164655174 | 164869 | T | G |

TABLE 3-continued

| SNP Name | Position | Favorable Allele (Rust Resistant) | Unfavorable Allele (Rust Susceptible) |
|---|---|---|---|
| SNP Positions within SEQ ID NO: 3 that are associated with increased resistance to ASR | | | |
| 002687F_288304_SNP\|\|S_164671605 | 288304 | T | G |
| 002687F_294526_SNP\|\|S_164672282 | 294526 | T | G |
| 002687F_309973_SNP\|\|S_164674519 | 309973 | G | T |
| 002687F_337382_SNP\|\|S_164679163 | 337382 | G | A |
| 002687F_211731_SNP\|\|S_164661365 | 211731 | C | T |
| 002687F_220577_SNP\|\|S_164662407 | 220577 | G | A |
| 002687F_237097_SNP\|\|S_164664465 | 237097 | T | C |
| 002687F_266479_SNP\|\|S_164668817 | 266479 | C | A |
| 002687F_271386_SNP\|\|S_164669455 | 271386 | T | G |
| 002687F_273756_SNP\|\|S_164669758 | 273756 | C | T |
| 002687F_273817_SNP\|\|S_164669764 | 273817 | T | C |
| 002687F_276363_SNP\|\|S_164670071 | 276363 | G | A |
| 002687F_298340_SNP\|\|S_164672831 | 298340 | G | A |
| 002687F_238876_SNP\|\|S_164664664 | 238876 | T | A |
| 002687F_239424_SNP\|\|S_164664741 | 239424 | A | G |
| 002687F_256831_SNP\|\|S_164667336 | 256831 | G | A |
| 002687F_259186_SNP\|\|S_164667703 | 259186 | A | G |
| 002687F_275640_SNP\|\|S_164669976 | 275640 | G | A |
| 002687F_277720_SNP\|\|S_164670211 | 277720 | T | C |
| 002687F_279232_SNP\|\|S_164670381 | 279232 | C | T |
| 002687F_263744_SNP\|\|S_164668442 | 263744 | T | A |
| 002687F_304142_SNP\|\|S_164673806 | 304142 | A | G |
| 002687F_281179_SNP\|\|S_164670589 | 281179 | G | A |
| 002687F_236591_SNP\|\|S_164664403 | 236591 | G | A |
| 002687F_297512_SNP\|\|S_164672702 | 297512 | A | T |
| 002687F_305090_SNP\|\|S_164673953 | 305090 | T | A |
| 002687F_224674_SNP\|\|S_164662923 | 224674 | A | G |
| 002687F_275330_SNP\|\|S_164669940 | 275330 | A | G |
| 002687F_304685_SNP | 304685 | T | G |
| 002687F_319681_SNP | 319681 | T | C |
| 002687F_353495_SNP | 353495 | C | T |
| 002687F_52497_SNP\|\|S_164627583 | 52497 | T | C |
| 002687F_268767_SNP | 268767 | G | C |
| 002687F_278674_SNP | 278674 | A | G |
| 002687F_302719_SNP | 302719 | T | C |
| 002687F_343777_SNP | 343777 | T | C |
| 002687F_168567_SNP\|\|S_164655687 | 168567 | A | T |
| 002687F_325074_SNP\|\|S_164677221 | 325074 | T | G |
| 002687F_325106_SNP\|\|S_164677230 | 325106 | T | C |
| 002687F_333863_SNP | 333863 | A | G |
| 002687F_195487_SNP | 195487 | A | T |
| 002687F_228040_SNP\|\|S_164663308 | 228040 | T | A |
| 002687F_244345_SNP | 244345 | T | A |
| 002687F_278494_SNP\|\|S_164670290 | 278494 | A | G |
| 002687F_349619_SNP | 349619 | C | T |
| 002687F_198468_SNP | 198468 | G | T |
| 002687F_224844_SNP | 224844 | A | G |
| 002687F_224922_SNP | 224922 | A | G |
| 002687F_275515_SNP | 275515 | T | A |
| 002687F_292027_SNP | 292027 | T | A |
| 002687F_346308_SNP | 346308 | T | C |
| 002687F_362288_SNP | 362288 | A | C |
| 002687F_185377_SNP | 185377 | G | A |
| 002687F_220542_SNP | 220542 | G | A |
| 002687F_223788_SNP | 223788 | A | T |
| 002687F_343709_SNP | 343709 | T | C |
| 002687F_343862_SNP | 343862 | A | G |
| 002687F_201858_SNP | 201858 | T | G |
| 002687F_333763_SNP | 333763 | A | G |
| 002687F_347210_SNP | 347210 | A | G |
| 002687F_160730_SNP | 160730 | A | G |
| 002687F_161496_SNP | 161496 | A | G |
| 002687F_189663_SNP | 189663 | C | T |
| 002687F_341508_SNP | 341508 | A | T |
| 002687F_346605_SNP | 346605 | A | G |
| 002687F_362101_SNP | 362101 | G | A |

TABLE 4

| SNP Positions within SEQ ID NO: 4 that are associated with increased resistance to ASR | | | |
|---|---|---|---|
| SNP Name | Position | Favorable Allele (Rust Resistant) | Unfavorable Allele (Rust Susceptible) |
| 001084F-001-01__1285__SNP\|\|S__96261695 | 1285 | T | A |
| 001084F-001-01__1521__SNP\|\|S__96261716 | 1521 | C | A |
| 001084F-001-01__2588__SNP\|\|S__96261833 | 2588 | A | G |
| 001084F-001-01__2699__SNP\|\|S__96261849 | 2699 | G | A |
| 001084F-001-01__7021__SNP\|\|S__96262358 | 7021 | T | C |
| 001084F-001-01__8184__SNP\|\|S__96262509 | 8184 | G | A |
| 001084F-001-01__9147__SNP\|\|S__96262590 | 9147 | G | T |
| 001084F-001-01__10435__SNP\|\|S__96262737 | 10435 | G | C |
| 001084F-001-01__13118__SNP\|\|S__96263136 | 13118 | C | T |
| 001084F__27070__SNP\|\|S__96182069 | 27070 | T | C |
| 001084F__28184__SNP\|\|S__96182234 | 28184 | G | T |
| 001084F__31379__SNP\|\|S__96182641 | 31379 | C | G |
| 001084F__32184__SNP\|\|S__96182765 | 32184 | C | T |
| 001084F__42660__SNP\|\|S__96183942 | 42660 | T | A |
| 001084F__52001__SNP\|\|S__96185095 | 52001 | C | T |
| 001084F__52023__SNP | 52023 | A | G |
| 001084F__57467__SNP\|\|S__96185758 | 57467 | A | C |
| 001084F__57737__SNP\|\|S__96185798 | 57737 | C | G |
| 001084F__58089__SNP\|\|S__96185849 | 58089 | G | A |
| 001084F__63976__SNP\|\|S__96186652 | 63976 | G | A |
| 001084F__65903__SNP\|\|S__96186876 | 65903 | A | G |
| 001084F__82007__SNP\|\|S__96188830 | 82007 | G | T |
| 001084F-001-01__82274__SNP\|\|S__96272178 | 82274 | T | G |
| 001084F__84479__SNP\|\|S__96189187 | 84479 | T | G |
| 001084F__85287__SNP\|\|S__96189334 | 85287 | A | C |
| 001084F__85888__SNP\|\|S__96189417 | 85888 | A | T |
| 001084F__86201__SNP\|\|S__96189465 | 86201 | C | T |
| 001084F-001-01__86502__SNP\|\|S__96272667 | 86502 | A | G |
| 001084F__87914__SNP\|\|S__96189697 | 87914 | G | A |
| 001084F__88555__SNP\|\|S__96189801 | 88555 | T | A |
| 001084F__93651__SNP\|\|S__96190428 | 93651 | G | A |
| 001084F__95283__SNP\|\|S__96190621 | 95283 | G | C |
| 001084F-001-01__97554__SNP\|\|S__96274217 | 97554 | A | C |
| 001084F__98814__SNP\|\|S__96191018 | 98814 | C | A |
| 001084F__103767__SNP\|\|S__96191744 | 103767 | T | A |
| 001084F__106721__SNP\|\|S__96192163 | 106721 | G | T |
| 001084F__110421__SNP\|\|S__96192646 | 110421 | C | G |
| 001084F__111143__SNP\|\|S__96192765 | 111143 | C | T |
| 001084F__111365__SNP\|\|S__96192803 | 111365 | A | G |
| 001084F__113202__SNP\|\|S__96193055 | 113202 | A | T |
| 001084F__114276__SNP | 114276 | G | T |
| 001084F__114340__SNP\|\|S__96193207 | 114340 | A | G |
| 001084F__114450__SNP\|\|S__96193224 | 114450 | T | C |
| 001084F__114536__SNP\|\|S__96193238 | 114536 | G | A |
| 001084F__115661__SNP\|\|S__96193442 | 115661 | T | C |
| 001084F__121396__SNP\|\|S__96194243 | 121396 | A | T |
| 001084F__122184__SNP\|\|S__96194326 | 122184 | A | G |
| 001084F__123018__SNP\|\|S__96194413 | 123018 | T | C |
| 001084F__123034__SNP\|\|S__96194416 | 123034 | A | T |
| 001084F__124257__SNP\|\|S__96194591 | 124257 | A | C |
| 001084F__124583__SNP\|\|S__96194626 | 124583 | G | A |
| 001084F__125117__SNP\|\|S__96194736 | 125117 | C | A |
| 001084F__125329__SNP\|\|S__96194763 | 125329 | C | G |
| 001084F__125691__SNP\|\|S__96194803 | 125691 | T | C |
| 001084F__126047__SNP\|\|S__96194860 | 126047 | A | T |
| 001084F__126132__SNP\|\|S__96194877 | 126132 | G | A |
| 001084F__126350__SNP | 126350 | A | G |
| 001084F__126379__SNP\|\|S__96194890 | 126379 | G | A |
| 001084F__126664__SNP\|\|S__96194933 | 126664 | A | G |
| 001084F__126712__SNP\|\|S__96194939 | 126712 | G | C |
| 001084F-001-01__127911__SNP\|\|S__96278033 | 127911 | C | T |
| 001084F__129197__SNP\|\|S__96195328 | 129197 | A | G |
| 001084F__129484__SNP\|\|S__96195378 | 129484 | T | C |
| 001084F__130167__SNP\|\|S__96195529 | 130167 | C | T |
| 001084F__130305__SNP\|\|S__96195546 | 130305 | A | G |
| 001084F__130497__SNP\|\|S__96195566 | 130497 | C | A |
| 001084F__130604__SNP | 130604 | A | C |
| 001084F__132646__SNP\|\|S__96195748 | 132646 | A | C |
| 001084F__132795__SNP\|\|S__96195769 | 132795 | A | C |
| 001084F__133258__SNP\|\|S__96195812 | 133258 | A | C |
| 001084F__133487__SNP\|\|S__96195836 | 133487 | T | A |
| 001084F__139504__SNP\|\|S__96195994 | 139504 | T | C |
| 001084F__140393__SNP\|\|S__96196060 | 140393 | G | A |

TABLE 4-continued

SNP Positions within SEQ ID NO: 4 that are associated with increased resistance to ASR

| SNP Name | Position | Favorable Allele (Rust Resistant) | Unfavorable Allele (Rust Susceptible) |
|---|---|---|---|
| 001084F_140734_SNP\|\|S_96196116 | 140734 | G | A |
| 001084F_140889_SNP\|\|S_96196121 | 140889 | G | A |
| 001084F_140943_SNP\|\|S_96196125 | 140943 | C | G |
| 001084F_140956_SNP\|\|S_96196127 | 140956 | T | C |
| 001084F_141136_SNP\|\|S_96196151 | 141136 | C | T |
| 001084F_141999_SNP\|\|S_96196230 | 141999 | A | T |
| 001084F_142002_SNP\|\|S_96196231 | 142002 | T | C |
| 001084F_142266_SNP\|\|S_96196269 | 142266 | G | A |
| 001084F_142328_SNP\|\|S_96196272 | 142328 | A | G |
| 001084F_142364_SNP\|\|S_96196276 | 142364 | A | T |
| 001084F_142627_SNP | 142627 | T | C |
| 001084F_142993_SNP\|\|S_96196324 | 142993 | A | C |
| 001084F_143091_SNP\|\|S_96196333 | 143091 | A | T |
| 001084F_143145_SNP\|\|S_96196341 | 143145 | T | C |
| 001084F_143227_SNP\|\|S_96196350 | 143227 | A | C |
| 001084F_143257_SNP\|\|S_96196353 | 143257 | A | G |
| 001084F_144001_SNP\|\|S_96196414 | 144001 | A | C |
| 001084F_144670_SNP\|\|S_96196479 | 144670 | A | G |
| 001084F_144689_SNP\|\|S_96196480 | 144689 | G | A |
| 001084F_144794_SNP\|\|S_96196492 | 144794 | A | C |
| 001084F_145076_SNP | 145076 | C | T |
| 001084F_147040_SNP\|\|S_96196783 | 147040 | G | T |
| 001084F_148598_SNP\|\|S_96196947 | 148598 | G | A |
| 001084F_150856_SNP\|\|S_96197142 | 150856 | G | A |
| 001084F_150890_SNP\|\|S_96197144 | 150890 | C | T |
| 001084F_150946_SNP\|\|S_96197148 | 150946 | C | G |
| 001084F_151501_SNP\|\|S_96197186 | 151501 | C | T |
| 001084F_151988_SNP\|\|S_96197248 | 151988 | G | T |
| 001084F_152716_SNP\|\|S_96197335 | 152716 | A | C |
| 001084F_152718_SNP\|\|S_96197336 | 152718 | G | A |
| 001084F_153080_SNP\|\|S_96197385 | 153080 | G | T |
| 001084F_154824_SNP\|\|S_96197620 | 154824 | T | A |
| 001084F_155266_SNP\|\|S_96197675 | 155266 | A | T |
| 001084F_156572_SNP\|\|S_96197878 | 156572 | G | A |
| 001084F_157730_SNP\|\|S_96198007 | 157730 | T | C |
| 001084F_158682_SNP\|\|S_96198187 | 158682 | T | C |
| 001084F_158723_SNP\|\|S_96198192 | 158723 | T | G |
| 001084F_158742_SNP\|\|S_96198194 | 158742 | G | A |
| 001084F_159166_SNP\|\|S_96198257 | 159166 | A | T |
| 001084F_159313_SNP\|\|S_96198276 | 159313 | A | G |
| 001084F_159442_SNP\|\|S_96198291 | 159442 | C | T |
| 001084F_159587_SNP\|\|S_96198308 | 159587 | T | C |
| 001084F_160320_SNP\|\|S_96198404 | 160320 | A | C |
| 001084F_160645_SNP\|\|S_96198429 | 160645 | T | C |
| 001084F_161095_SNP\|\|S_96198508 | 161095 | C | T |
| 001084F_161709_SNP\|\|S_96198644 | 161709 | C | T |
| 001084F_162179_SNP\|\|S_96198670 | 162179 | C | G |
| 001084F_162814_SNP\|\|S_96198732 | 162814 | A | T |
| 001084F_163017_SNP\|\|S_96198749 | 163017 | C | A |
| 001084F_163383_SNP\|\|S_96198774 | 163383 | G | T |
| 001084F_163680_SNP\|\|S_96198808 | 163680 | G | A |
| 001084F_164905_SNP\|\|S_96198896 | 164905 | C | A |
| 001084F_167287_SNP\|\|S_96199111 | 167287 | G | T |
| 001084F_167515_SNP\|\|S_96199122 | 167515 | G | C |
| 001084F_167652_SNP\|\|S_96199135 | 167652 | T | C |
| 001084F_167962_SNP\|\|S_96199157 | 167962 | A | T |
| 001084F_168247_SNP\|\|S_96199187 | 168247 | T | A |
| 001084F_168725_SNP\|\|S_96199246 | 168725 | A | G |
| 001084F_168757_SNP\|\|S_96199252 | 168757 | C | T |
| 001084F_169076_SNP\|\|S_96199300 | 169076 | A | G |
| 001084F_169079_SNP\|\|S_96199301 | 169079 | C | T |
| 001084F_169225_SNP\|\|S_96199313 | 169225 | T | C |
| 001084F_169491_SNP\|\|S_96199351 | 169491 | A | G |
| 001084F_169747_SNP\|\|S_96199380 | 169747 | G | T |
| 001084F_170170_SNP\|\|S_96199415 | 170170 | A | G |
| 001084F_170426_SNP\|\|S_96199442 | 170426 | A | T |
| 001084F_170606_SNP\|\|S_96199460 | 170606 | A | C |
| 001084F_170818_SNP\|\|S_96199484 | 170818 | T | G |
| 001084F_171563_SNP\|\|S_96199521 | 171563 | A | G |
| 001084F_172571_SNP\|\|S_96199666 | 172571 | G | T |
| 001084F_172598_SNP\|\|S_96199673 | 172598 | G | C |
| 001084F_172978_SNP\|\|S_96199717 | 172978 | A | G |
| 001084F_173956_SNP\|\|S_96199838 | 173956 | C | T |

TABLE 4-continued

SNP Positions within SEQ ID NO: 4 that are associated with increased resistance to ASR

| SNP Name | Position | Favorable Allele (Rust Resistant) | Unfavorable Allele (Rust Susceptible) |
|---|---|---|---|
| 001084F_174469_SNP\|\|S_96199929 | 174469 | T | G |
| 001084F_174541_SNP\|\|S_96199946 | 174541 | G | C |
| 001084F_174758_SNP\|\|S_96199978 | 174758 | C | T |
| 001084F_174810_SNP\|\|S_96199982 | 174810 | C | G |
| 001084F_175992_SNP\|\|S_96200176 | 175992 | A | T |
| 001084F_176004_SNP\|\|S_96200178 | 176004 | G | A |
| 001084F_176028_SNP\|\|S_96200179 | 176028 | A | G |
| 001084F_176079_SNP\|\|S_96200184 | 176079 | G | A |
| 001084F_176112_SNP\|\|S_96200191 | 176112 | T | C |
| 001084F_176675_SNP\|\|S_96200247 | 176675 | C | T |
| 001084F_176780_SNP\|\|S_96200251 | 176780 | A | G |
| 001084F_176983_SNP\|\|S_96200275 | 176983 | A | T |
| 001084F_177786_SNP\|\|S_96200387 | 177786 | C | A |
| 001084F_177903_SNP\|\|S_96200440 | 177903 | G | A |
| 001084F_177935_SNP\|\|S_96200455 | 177935 | G | A |
| 001084F_178018_SNP\|\|S_96200464 | 178018 | A | T |
| 001084F_178034_SNP\|\|S_96200468 | 178034 | C | A |
| 001084F_178300_SNP\|\|S_96200512 | 178300 | C | G |
| 001084F_178555_SNP\|\|S_96200539 | 178555 | A | G |
| 001084F_178630_SNP\|\|S_96200546 | 178630 | G | A |
| 001084F_179301_SNP\|\|S_96200625 | 179301 | A | T |
| 001084F_179344_SNP\|\|S_96200632 | 179344 | C | T |
| 001084F_179983_SNP\|\|S_96200681 | 179983 | C | T |
| 001084F_179991_SNP\|\|S_96200682 | 179991 | C | T |
| 001084F_179996_SNP\|\|S_96200683 | 179996 | C | A |
| 001084F_180047_SNP\|\|S_96200686 | 180047 | C | G |
| 001084F_180211_SNP | 180211 | A | T |
| 001084F_180253_SNP\|\|S_96200700 | 180253 | A | G |
| 001084F_180363_SNP\|\|S_96200718 | 180363 | A | G |
| 001084F_181550_SNP\|\|S_96200860 | 181550 | A | C |
| 001084F_184764_SNP\|\|S_96201129 | 184764 | C | A |
| 001084F_185504_SNP\|\|S_96201216 | 185504 | G | A |
| 001084F_185881_SNP\|\|S_96201245 | 185881 | T | C |
| 001084F_185892_SNP\|\|S_96201246 | 185892 | A | T |
| 001084F_186629_SNP\|\|S_96201304 | 186629 | A | G |
| 001084F_188635_SNP\|\|S_96201526 | 188635 | A | G |
| 001084F_190570_SNP\|\|S_96201789 | 190570 | T | C |
| 001084F_198311_SNP\|\|S_96202837 | 198311 | A | T |
| 001084F_199171_SNP\|\|S_96202922 | 199171 | G | A |
| 001084F_202466_SNP\|\|S_96203367 | 202466 | T | C |
| 001084F_205193_SNP\|\|S_96203796 | 205193 | T | A |
| 001084F_211317_SNP\|\|S_96204657 | 211317 | A | T |
| 001084F_213117_SNP\|\|S_96204953 | 213117 | T | C |
| 001084F_213481_SNP\|\|S_96205009 | 213481 | T | C |
| 001084F_213587_SNP\|\|S_96205028 | 213587 | G | T |
| 001084F_218631_SNP\|\|S_96205568 | 218631 | G | A |
| 001084F_226564_SNP\|\|S_96206645 | 226564 | C | T |
| 001084F_227857_SNP\|\|S_96206816 | 227857 | G | A |
| 001084F_237891_SNP\|\|S_96208029 | 237891 | A | C |
| 001084F_239017_SNP\|\|S_96208161 | 239017 | C | T |
| 001084F_239368_SNP\|\|S_96208190 | 239368 | T | G |
| 001084F_239536_SNP\|\|S_96208211 | 239536 | C | T |
| 001084F_239682_SNP\|\|S_96208242 | 239682 | T | A |
| 001084F_245799_SNP\|\|S_96209112 | 245799 | A | T |
| 001084F_246318_SNP\|\|S_96209151 | 246318 | C | T |
| 001084F_246386_SNP\|\|S_96209159 | 246386 | A | T |
| 001084F_249008_SNP\|\|S_96209600 | 249008 | A | G |
| 001084F_250639_SNP | 250639 | T | C |
| 001084F_250641_SNP | 250641 | C | T |
| 001084F_251193_SNP\|\|S_96209831 | 251193 | T | C |
| 001084F_251515_SNP\|\|S_96209892 | 251515 | A | G |
| 001084F_252366_SNP\|\|S_96209966 | 252366 | T | C |
| 001084F_252578_SNP\|\|S_96209979 | 252578 | C | G |
| 001084F_253950_SNP\|\|S_96210134 | 253950 | C | G |
| 001084F_253956_SNP\|\|S_96210135 | 253956 | G | A |
| 001084F_254157_SNP\|\|S_96210146 | 254157 | T | G |
| 001084F_254286_SNP\|\|S_96210168 | 254286 | G | T |
| 001084F_254514_SNP\|\|S_96210191 | 254514 | A | G |
| 001084F_254545_SNP\|\|S_96210194 | 254545 | A | G |
| 001084F_255300_SNP\|\|S_96210279 | 255300 | G | C |
| 001084F_255476_SNP\|\|S_96210306 | 255476 | C | T |
| 001084F_255933_SNP\|\|S_96210349 | 255933 | C | T |
| 001084F_255992_SNP\|\|S_96210355 | 255992 | G | A |

TABLE 4-continued

SNP Positions within SEQ ID NO: 4 that are associated with increased resistance to ASR

| SNP Name | Position | Favorable Allele (Rust Resistant) | Unfavorable Allele (Rust Susceptible) |
|---|---|---|---|
| 001084F_256289_SNP\|\|S_96210412 | 256289 | C | T |
| 001084F_256296_SNP\|\|S_96210413 | 256296 | A | G |
| 001084F_256670_SNP\|\|S_96210467 | 256670 | T | A |
| 001084F_256861_SNP\|\|S_96210477 | 256861 | T | C |
| 001084F_256888_SNP\|\|S_96210478 | 256888 | T | G |
| 001084F_256929_SNP\|\|S_96210482 | 256929 | G | A |
| 001084F_257126_SNP\|\|S_96210501 | 257126 | C | T |
| 001084F_257133_SNP\|\|S_96210503 | 257133 | T | C |
| 001084F_257136_SNP\|\|S_96210504 | 257136 | T | C |
| 001084F_257289_SNP\|\|S_96210519 | 257289 | T | C |
| 001084F_257327_SNP\|\|S_96210520 | 257327 | A | G |
| 001084F_257534_SNP\|\|S_96210589 | 257534 | G | C |
| 001084F_257676_SNP\|\|S_96210618 | 257676 | C | T |
| 001084F_257874_SNP\|\|S_96210661 | 257874 | C | G |
| 001084F_257934_SNP\|\|S_96210667 | 257934 | G | A |
| 001084F_258230_SNP\|\|S_96210699 | 258230 | C | G |
| 001084F_258395_SNP\|\|S_96210734 | 258395 | C | G |
| 001084F_258418_SNP\|\|S_96210739 | 258418 | G | T |
| 001084F_258653_SNP\|\|S_96210766 | 258653 | A | G |
| 001084F_259060_SNP\|\|S_96210844 | 259060 | C | A |
| 001084F_259168_SNP | 259168 | G | T |
| 001084F_259273_SNP\|\|S_96210882 | 259273 | A | G |
| 001084F_259443_SNP\|\|S_96210898 | 259443 | C | G |
| 001084F_260067_SNP\|\|S_96210964 | 260067 | C | T |
| 001084F_260664_SNP\|\|S_96211072 | 260664 | T | C |
| 001084F_261242_SNP\|\|S_96211105 | 261242 | G | A |
| 001084F_262054_SNP\|\|S_96211201 | 262054 | G | A |
| 001084F_262740_SNP\|\|S_96211245 | 262740 | C | A |
| 001084F_263131_SNP\|\|S_96211295 | 263131 | C | T |
| 001084F_263585_SNP\|\|S_96211367 | 263585 | A | C |
| 001084F_263650_SNP\|\|S_96211378 | 263650 | G | A |
| 001084F_263970_SNP\|\|S_96211410 | 263970 | T | C |
| 001084F_264720_SNP\|\|S_96211554 | 264720 | A | T |
| 001084F_265298_SNP\|\|S_96211619 | 265298 | A | C |
| 001084F_265844_SNP\|\|S_96211678 | 265844 | C | T |
| 001084F_265895_SNP\|\|S_96211683 | 265895 | A | G |
| 001084F_268195_SNP\|\|S_96211902 | 268195 | T | G |
| 001084F_270197_SNP\|\|S_96212223 | 270197 | G | A |
| 001084F_271842_SNP\|\|S_96212410 | 271842 | A | G |
| 001084F_272342_SNP\|\|S_96212494 | 272342 | T | C |
| 001084F_272520_SNP\|\|S_96212517 | 272520 | C | T |
| 001084F_273104_SNP\|\|S_96212595 | 273104 | C | A |
| 001084F_273591_SNP\|\|S_96212652 | 273591 | T | C |
| 001084F_273652_SNP\|\|S_96212656 | 273652 | A | C |
| 001084F_275546_SNP\|\|S_96212833 | 275546 | T | C |
| 001084F_275658_SNP\|\|S_96212859 | 275658 | T | A |
| 001084F_278078_SNP\|\|S_96213204 | 278078 | G | A |
| 001084F_279158_SNP\|\|S_96213320 | 279158 | A | C |
| 001084F_279575_SNP\|\|S_96213380 | 279575 | A | G |
| 001084F_279729_SNP\|\|S_96213387 | 279729 | C | G |
| 001084F_279954_SNP\|\|S_96213419 | 279954 | C | T |
| 001084F_281389_SNP\|\|S_96213625 | 281389 | C | T |
| 001084F_281513_SNP\|\|S_96213642 | 281513 | C | T |
| 001084F_281542_SNP\|\|S_96213648 | 281542 | C | T |
| 001084F_285388_SNP\|\|S_96214072 | 285388 | C | T |
| 001084F_285487_SNP\|\|S_96214096 | 285487 | C | T |
| 001084F_285683_SNP\|\|S_96214122 | 285683 | C | T |
| 001084F_285771_SNP\|\|S_96214134 | 285771 | G | T |
| 001084F_286094_SNP\|\|S_96214209 | 286094 | A | G |
| 001084F_286116_SNP\|\|S_96214211 | 286116 | A | G |
| 001084F_288436_SNP\|\|S_96214424 | 288436 | A | T |
| 001084F_292939_SNP\|\|S_96215141 | 292939 | G | C |
| 001084F_293422_SNP\|\|S_96215191 | 293422 | C | T |
| 001084F_293810_SNP\|\|S_96215229 | 293810 | A | G |
| 001084F_295524_SNP\|\|S_96215424 | 295524 | A | G |
| 001084F_299778_SNP\|\|S_96215969 | 299778 | A | G |
| 001084F_299821_SNP\|\|S_96215974 | 299821 | G | T |
| 001084F_300075_SNP\|\|S_96215990 | 300075 | G | A |
| 001084F_300887_SNP\|\|S_96216153 | 300887 | A | G |
| 001084F_301156_SNP\|\|S_96216230 | 301156 | G | A |
| 001084F_301165_SNP\|\|S_96216235 | 301165 | T | C |
| 001084F_301641_SNP\|\|S_96216305 | 301641 | A | G |
| 001084F_301793_SNP\|\|S_96216321 | 301793 | A | C |

TABLE 4-continued

SNP Positions within SEQ ID NO: 4 that are associated with increased resistance to ASR

| SNP Name | Position | Favorable Allele (Rust Resistant) | Unfavorable Allele (Rust Susceptible) |
|---|---|---|---|
| 001084F_301853_SNP\|\|S_96216333 | 301853 | C | T |
| 001084F_302997_SNP | 302997 | C | T |
| 001084F_303003_SNP | 303003 | C | T |
| 001084F_304597_SNP\|\|S_96216721 | 304597 | G | A |
| 001084F_304622_SNP\|\|S_96216723 | 304622 | T | C |
| 001084F_304909_SNP\|\|S_96216751 | 304909 | T | C |
| 001084F_305891_SNP\|\|S_96216891 | 305891 | G | A |
| 001084F_306716_SNP\|\|S_96217046 | 306716 | G | A |
| 001084F_307693_SNP | 307693 | G | A |
| 001084F_310749_SNP\|\|S_96217542 | 310749 | C | T |
| 001084F_313646_SNP\|\|S_96217955 | 313646 | A | T |
| 001084F_313895_SNP\|\|S_96217991 | 313895 | A | G |
| 001084F_314482_SNP\|\|S_96218079 | 314482 | G | T |
| 001084F_315263_SNP\|\|S_96218215 | 315263 | G | A |
| 001084F_315605_SNP\|\|S_96218253 | 315605 | C | A |
| 001084F_316003_SNP\|\|S_96218288 | 316003 | C | A |
| 001084F_325995_SNP\|\|S_96219601 | 325995 | T | G |
| 001084F_326011_SNP\|\|S_96219606 | 326011 | A | G |
| 001084F_326714_SNP\|\|S_96219700 | 326714 | C | T |
| 001084F_327975_SNP\|\|S_96219824 | 327975 | T | A |
| 001084F_333039_SNP\|\|S_96220391 | 333039 | T | C |
| 001084F_335872_SNP\|\|S_96220742 | 335872 | A | G |
| 001084F_336344_SNP\|\|S_96220819 | 336344 | G | T |
| 001084F_337412_SNP\|\|S_96220956 | 337412 | C | T |
| 001084F_344980_SNP\|\|S_96221826 | 344980 | A | C |
| 001084F_345034_SNP\|\|S_96221832 | 345034 | T | G |
| 001084F_346595_SNP | 346595 | T | G |
| 001084F_346779_SNP | 346779 | T | C |
| 001084F_366657_SNP\|\|S_96224390 | 366657 | C | A |
| 001084F_368696_SNP\|\|S_96224623 | 368696 | A | G |
| 001084F_370079_SNP\|\|S_96224756 | 370079 | A | G |
| 001084F_370253_SNP\|\|S_96224774 | 370253 | T | C |
| 001084F_380989_SNP\|\|S_96226270 | 380989 | A | G |
| 001084F_382368_SNP\|\|S_96226437 | 382368 | C | T |
| 001084F_386547_SNP\|\|S_96226875 | 386547 | C | T |
| 001084F_392211_SNP\|\|S_96227525 | 392211 | C | T |
| 001084F_392954_SNP | 392954 | G | C |
| 001084F_393013_SNP\|\|S_96227637 | 393013 | T | C |
| 001084F_393748_SNP\|\|S_96227753 | 393748 | T | C |
| 001084F_394557_SNP\|\|S_96227856 | 394557 | G | A |
| 001084F_395656_SNP\|\|S_96228004 | 395656 | A | G |
| 001084F_395876_SNP\|\|S_96228023 | 395876 | T | A |
| 001084F_397385_SNP\|\|S_96228189 | 397385 | G | T |
| 001084F_398551_SNP\|\|S_96228339 | 398551 | C | T |
| 001084F_404731_SNP\|\|S_96229018 | 404731 | A | G |
| 001084F_404792_SNP\|\|S_96229021 | 404792 | T | A |
| 001084F_405196_SNP\|\|S_96229072 | 405196 | C | T |
| 001084F_405197_SNP\|\|S_96229073 | 405197 | A | C |
| 001084F_405198_SNP\|\|S_96229074 | 405198 | T | A |
| 001084F_405731_SNP\|\|S_96229143 | 405731 | C | G |
| 001084F_407194_SNP\|\|S_96229325 | 407194 | A | G |
| 001084F_409622_SNP\|\|S_96229641 | 409622 | A | T |
| 001084F_410452_SNP\|\|S_96229734 | 410452 | C | T |
| 001084F_412571_SNP\|\|S_96229970 | 412571 | T | C |
| 001084F_412785_SNP\|\|S_96230001 | 412785 | A | G |
| 001084F_413752_SNP\|\|S_96230139 | 413752 | G | A |
| 001084F_416185_SNP\|\|S_96230412 | 416185 | G | T |
| 001084F_416395_SNP\|\|S_96230427 | 416395 | C | A |
| 001084F_416591_SNP\|\|S_96230446 | 416591 | T | G |
| 001084F_416593_SNP\|\|S_96230447 | 416593 | G | C |
| 001084F_417106_SNP\|\|S_96230492 | 417106 | G | C |
| 001084F_419325_SNP\|\|S_96230786 | 419325 | A | G |
| 001084F_419460_SNP\|\|S_96230801 | 419460 | C | A |
| 001084F_420529_SNP\|\|S_96230939 | 420529 | C | T |
| 001084F_420584_SNP\|\|S_96230944 | 420584 | A | G |
| 001084F_421121_SNP\|\|S_96231014 | 421121 | T | C |
| 001084F_427016_SNP\|\|S_96231729 | 427016 | G | C |
| 001084F_432148_SNP\|\|S_96232338 | 432148 | A | G |
| 001084F_432700_SNP\|\|S_96232398 | 432700 | A | G |
| 001084F_432798_SNP\|\|S_96232404 | 432798 | A | G |
| 001084F_433511_SNP\|\|S_96232528 | 433511 | C | T |
| 001084F_433994_SNP\|\|S_96232606 | 433994 | T | A |
| 001084F_434231_SNP\|\|S_96232644 | 434231 | G | T |

TABLE 4-continued

SNP Positions within SEQ ID NO: 4 that are associated with increased resistance to ASR

| SNP Name | Position | Favorable Allele (Rust Resistant) | Unfavorable Allele (Rust Susceptible) |
|---|---|---|---|
| 001084F_436588_SNP||S_96232887 | 436588 | A | G |
| 001084F_437273_SNP||S_96232934 | 437273 | T | C |
| 001084F_439876_SNP||S_96233294 | 439876 | T | G |
| 001084F_446565_SNP||S_96234158 | 446565 | C | A |
| 001084F_446712_SNP||S_96234176 | 446712 | A | G |
| 001084F_446950_SNP||S_96234212 | 446950 | C | T |
| 001084F_448070_SNP||S_96234319 | 448070 | T | C |
| 001084F_448364_SNP||S_96234350 | 448364 | C | T |
| 001084F_449012_SNP | 449012 | A | G |
| 001084F_449590_SNP||S_96234450 | 449590 | C | T |
| 001084F_451682_SNP||S_96234684 | 451682 | T | C |
| 001084F_453264_SNP | 453264 | A | G |
| 001084F_454594_SNP||S_96235135 | 454594 | G | A |
| 001084F_457770_SNP||S_96235545 | 457770 | T | C |
| 001084F_458788_SNP||S_96235648 | 458788 | A | G |
| 001084F_459147_SNP||S_96235687 | 459147 | C | T |
| 001084F_461166_SNP||S_96236019 | 461166 | A | G |
| 001084F_461247_SNP||S_96236039 | 461247 | G | A |
| 001084F_461752_SNP||S_96236125 | 461752 | C | T |
| 001084F_466437_SNP||S_96236630 | 466437 | T | G |
| 001084F_466805_SNP||S_96236678 | 466805 | T | C |
| 001084F_467644_SNP||S_96236780 | 467644 | A | C |
| 001084F_468704_SNP||S_96236898 | 468704 | T | A |
| 001084F_471659_SNP||S_96237333 | 471659 | T | A |
| 001084F_471667_SNP||S_96237334 | 471667 | G | T |
| 001084F_471959_SNP||S_96237354 | 471959 | T | G |
| 001084F_474765_SNP||S_96237787 | 474765 | T | C |
| 001084F_475731_SNP||S_96237878 | 475731 | A | T |
| 001084F_476014_SNP||S_96237900 | 476014 | A | T |
| 001084F_481574_SNP||S_96238618 | 481574 | C | T |
| 001084F_481748_SNP||S_96238640 | 481748 | A | T |
| 001084F_481949_SNP||S_96238661 | 481949 | T | A |
| 001084F_483822_SNP||S_96238932 | 483822 | C | T |
| 001084F_483922_SNP||S_96238940 | 483922 | A | C |
| 001084F_491255_SNP||S_96239840 | 491255 | T | C |
| 001084F_491264_SNP||S_96239843 | 491264 | C | T |
| 001084F_491333_SNP||S_96239854 | 491333 | A | G |
| 001084F_491388_SNP||S_96239874 | 491388 | C | T |
| 001084F_491438_SNP||S_96239884 | 491438 | C | A |
| 001084F_491456_SNP||S_96239888 | 491456 | T | C |
| 001084F_491474_SNP||S_96239891 | 491474 | A | G |
| 001084F_492676_SNP||S_96240013 | 492676 | C | G |
| 001084F_492681_SNP||S_96240014 | 492681 | C | T |
| 001084F_493223_SNP||S_96240071 | 493223 | G | A |
| 001084F_493257_SNP||S_96240074 | 493257 | C | T |
| 001084F_495167_SNP||S_96240310 | 495167 | G | T |
| 001084F_495237_SNP||S_96240320 | 495237 | A | G |
| 001084F_496103_SNP | 496103 | C | A |
| 001084F_511172_SNP||S_96242515 | 511172 | T | C |
| 001084F_575347_SNP||S_96250573 | 575347 | A | G |
| 001084F_577730_SNP||S_96251010 | 577730 | G | A |
| 001084F_578149_SNP||S_96251054 | 578149 | G | A |
| 001084F_579372_SNP||S_96251212 | 579372 | A | G |
| 001084F_586316_SNP||S_96252046 | 586316 | A | G |
| 001084F_589859_SNP||S_96252610 | 589859 | T | C |
| 001084F_589957_SNP||S_96252616 | 589957 | T | C |
| 001084F_589968_SNP||S_96252619 | 589968 | T | C |
| 001084F_590712_SNP||S_96252758 | 590712 | T | C |
| 001084F_591010_SNP||S_96252775 | 591010 | T | A |
| 001084F_591944_SNP||S_96252903 | 591944 | C | A |
| 001084F_592110_SNP||S_96252917 | 592110 | C | T |
| 001084F_592173_SNP||S_96252923 | 592173 | G | A |
| 001084F_594029_SNP||S_96253180 | 594029 | A | G |
| 001084F_594234_SNP||S_96253198 | 594234 | T | C |
| 001084F_594408_SNP||S_96253219 | 594408 | C | T |
| 001084F_594539_SNP||S_96253244 | 594539 | G | A |
| 001084F_595688_SNP||S_96253403 | 595688 | C | T |
| 001084F_595748_SNP||S_96253409 | 595748 | A | G |
| 001084F_596093_SNP||S_96253455 | 596093 | A | C |
| 001084F_598845_SNP||S_96253843 | 598845 | G | A |
| 001084F_599340_SNP||S_96253911 | 599340 | A | C |
| 001084F_600996_SNP||S_96254147 | 600996 | A | G |
| 001084F_601300_SNP||S_96254185 | 601300 | T | C |

TABLE 4-continued

SNP Positions within SEQ ID NO: 4 that are associated with increased resistance to ASR

| SNP Name | Position | Favorable Allele (Rust Resistant) | Unfavorable Allele (Rust Susceptible) |
|---|---|---|---|
| 001084F__601957__SNP\|\|S__96254250 | 601957 | G | A |
| 001084F__602486__SNP | 602486 | C | T |
| 001084F__606403__SNP\|\|S__96254906 | 606403 | C | G |
| 001084F__607071__SNP\|\|S__96254986 | 607071 | G | T |
| 001084F__610092__SNP\|\|S__96255394 | 610092 | T | C |
| 001084F__610896__SNP\|\|S__96255567 | 610896 | A | G |
| 001084F__611678__SNP\|\|S__96255725 | 611678 | C | T |
| 001084F__612116__SNP\|\|S__96255826 | 612116 | C | T |
| 001084F__613144__SNP\|\|S__96256025 | 613144 | A | G |
| 001084F__614025__SNP | 614025 | G | A |
| 001084F__616919__SNP\|\|S__96256727 | 616919 | T | G |
| 001084F__617682__SNP\|\|S__96256806 | 617682 | A | T |
| 001084F__617849__SNP\|\|S__96256827 | 617849 | A | G |
| 001084F__618353__SNP | 618353 | T | C |
| 001084F__621278__SNP\|\|S__96257215 | 621278 | G | T |
| 001084F__621394__SNP\|\|S__96257226 | 621394 | T | C |
| 001084F__623147__SNP\|\|S__96257479 | 623147 | A | G |
| 001084F__624529__SNP | 624529 | T | A |
| 001084F__627999__SNP\|\|S__96258130 | 627999 | T | G |
| 001084F__628120__SNP\|\|S__96258147 | 628120 | C | T |
| 001084F__628359__SNP\|\|S__96258172 | 628359 | T | G |
| 001084F__628992__SNP\|\|S__96258268 | 628992 | T | C |
| 001084F__629050__SNP\|\|S__96258285 | 629050 | A | G |
| 001084F__629328__SNP\|\|S__96258334 | 629328 | C | T |
| 001084F__630582__SNP\|\|S__96258523 | 630582 | G | C |
| 001084F__631413__SNP\|\|S__96258645 | 631413 | T | G |
| 001084F__633048__SNP\|\|S__96258882 | 633048 | A | T |
| 001084F__643660__SNP\|\|S__96261113 | 643660 | A | G |

TABLE 5

SNP Positions within SEQ ID NO: 5 that are associated with increased resistance to ASR

| SNP Name | Position | Favorable Allele (Rust Resistant) | Unfavorable Allele (Rust Susceptible) |
|---|---|---|---|
| 000819F/G__tomentella__PI__583970__v1 | 114599 | G | C |
| 000819F/G__tomentella__PI__583970__v1 | 149238 | C | T |
| 000819F/G__tomentella__PI__583970__v1 | 149288 | C | T |
| 000819F/G__tomentella__PI__583970__v1 | 150032 | T | C |
| 000819F/G__tomentella__PI__583970__v1 | 151944 | C | T |
| 000819F/G__tomentella__PI__583970__v1 | 152479 | A | T |
| 000819F/G__tomentella__PI__583970__v1 | 155540 | G | A |
| 000819F/G__tomentella__PI__583970__v1 | 162204 | A | C |
| 000819F/G__tomentella__PI__583970__v1 | 163754 | G | A |
| 000819F/G__tomentella__PI__583970__v1 | 165362 | A | C |
| 000819F/G__tomentella__PI__583970__v1 | 165535 | A | T |
| 000819F/G__tomentella__PI__583970__v1 | 165577 | G | C |
| 000819F/G__tomentella__PI__583970__v1 | 167131 | T | C |
| 000819F/G__tomentella__PI__583970__v1 | 171396 | A | G |
| 000819F/G__tomentella__PI__583970__v1 | 172021 | T | C |
| 000819F/G__tomentella__PI__583970__v1 | 172471 | G | C |
| 000819F/G__tomentella__PI__583970__v1 | 177992 | A | C |
| 000819F/G__tomentella__PI__583970__v1 | 180263 | A | C |
| 000819F/G__tomentella__PI__583970__v1 | 181800 | C | T |
| 000819F/G__tomentella__PI__583970__v1 | 193762 | C | T |
| 000819F/G__tomentella__PI__583970__v1 | 194604 | T | A |
| 000819F/G__tomentella__PI__583970__v1 | 205989 | T | A |
| 000819F/G__tomentella__PI__583970__v1 | 212017 | A | G |
| 000819F/G__tomentella__PI__583970__v1 | 213446 | C | T |
| 000819F/G__tomentella__PI__583970__v1 | 232768 | A | T |
| 000819F/G__tomentella__PI__583970__v1 | 245161 | G | A |
| 000819F/G__tomentella__PI__583970__v1 | 245854 | T | A |
| 000819F/G__tomentella__PI__583970__v1 | 246180 | C | A |
| 000819F/G__tomentella__PI__583970__v1 | 246738 | C | T |
| 000819F/G__tomentella__PI__583970__v1 | 246919 | G | A |
| 000819F/G__tomentella__PI__583970__v1 | 248321 | G | A |
| 000819F/G__tomentella__PI__583970__v1 | 252345 | A | G |

TABLE 5-continued

| SNP Positions within SEQ ID NO: 5 that are associated with increased resistance to ASR | | | |
|---|---|---|---|
| SNP Name | Position | Favorable Allele (Rust Resistant) | Unfavorable Allele (Rust Susceptible) |
| 000819F/G__tomentella__PI__583970__v1 | 252360 | A | T |
| 000819F/G__tomentella__PI__583970__v1 | 265534 | A | G |
| 000819F/G__tomentella__PI__583970__v1 | 266733 | T | C |
| 000819F/G__tomentella__PI__583970__v1 | 266773 | T | C |
| 000819F/G__tomentella__PI__583970__v1 | 266963 | G | A |
| 000819F/G__tomentella__PI__583970__v1 | 267269 | A | T |
| 000819F/G__tomentella__PI__583970__v1 | 267342 | G | A |
| 000819F/G__tomentella__PI__583970__v1 | 267921 | C | T |
| 000819F/G__tomentella__PI__583970__v1 | 267929 | A | G |
| 000819F/G__tomentella__PI__583970__v1 | 275462 | G | A |
| 000819F/G__tomentella__PI__583970__v1 | 275759 | T | C |
| 000819F/G__tomentella__PI__583970__v1 | 276045 | T | C |
| 000819F/G__tomentella__PI__583970__v1 | 276067 | G | A |
| 000819F/G__tomentella__PI__583970__v1 | 278203 | C | T |
| 000819F/G__tomentella__PI__583970__v1 | 278888 | A | T |
| 000819F/G__tomentella__PI__583970__v1 | 283800 | G | A |
| 000819F/G__tomentella__PI__583970__v1 | 284053 | T | A |
| 000819F/G__tomentella__PI__583970__v1 | 284831 | G | C |
| 000819F/G__tomentella__PI__583970__v1 | 287570 | G | C |
| 000819F/G__tomentella__PI__583970__v1 | 288787 | A | T |
| 000819F/G__tomentella__PI__583970__v1 | 289782 | A | T |
| 000819F/G__tomentella__PI__583970__v1 | 290827 | T | C |
| 000819F/G__tomentella__PI__583970__v1 | 291200 | T | C |
| 000819F/G__tomentella__PI__583970__v1 | 291213 | G | A |
| 000819F/G__tomentella__PI__583970__v1 | 293207 | G | A |
| 000819F/G__tomentella__PI__583970__v1 | 293867 | C | T |
| 000819F/G__tomentella__PI__583970__v1 | 297410 | T | G |
| 000819F/G__tomentella__PI__583970__v1 | 297431 | T | C |
| 000819F/G__tomentella__PI__583970__v1 | 297475 | T | C |
| 000819F/G__tomentella__PI__583970__v1 | 298295 | G | T |
| 000819F/G__tomentella__PI__583970__v1 | 298437 | A | G |
| 000819F/G__tomentella__PI__583970__v1 | 298979 | G | C |
| 000819F/G__tomentella__PI__583970__v1 | 303692 | A | G |
| 000819F/G__tomentella__PI__583970__v1 | 304046 | T | A |
| 000819F/G__tomentella__PI__583970__v1 | 304512 | C | T |
| 000819F/G__tomentella__PI__583970__v1 | 304764 | C | A |
| 000819F/G__tomentella__PI__583970__v1 | 305269 | T | C |
| 000819F/G__tomentella__PI__583970__v1 | 305624 | T | C |
| 000819F/G__tomentella__PI__583970__v1 | 306037 | T | A |
| 000819F/G__tomentella__PI__583970__v1 | 306171 | G | A |
| 000819F/G__tomentella__PI__583970__v1 | 318002 | C | T |
| 000819F/G__tomentella__PI__583970__v1 | 328015 | G | A |
| 000819F/G__tomentella__PI__583970__v1 | 333209 | A | G |
| 000819F/G__tomentella__PI__583970__v1 | 341293 | C | T |
| 000819F/G__tomentella__PI__583970__v1 | 344251 | C | T |
| 000819F/G__tomentella__PI__583970__v1 | 346694 | T | C |
| 000819F/G__tomentella__PI__583970__v1 | 347362 | A | C |
| 000819F/G__tomentella__PI__583970__v1 | 347867 | A | G |
| 000819F/G__tomentella__PI__583970__v1 | 369651 | C | A |
| 000819F/G__tomentella__PI__583970__v1 | 380730 | C | T |
| 000819F/G__tomentella__PI__583970__v1 | 381546 | C | T |
| 000819F/G__tomentella__PI__583970__v1 | 385059 | A | G |
| 000819F/G__tomentella__PI__583970__v1 | 386671 | A | T |
| 000819F/G__tomentella__PI__583970__v1 | 387021 | C | T |
| 000819F/G__tomentella__PI__583970__v1 | 387788 | T | A |
| 000819F/G__tomentella__PI__583970__v1 | 388859 | T | C |
| 000819F/G__tomentella__PI__583970__v1 | 401614 | G | C |
| 000819F/G__tomentella__PI__583970__v1 | 420350 | C | G |
| 000819F/G__tomentella__PI__583970__v1 | 427998 | G | A |
| 000819F/G__tomentella__PI__583970__v1 | 428798 | T | C |
| 000819F/G__tomentella__PI__583970__v1 | 450156 | C | T |
| 000819F/G__tomentella__PI__583970__v1 | 453725 | C | T |
| 000819F/G__tomentella__PI__583970__v1 | 466651 | A | G |
| 000819F/G__tomentella__PI__583970__v1 | 467520 | T | C |
| 000819F/G__tomentella__PI__583970__v1 | 501821 | G | A |
| 000819F/G__tomentella__PI__583970__v1 | 510702 | G | C |
| 000819F/G__tomentella__PI__583970__v1 | 533134 | T | G |
| 000819F/G__tomentella__PI__583970__v1 | 586465 | G | A |
| 000819F/G__tomentella__PI__583970__v1 | 704705 | C | G |
| 000819F/G__tomentella__PI__583970__v1 | 704714 | A | G |

Oligonucleotide primers (herein, 'primers') can be developed and used to identify plants carrying any one of the chromosomal intervals depicted in SEQ ID NOs 1, 2, 3, 4 and/or 5 found to be highly associated with ASR resistance. Specifically, one having ordinary skill in the art can develop primers to detect any single nucleotide polymorphism (herein 'SNP') as identified in any one of Tables 1-5 in respect to identifying or producing soybean lines having any one of or a portion of the chromosome intervals depicted in SEQ ID NOs: 1, 2, 3, 4 or 5 that are associated with ASR resistance. A TAQMAN® assay (e.g. generally a two-step allelic discrimination assay or similar), a KASP™ assay (generally a one-step allelic discrimination assay defined below or similar), or both can be employed to identify the SNPs that associate with increased ASR resistance as disclosed herein (e.g. favorable alleles as depicted in Tables 1-5). In an exemplary two-step assay, a forward primer, a reverse primer, and two assay probes (or hybridization oligos) are employed. The forward and reverse primers are employed to amplify genetic loci that comprise SNPs that are associated with ASR resistance loci (for example, any of the favorable alleles as shown in Tables 1-5). The particular nucleotides that are present at the SNP positions are then assayed using the assay primers (which in some embodiments are differentially labeled with, for example, fluorophores to permit distinguishing between the two assay probes in a single reaction), which in each pair differ from each other with respect to the nucleotides that are present at the SNP position (although it is noted that in any given pair, the probes can differ in their 5' or 3' ends without impacting their abilities to differentiate between nucleotides present at the corresponding SNP positions). In some embodiments, the assay primers and the reaction conditions are designed such that an assay primer will only hybridize to the reverse complement of a 100% perfectly matched sequence, thereby permitting identification of which allele(s) that are present based upon detection of hybridizations.

Compositions and methods for identifying, selecting and producing *Glycine* plants (including wild Glycines (e.g. *Glycine tomentella*) and *Glycine max* lines) with enhanced disease resistance are provided. Disease resistant soybean plants and germplasms are also provided.

In some embodiments, methods of identifying a disease resistant soybean plant or germplasm are provided. Such methods may comprise detecting, in the soybean plant or germplasm, a genetic loci or molecular marker (e.g. SNP or a Quantitative Trait Loci (QTL)) associated with enhanced disease resistance, in particular ASR resistance. In some embodiments the genetic loci or molecular marker associates with the presence of a chromosomal interval comprising the nucleotide sequence or a portion thereof of SEQ ID NOs 1, 2, 3, 4 or 5, wherein the portion thereof associates with ASR resistance.

In some embodiments, methods of producing a disease resistant soybean plant are provided. Such methods may comprise detecting, in a soybean plant or germplasm, the presence of a genetic loci and/or a genetic marker associated with enhanced pathogen resistance (e.g. ASR) and producing a progeny plant from said soybean germplasm.

In some embodiments, methods of selecting a disease resistant soybean plant or germplasm are provided. Such methods may comprise crossing a first soybean plant or germplasm with a second soybean plant or germplasm, wherein the first soybean plant or germplasm comprises a genetic loci derived from any one of plant accessions PI441001, PI441008, PI446958, PI509501, PI583970, PI483224, or a progeny plant thereof comprising any one of SEQ ID NOs 1, 2, 3, 4 or 5 or a portion thereof associated with enhanced disease and/or ASR resistance, and/or tolerance, and selecting a progeny plant or germplasm that possesses the genetic loci.

In some embodiments, methods of introgressing a genetic loci derived from soybean accession numbers PI441001, PI441008, PI446958, PI509501, PI583970, or PI483224 associated with enhanced pathogen resistance into a soybean plant or germplasm are provided. Such methods may comprise crossing a first soybean plant or germplasm comprising a chromosomal interval (e.g. SEQ ID Nos: 1, 2, 3, 4 or 5) derived from soybean accession number PI441001, PI441008, PI446958, PI509501, PI583970, or PI483224 associated with enhanced pathogen resistance with a second soybean plant or germplasm that lacks said genetic loci and optionally repeatedly backcrossing progeny plants comprising said genetic allele with the second soybean plant or germplasm to produce an soybean plant (e.g. *Glycine max*) or germplasm with enhanced pathogen resistance comprising the chromosomal interval derived from soybean accession number PI441001, PI441008, PI446958, PI509501, PI583970, or PI483224 associated with enhanced ASR resistance. Progeny comprising the chromosomal interval associated with enhanced pathogen resistance may be identified by detecting, in their genomes, the presence of a marker associated with or genetically linked to said chromosomal interval derived from soybean accession number PI441001, PI441008, PI446958, PI509501, PI583970, or PI483224 wherein said chromosomal interval comprises SEQ ID NOs 1, 2, 3, 4 or 5 or a portion thereof and the marker can be any of the favorable alleles as described in Tables 1-5. R-Genes from PI441001, PI441008, PI446958, PI509501, PI583970, or PI483224 can be introgressed into a *Glycine max* line through the use of embryo rescue methods known by those skilled in the art for example as is disclosed in U.S. Pat. No. 7,842,850 herein incorporated by reference and through methods as described in the working Examples herein, describing a alternative method of embryo rescue.

Soybean plants and/or germplasms identified, produced or selected by the methods of this invention are also provided, as are any progeny and/or seeds derived from a soybean plant or germplasm identified, produced or selected by these methods. In one embodiment molecular markers associating with the presence of a chromosomal intervals depicted in any one of SEQ ID NOs 1, 2, 3, 4 or 5 may be used to identify or select for plant lines resistant to ASR. Further said molecular markers may be located within 20 cM, 10 cM, 5 cM, 4 cM, 3 cM, 2 cM, and 1 cM of said chromosomal interval or from any respective favorable allele associated with ASR resistance as depicted in any one of Tables 1-5. In another embodiment, said molecular marker may be located within 20 cM, 10 cM, 5 cM, 4 cM, 3 cM, 2 cM, 1 cM of any SNP markers associated with ASR as described in any one of Tables 1-5.

Non-naturally occurring soybean seeds, plants and/or germplasms comprising one or genetic loci derived from plant accession number PI441001, PI441008, PI446958, PI509501, PI583970, or PI483224 (herein, 'PI441001', 'PI441008', 'PI446958', PI509501", 'PI583970', or 'PI483224') associated with enhanced pathogen resistance (e.g. ASR, Cyst Nematode, Phytophthora, etc.) are also provided. In specific embodiments said genetic loci comprise SEQ ID NOs 1, 2, 3, 4 or 5 and/or any favorable alleles as depicted in Tables 1-5.

A marker associated with enhanced pathogen resistance, more specifically ASR, may comprise, consist essentially of or consist of a single allele or a combination of alleles at one or more genetic loci derived from PI441001, PI441008, PI446958, PI509501, PI583970, or PI483224 that associate with enhanced pathogen (ASR) resistance. In one embodiment the marker is within a chromosomal interval as described by SEQ ID NOs 1, 2, 3, 4 or 5. In another embodiment the marker is any one of the favorable alleles as depicted in Tables 1-5.

The foregoing and other objects and aspects of the present invention are explained in detail in the drawings and specification set forth below.

BRIEF DESCRIPTION OF THE DRAWINGS

FIG. 1 shows a depiction of *Glycine tomentella* SNPs associated with ASR resistance on *Glycine tomentella* genomic scaffolding located on chromosome 5.

FIG. 2 shows a mapping interval 0.023-1.16 Mb on Scaffold 49652 associated with ASR resistance.

FIG. 3 shows a mapping interval 0.02-1.19 Mb on Scaffold 46840 associated with ASR resistance.

FIG. 4 is a marker association map for *Glycine tomentella* (PI441001) where bands indicate regions/intervals of respective chromosomes associated with ASR resistance.

FIG. 5 illustrates the rust rating scale used to measure plant phenotype.

FIG. 6 shows chromosome mapping for ASR resistance QTL for *Glycine tomentella* PI583970.

FIG. 7 is a marker association map for *Glycine tomentella* (PI583970) where bands indicate regions/intervals of respective chromosomes associated with ASR resistance.

FIG. 8 shows a mapping interval on scaffold 000819F associated with ASR resistance.

FIG. 9 shows chromosome mapping for ASR resistance QTL for *Glycine tomentella* PI483224.

FIG. 10 is a marker association map for *Glycine tomentella* (PI483224) where bands indicate regions/intervals of respective chromosomes associated with ASR resistance.

FIG. 11 shows a mapping interval on scaffold 002687F associated with ASR resistance.

DETAILED DESCRIPTION OF THE INVENTION

The presently disclosed subject matter relates at least in part to the identification of a genomic region (i.e. chromosomal interval(s) on *Glycine tomentella* Chromosome 5) derived from *Glycine tomentella* accession lines PI441001, PI441008, PI446958, PI509501, PI583970, PI483224, PI441008 or progeny thereof associated with enhanced ASR resistance. As such, said chromosomal interval from PI441001, PI441008, PI446958, PI509501, PI583970, PI483224, PI441008 or progeny thereof, may be introgressed into *Glycine max* lines via somatic embryo rescue (see for example U.S. Patent Publication 2007/0261139 and examples herein describing a alternative method of embryo rescue) or through the use of a *Glycine max* donor line having introgressed into its genome the genetic region from PI441001, PI441008, PI583970, or PI483224, wherein the region comprises any one of SEQ ID NO: 1-5 or a portion thereof wherein presence of said genetic region is associated with increased or enhanced disease resistance to, for example, ASR, SCN, Stem termination, Stem Canker, Bacterial pustule, root knot nematode, brown stem rot, Frogeye leaf spot, or phytophthora. In another embodiment a chromosomal interval derived from PI441001, PI441008, PI446958, PI509501, PI583970, or PI483224 is introduced into a *Glycine max* line not comprising said chromosomal interval wherein said introduction confers in the *Glycine max* line or its progeny increased resistances to disease (e.g. ASR) wherein the said chromosome interval is derived from chromosome 5 of *Glycine tomentella* and further wherein said chromosomal interval comprises at least one allele that associates with the trait of increased disease resistance, such as ASR, wherein said allele is any one of the alleles respectively selected from any one as depicted in Tables 1-5.

This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

All references listed below, as well as all references cited in the instant disclosure, including but not limited to all patents, patent applications and publications thereof, scientific journal articles, and database entries (e.g., GENBANK® database entries and all annotations available therein) are incorporated herein by reference in their entireties to the extent that they supplement, explain, provide a background for, or teach methodology, techniques, and/or compositions employed herein.

Definitions

Unless defined otherwise, all technical and scientific terms used herein have the same meaning as commonly understood to one of ordinary skill in the art to which the presently disclosed subject matter belongs.

Although the following terms are believed to be well understood by one of ordinary skill in the art, the following definitions are set forth to facilitate understanding of the presently disclosed subject matter.

As used herein, the terms "a" or "an" or "the" may refer to one or more than one. For example, "a" marker can mean one marker or a plurality of markers.

As used herein, the term "and/or" refers to and encompasses any and all possible combinations of one or more of the associated listed items, as well as the lack of combinations when interpreted in the alternative ("or").

As used herein, the term "about," when used in reference to a measurable value such as an amount of mass, dose, time, temperature, and the like, is meant to encompass variations of up to 10% of the specified amount.

The term "consists essentially of" (and grammatical variants thereof), as applied to a polynucleotide sequence of this invention, means a polynucleotide sequence that consists of both the recited sequence (e.g., SEQ ID NO) and a total of ten or less (e.g., 1, 2, 3, 4, 5, 6, 7, 8, 9, or 10) additional nucleotides on the 5' and/or 3' ends of the recited sequence such that the function of the polynucleotide is not materially altered. The total of ten or less additional nucleotides includes the total number of additional nucleotides on both ends added together. The term "materially altered," as applied to polynucleotides of the invention, refers to an increase or decrease in ability to express the polynucleotide sequence of at least about 50% or more as compared to the expression level of a polynucleotide sequence consisting of the recited sequence.

The term "introduced" as used herein, in connection to a plant, means accomplished by any manner including but not limited to; introgression, transgenic, Clustered Regularly Interspaced Short Palindromic Repeats modification (CRISPR), Transcription activator-like effector nucleases (TALENs) (Feng et al. 2013, Joung & Sander 2013), meganucleases, or zinc finger nucleases (ZFNs).

As used herein, the term "wild glycine" refers to a perennial *Glycine* plant, for example any one of *G. canescens, G. argyrea, G. clandestine, G. latrobeana, G. albicans, G. aphyonota, G. arenaria, G. curvata, G. cyrtoloba, G. dolichocarpa, G. falcate, G. gracei, G. hirticaulis, G. lactovirens, G. latifolia, G. microphylla, G. montis-douglas, G. peratosa, G. pescadrensis, G. pindanica, G. pullenii, G. rubiginosa, G. stenophita, G. syndetika*, or *G. tomentella.*

As used herein, the term "allele" refers to one of two or more different nucleotides or nucleotide sequences that occur at a specific locus.

A marker is "associated with" a trait when it is linked to it and when the presence of the marker is an indicator of whether and/or to what extent the desired trait or trait form will occur in a plant/germplasm comprising the marker. Similarly, a marker is "associated with" an allele when it is linked to it and when the presence of the marker is an indicator of whether the allele is present in a plant/germplasm comprising the marker. For example, "a marker associated with enhanced pathogen resistance" refers to a marker whose presence or absence can be used to predict whether and/or to what extent a plant will display a pathogen resistant phenotype (e.g. any favorable SNP allele as described in Tables 1-5 are "associated with" ASR resistance in a soybean plant).

As used herein, the terms "backcross" and "backcrossing" refer to the process whereby a progeny plant is repeatedly crossed back to one of its parents. In a backcrossing scheme, the "donor" parent refers to the parental plant with the desired gene or locus to be introgressed. The "recipient" parent (used one or more times) or "recurrent" parent (used two or more times) refers to the parental plant into which the gene or locus is being introgressed. For example, see Ragot, M. et al. *Marker-assisted Backcrossing: A Practical Example, in* Techniques et Utilisations des Marqueurs Moleculaires LEs Colloques, Vol. 72, pp. 45-56 (1995); and Openshaw et al., *Marker-assisted Selection in Backcross Breeding, in* Proceedings of the Symposium "Analysis of Molecular Marker Data," pp. 41-53 (1994). The initial cross gives rise to the F1 generation. The term "BC1" refers to the second use of the recurrent parent, "BC2" refers to the third use of the recurrent parent, and so on.

A centimorgan ("cM") is a unit of measure of recombination frequency. One cM is equal to a 1% chance that a marker at one genetic locus will be separated from a marker at a second locus due to crossing over in a single generation.

As used herein, the term "chromosomal interval defined by and including," used in reference to particular loci and/or alleles, refers to a chromosomal interval delimited by and encompassing the stated loci/alleles.

As used herein, the terms "cross" or "crossed" refer to the fusion of gametes via pollination to produce progeny (e.g., cells, seeds or plants). The term encompasses both sexual crosses (the pollination of one plant by another) and selfing (self-pollination, e.g., when the pollen and ovule are from the same plant). The term "crossing" refers to the act of fusing gametes via pollination to produce progeny.

As used herein, the terms "cultivar" and "variety" refer to a group of similar plants that by structural or genetic features and/or performance can be distinguished from other varieties within the same species.

As used herein, the terms "desired allele", "favorable allele" and "allele of interest" are used interchangeably to refer to an allele associated with a desired trait (e.g. ASR resistance).

As used herein, the terms "enhanced pathogen resistance" or "enhanced disease resistance" refers to an improvement, enhancement, or increase in a plant's ability to endure and/or thrive despite being infected with a disease (e.g. Asian soybean rust) as compared to one or more control plants (e.g., one or both of the parents, or a plant lacking a marker associated with enhanced pathogen resistance to respective pathogen/disease). Enhanced disease resistance includes any mechanism (other than whole-plant immunity or resistance) that reduces the expression of symptoms indicative of infection for a respective disease such as Asian soybean rust, soybean cyst nematode, *Phytophthora*, etc.

An "elite line" or "elite strain" is an agronomically superior line that has resulted from many cycles of breeding and selection for superior agronomic performance. Numerous elite lines are available and known to those of skill in the art of soybean breeding. An "elite population" is an assortment of elite individuals or lines that can be used to represent the state of the art in terms of agronomically superior genotypes of a given crop species, such as soybean. Similarly, an "elite germplasm" or elite strain of germplasm is an agronomically superior germplasm, typically derived from and/or capable of giving rise to a plant with superior agronomic performance, such as an existing or newly developed elite line of soybean.

An "elite" plant is any plant from an elite line, such that an elite plant is a representative plant from an elite variety. Non-limiting examples of elite soybean varieties that are commercially available to farmers or soybean breeders include: AG00802, A0868, AG0902, A1923, AG2403, A2824, A3704, A4324, A5404, AG5903, AG6202 AG0934; AG1435; AG2031; AG2035; AG2433; AG2733; AG2933; AG3334; AG3832; AG4135; AG4632; AG4934; AG5831; AG6534; and AG7231 (Asgrow Seeds, Des Moines, Iowa, USA); BPR0144RR, BPR 4077NRR and BPR 4390NRR (Bio Plant Research, Camp Point, Ill., USA); DKB17-51 and DKB37-51 (DeKalb Genetics, DeKalb, Ill., USA); DP 4546 RR, and DP 7870 RR (Delta & Pine Land Company, Lubbock, Tex., USA); JG 03R501, JG 32R606C ADD and JG 55R503C (JGL Inc., Greencastle, Ind., USA); NKS 13-K2 (NK Division of Syngenta Seeds, Golden Valley, Minn., USA); 90M01, 91M30, 92M33, 93M11, 94M30, 95M30, 97B52, P008T22R2; P16T17R2; P22T69R; P25T51R; P34T07R2; P35T58R; P39T67R; P47T36R; P46T21R; and P56T03R2 (Pioneer Hi-Bred International, Johnston, Iowa, USA); SG4771NRR and SG5161NRR/STS (Soygenetics, LLC, Lafayette, Ind., USA); S00-K5, S11-L2, S28-Y2, S43-B1, S53-A1, S76-L9, S78-G6, S0009-M2; S007-Y4; 504-D3; S14-A6; S20-T6; S21-M7; S26-P3; S28-N6; S30-V6; S35-C3; S36-Y6; S39-C4; S47-K5; S48-D9; S52-Y2; S58-Z4; S67-R6; S73-S8; and S78-G6 (Syngenta Seeds, Henderson, Ky., USA); Richer (Northstar Seed Ltd. Alberta, Calif.); 14RD62 (Stine Seed Co. Ia., USA); or Armor 4744 (Armor Seed, LLC, Ar., USA).

The terms "agronomically elite" as used herein, means a genotype that has a culmination of many distinguishable traits such as emergence, vigor, vegetative vigor, disease resistance, seed set, standability, yield and threshability which allows a producer to harvest a product of commercial significance.

As used herein, the term "commercially significant yield" or "agronomically acceptable yield" refers to a grain yield of at least 100% of a commercial check variety such as AG2703 or DKB23-51.

As used herein, the terms "exotic," "exotic line" and "exotic germplasm" refer to any plant, line or germplasm that is not elite. In general, exotic plants/germplasms are not derived from any known elite plant or germplasm, but rather are selected to introduce one or more desired genetic elements into a breeding program (e.g., to introduce novel alleles into a breeding program).

A "genetic map" is a description of genetic linkage relationships among loci on one or more chromosomes within a given species, generally depicted in a diagrammatic or tabular form. For each genetic map, distances between loci are measured by the recombination frequencies between them. Recombinations between loci can be detected using a variety of markers. A genetic map is a product of the mapping population, types of markers used, and the polymorphic potential of each marker between different populations. The order and genetic distances between loci can differ from one genetic map to another.

As used herein, the term "genotype" refers to the genetic constitution of an individual (or group of individuals) at one or more genetic loci, as contrasted with the observable and/or detectable and/or manifested trait (the phenotype). Genotype is defined by the allele(s) of one or more known loci that the individual has inherited from its parents. The term genotype can be used to refer to an individual's genetic constitution at a single locus, at multiple loci, or more generally, the term genotype can be used to refer to an individual's genetic make-up for all the genes in its genome. Genotypes can be indirectly characterized, e.g., using markers and/or directly characterized by nucleic acid sequencing.

As used herein, the term "germplasm" refers to genetic material of or from an individual (e.g., a plant), a group of individuals (e.g., a plant line, variety or family), or a clone derived from a line, variety, species, or culture. The germplasm can be part of an organism or cell, or can be separate from the organism or cell. In general, germplasm provides genetic material with a specific molecular makeup that provides a physical foundation for some or all of the hereditary qualities of an organism or cell culture. As used herein, germplasm may refer to seeds, cells (including protoplasts and calli) or tissues from which new plants may be grown, as well as plant parts that can be cultured into a whole plant (e.g., stems, buds, roots, leaves, etc.).

A "haplotype" is the genotype of an individual at a plurality of genetic loci, i.e., a combination of alleles. Typically, the genetic loci that define a haplotype are physically and genetically linked, i.e., on the same chromosome segment. The term "haplotype" can refer to polymorphisms at a particular locus, such as a single marker locus, or polymorphisms at multiple loci along a chromosomal segment.

As used herein, the term "heterozygous" refers to a genetic status wherein different alleles reside at corresponding loci on homologous chromosomes.

As used herein, the term "homozygous" refers to a genetic status wherein identical alleles reside at corresponding loci on homologous chromosomes.

As used herein, the term "hybrid" refers to a seed and/or plant produced when at least two genetically dissimilar parents are crossed.

As used herein, the term "inbred" refers to a substantially homozygous plant or variety. The term may refer to a plant or variety that is substantially homozygous throughout the entire genome or that is substantially homozygous with respect to a portion of the genome that is of particular interest.

As used herein, the term "indel" refers to an insertion or deletion in a pair of nucleotide sequences, wherein a first sequence may be referred to as having an insertion relative to a second sequence or the second sequence may be referred to as having a deletion relative to the first sequence.

As used herein, the terms "introgression," "introgressing" and "introgressed" refer to both the natural and artificial transmission of a desired allele or combination of desired alleles of a genetic locus or genetic loci from one genetic background to another. For example, a desired allele at a specified locus can be transmitted to at least one progeny via a sexual cross between two parents of the same species, where at least one of the parents has the desired allele in its genome. Alternatively, for example, transmission of an allele can occur by recombination between two donor genomes, e.g., in a fused protoplast, where at least one of the donor protoplasts has the desired allele in its genome. The desired allele may be a selected allele of a marker, a QTL, a transgene, or the like. Offspring comprising the desired allele can be repeatedly backcrossed to a line having a desired genetic background and selected for the desired allele, with the result being that the desired allele becomes fixed in the desired genetic background. For example, a marker associated with enhanced ASR tolerance may be introgressed from a donor into a recurrent parent that is not disease resistant. The resulting offspring could then be repeatedly backcrossed and selected until the progeny possess the ASR tolerance allele(s) in the recurrent parent background.

As used herein, the term "linkage" refers to the degree with which one marker locus is associated with another marker locus or some other locus (for example, an ASR tolerance locus). The linkage relationship between a molecular marker and a phenotype may be given as a "probability" or "adjusted probability." Linkage can be expressed as a desired limit or range. For example, in some embodiments, any marker is linked (genetically and physically) to any other marker when the markers are separated by less than about 50, 40, 30, 25, 20, or 15 map units (or cM). For example, embodiments of the invention herein, provide for marker loci closely linked to ASR resistant chromosomal intervals comprising a nucleotide sequence of any one of SEQ ID NOs 1-5.

In some aspects of the present invention, it is advantageous to define a bracketed range of linkage, for example, from about 10 cM and about 20 cM, from about 10 cM and about 30 cM, or from about 10 cM and about 40 cM. The more closely a marker is linked to a second locus, the better an indicator for the second locus that marker becomes. Thus, "closely linked loci" such as a marker locus and a second locus display an inter-locus recombination frequency of about 10%, 9%, 8%, 7%, 6%, 5%, 4%, 3%, or 2% or less. In some embodiments, the relevant loci display a recombination frequency of about 1% or less, e.g., about 0.75%, 0.5%, 0.25% or less. Two loci that are localized to the same chromosome, and at such a distance that recombination between the two loci occurs at a frequency of less than about 10% (e.g., about 9%, 8%, 7%, 6%, 5%, 4%, 3%, 2%, 1%, 0.75%, 0.5%, or 0.25%, or less) may also be said to be "proximal to" each other. Since one cM is the distance between two markers that show a 1% recombination frequency, any marker is closely linked (genetically and physically) to any other marker that is in close proximity, e.g., at or less than about 10 cM distant. Two closely linked markers on the same chromosome may be positioned about 9, 8, 7, 6, 5, 4, 3, 2, 1, 0.75, 0.5 or 0.25 cM or less from each other.

As used herein, the term "linkage disequilibrium" refers to a non-random segregation of genetic loci or traits (or both). In either case, linkage disequilibrium implies that the relevant loci are within sufficient physical proximity along a length of a chromosome so that they segregate together with greater than random (i.e., non-random) frequency (in the case of co-segregating traits, the loci that underlie the traits are in sufficient proximity to each other). Markers that show linkage disequilibrium are considered linked. Linked loci co-segregate more than 50% of the time, e.g., from about 51% to about 100% of the time. In other words, two markers that co-segregate have a recombination frequency of less than 50% (and, by definition, are separated by less than 50 cM on the same chromosome). As used herein, linkage can be between two markers, or alternatively between a marker and a phenotype. A marker locus can be "associated with" (linked to) a trait, e.g., Asian Soybean Rust. The degree of linkage of a molecular marker to a phenotypic trait is measured, e.g., as a statistical probability of co-segregation of that molecular marker with the phenotype.

Linkage disequilibrium is most commonly assessed using the measure $r^2$, which is calculated using the formula described by Hill and Robertson, *Theor. Appl. Genet.* 38:226 (1968). When $r^2=1$, complete linkage disequilibrium exists between the two marker loci, meaning that the markers have not been separated by recombination and have the same allele frequency. Values for $r^2$ above ⅓ indicate sufficiently strong linkage disequilibrium to be useful for mapping. Ardlie et al., *Nature Reviews Genetics* 3:299 (2002). Hence, alleles are in linkage disequilibrium when $r^2$ values between pairwise marker loci are greater than or equal to about 0.33, 0.4, 0.5, 0.6, 0.7, 0.8, 0.9, or 1.0.

As used herein, the term "linkage equilibrium" describes a situation where two markers independently segregate, i.e., sort among progeny randomly. Markers that show linkage equilibrium are considered unlinked (whether or not they lie on the same chromosome).

A "locus" is a position on a chromosome where a gene or marker or allele is located. In some embodiments, a locus may encompass one or more nucleotides.

As used herein, the terms "marker" and "genetic marker" are used interchangeably to refer to a nucleotide and/or a nucleotide sequence that has been associated with a phenotype, trait or trait form. In some embodiments, a marker may be associated with an allele or alleles of interest and may be indicative of the presence or absence of the allele or alleles of interest in a cell or organism. A marker may be, but is not limited to, an allele, a gene, a haplotype, a restriction fragment length polymorphism (RFLP), a simple sequence repeat (SSR), random amplified polymorphic DNA (RAPD), cleaved amplified polymorphic sequences (CAPS) (Rafalski and Tingey, *Trends in Genetics* 9:275 (1993)), an amplified fragment length polymorphism (AFLP) (Vos et al., *Nucleic Acids Res.* 23:4407 (1995)), a single nucleotide polymorphism (SNP) (Brookes, *Gene* 234:177 (1993)), a sequence-characterized amplified region (SCAR) (Paran and Michelmore, *Theor. Appl. Genet.* 85:985 (1993)), a sequence-tagged site (STS) (Onozaki et al., *Euphytica* 138: 255 (2004)), a single-stranded conformation polymorphism (SSCP) (Orita et al., *Proc. Natl. Acad. Sci. USA* 86:2766 (1989)), an inter-simple sequence repeat (ISSR) (Blair et al., *Theor. Appl. Genet.* 98:780 (1999)), an inter-retrotransposon amplified polymorphism (IRAP), a retrotransposon-microsatellite amplified polymorphism (REMAP) (Kalendar et al., *Theor. Appl. Genet.* 98:704 (1999)), a chromosome interval, or an RNA cleavage product (such as a Lynx tag). A marker may be present in genomic or expressed nucleic acids (e.g., ESTs). The term marker may also refer to nucleic acids used as probes or primers (e.g., primer pairs) for use in amplifying, hybridizing to and/or detecting nucleic acid molecules according to methods well known in the art. A large number of soybean molecular markers are known in the art, and are published or available from various sources, such as the SoyBase internet resource.

Markers corresponding to genetic polymorphisms between members of a population can be detected by methods well-established in the art. These include, e.g., nucleic acid sequencing, hybridization methods, amplification methods (e.g., PCR-based sequence specific amplification methods), detection of restriction fragment length polymorphisms (RFLP), detection of isozyme markers, detection of polynucleotide polymorphisms by allele specific hybridization (ASH), detection of amplified variable sequences of the plant genome, detection of self-sustained sequence replication, detection of simple sequence repeats (SSRs), detection of single nucleotide polymorphisms (SNPs), and/or detection of amplified fragment length polymorphisms (AFLPs). Well established methods are also known for the detection of expressed sequence tags (ESTs) and SSR markers derived from EST sequences and randomly amplified polymorphic DNA (RAPD).

A "marker allele," also described as an "allele of a marker locus," can refer to one of a plurality of polymorphic nucleotide sequences found at a marker locus in a population that is polymorphic for the marker locus.

"Marker-assisted selection" (MAS) is a process by which phenotypes are selected based on marker genotypes. In some embodiments, marker genotypes are used to identify plants that will be selected for a breeding program or for planting. In some embodiments, marker genotypes are used to identify plants that will not be selected for a breeding program or for planting (i.e., counter-selected plants), allowing them to be removed from the breeding/planting population.

As used herein, the terms "marker locus" and "marker loci" refer to a specific chromosome location or locations in the genome of an organism where a specific marker or markers can be found. A marker locus can be used to track the presence of a second linked locus, e.g., a linked locus that encodes or contributes to expression of a phenotypic trait. For example, a marker locus can be used to monitor segregation of alleles at a locus, such as a QTL or single gene, that are genetically or physically linked to the marker locus.

As used herein, the terms "marker probe" and "probe" refer to a nucleotide sequence or nucleic acid molecule that can be used to detect the presence of one or more particular alleles within a marker locus (e.g., a nucleic acid probe that is complementary to all of or a portion of the marker or marker locus, through nucleic acid hybridization). Marker probes comprising about 8, 10, 15, 20, 30, 40, 50, 60, 70, 80, 90, 100 or more contiguous nucleotides may be used for nucleic acid hybridization. Alternatively, in some aspects, a marker probe refers to a probe of any type that is able to distinguish (i.e., genotype) the particular allele that is present at a marker locus.

As used herein, the terms "molecular marker" or "genetic marker" may be used to refer to a genetic marker, as defined above, or an encoded product thereof (e.g., a protein) used as a point of reference when identifying a linked locus. A molecular marker can be derived from genomic nucleotide sequences or from expressed nucleotide sequences (e.g., from a spliced RNA, a cDNA, etc.). The term also refers to nucleotide sequences complementary to or flanking the marker sequences, such as nucleotide sequences used as probes and/or primers capable of amplifying the marker sequence. Nucleotide sequences are "complementary" when they specifically hybridize in solution, e.g., according to Watson-Crick base pairing rules. Some of the markers described herein are also referred to as hybridization markers when located on an indel region. This is because the insertion region is, by definition, a polymorphism vis-ã-vis a plant without the insertion. Thus, the marker need only indicate whether the indel region is present or absent. Any suitable marker detection technology may be used to identify such a hybridization marker, e.g., SNP technology is used in the examples provided herein.

A "non-naturally occurring variety of soybean" is any variety of soybean that does not naturally exist in nature. A "non-naturally occurring variety of soybean" may be produced by any method known in the art, including, but not limited to, transforming a soybean plant or germplasm, transfecting a soybean plant or germplasm and crossing a naturally occurring variety of soybean with a non-naturally occurring variety of soybean. In some embodiments, a "non-naturally occurring variety of soybean" may comprise one of more heterologous nucleotide sequences. In some embodiments, a "non-naturally occurring variety of soybean" may comprise one or more non-naturally occurring copies of a naturally occurring nucleotide sequence (i.e., extraneous copies of a gene that naturally occurs in soybean). In some embodiments, a "non-naturally occurring variety of soybean" may comprise a non-natural combination of two or more naturally occurring nucleotide sequences (i.e., two or more naturally occurring genes that do not naturally occur in the same soybean, for instance genes not found in *Glycine max* lines).

As used herein, the term "primer" refers to an oligonucleotide which is capable of annealing to a nucleic acid target and serving as a point of initiation of DNA synthesis when placed under conditions in which synthesis of a primer extension product is induced (e.g., in the presence of nucleotides and an agent for polymerization such as DNA polymerase and at a suitable temperature and pH). A primer (in some embodiments an extension primer and in some embodiments an amplification primer) is in some embodiments single stranded for maximum efficiency in extension and/or amplification. In some embodiments, the primer is an oligodeoxyribonucleotide. A primer is typically sufficiently long to prime the synthesis of extension and/or amplification products in the presence of the agent for polymerization. The minimum length of the primer can depend on many factors, including, but not limited to temperature and composition (A/T vs. G/C content) of the primer. In the context of amplification primers, these are typically provided as a pair of bi-directional primers consisting of one forward and one reverse primer or provided as a pair of forward primers as commonly used in the art of DNA amplification such as in PCR amplification. As such, it will be understood that the term "primer," as used herein, can refer to more than one primer, particularly in the case where there is some ambiguity in the information regarding the terminal sequence(s) of the target region to be amplified. Hence, a "primer" can include a collection of primer oligonucleotides containing sequences representing the possible variations in the sequence or includes nucleotides which allow a typical base pairing. Primers can be prepared by any suitable method known in the art. Methods for preparing oligonucleotides of specific sequence are known in the art, and include, for example, cloning and restriction of appropriate sequences and direct chemical synthesis. Chemical synthesis methods can include, for example, the phospho di- or tri-ester method, the diethylphosphoramidate method and the solid support method disclosed in U.S. Pat. No. 4,458,066. Primers can be labeled, if desired, by incorporating detectable moieties by for instance spectroscopic, fluorescence, photochemical, biochemical, immunochemical, or chemical moieties. Primers diagnostic (i.e. able to identify or select based on presence of ASR resistant alleles) for ASR resistance can be created to any favorable SNP as described in any one of Tables 1-5. The PCR method is well described in handbooks and known to the skilled person. After amplification by PCR, target polynucleotides can be detected by hybridization with a probe polynucleotide, which forms a stable hybrid with the target sequence under stringent to moderately stringent hybridization and wash conditions. If it is expected that the probes are essentially completely complementary (i.e., about 99% or greater) to the target sequence, stringent conditions can be used. If some mismatching is expected, for example if variant strains are expected with the result that the probe will not be completely complementary, the stringency of hybridization can be reduced. In some embodiments, conditions are chosen to rule out non-specific/adventitious binding. Conditions that affect hybridization, and that select against non-specific binding are known in the art, and are described in, for example, Sambrook & Russell (2001). Molecular Cloning: A Laboratory Manual, Third Edition, Cold Spring Harbor Laboratory Press, Cold Spring Harbor, N.Y., United States of America. Generally, lower salt concentration and higher temperature hybridization and/or washes increase the stringency of hybridization conditions.

As used herein, the terms "phenotype," "phenotypic trait" or "trait" refer to one or more traits and/or manifestations of an organism. The phenotype can be a manifestation that is observable to the naked eye, or by any other means of evaluation known in the art, e.g., microscopy, biochemical analysis, or an electromechanical assay. In some cases, a phenotype or trait is directly controlled by a single gene or genetic locus, i.e., a "single gene trait." In other cases, a phenotype or trait is the result of several genes. It is noted that, as used herein, the term "disease resistant phenotype" takes into account environmental conditions that might affect the respective disease such that the effect is real and reproducible.

As used herein, the term "plant" may refer to a whole plant, any part thereof, or a cell or tissue culture derived from a plant. Thus, the term "plant" can refer to any of: whole plants, plant components or organs (e.g., roots, stems, leaves, buds, flowers, pods, etc.), plant tissues, seeds and/or plant cells. A plant cell is a cell of a plant, taken from a plant, or derived through culture from a cell taken from a plant. Thus, the term "soybean plant" may refer to a whole soybean plant, one or more parts of a soybean plant (e.g., roots, root tips, stems, leaves, buds, flowers, pods, seeds, cotyledons, etc.), soybean plant cells, soybean plant protoplasts and/or soybean plant calli.

As used herein, the term "plant part" includes but is not limited to embryos, pollen, seeds, leaves, flowers (including but not limited to anthers, ovules and the like), fruit, stems or branches, roots, root tips, cells including cells that are intact in plants and/or parts of plants, protoplasts, plant cell tissue cultures, plant calli, plant clumps, and the like. Thus, a plant part includes soybean tissue culture from which soybean plants can be regenerated. Further, as used herein, "plant cell" refers to a structural and physiological unit of the plant, which comprises a cell wall and also may refer to a protoplast. A plant cell of the present invention can be in the form of an isolated single cell or can be a cultured cell or can be a part of a higher-organized unit such as, for example, a plant tissue or a plant organ.

As used herein, the term "polymorphism" refers to a variation in the nucleotide sequence at a locus, where said variation is too common to be due merely to a spontaneous mutation. A polymorphism can be a single nucleotide polymorphism (SNP) or an insertion/deletion polymorphism, also referred to herein as an "indel." Additionally, the variation can be in a transcriptional profile or a methylation pattern. The polymorphic site or sites of a nucleotide sequence can be determined by comparing the nucleotide sequences at one or more loci in two or more germplasm entries.

As used herein, the terms "closely linked" refers to linked markers displaying a cross over frequency with a given marker of about 10% or less (e.g. the given marker is within about 10 cM of a closely linked ASR marker). Put another way, closely linked loci co-segregate at least about 90% of the time. With regard to physical position on a chromosome, closely linked markers can be separated, for example, by about 1 megabase (Mb; 1 million nucleotides), about 500 kilobases (Kb; 1000 nucleotides), about 400 Kb, about 300 Kb, about 200 Kb, about 100 Kb, about 50 Kb, about 25 Kb, about 10 Kb, about 5 Kb, about 4 Kb, about 3 Kb, about 2 Kb, about 1 Kb, about 500 nucleotides, about 250 nucleotides, or less.

As used herein, the term "population" refers to a genetically heterogeneous collection of plants sharing a common genetic derivation.

As used herein, the terms "progeny" and "progeny plant" refer to a plant generated from a vegetative or sexual reproduction from one or more parent plants. A progeny plant may be obtained by cloning or selfing a single parent plant, or by crossing two parental plants.

As used herein, the term "reference sequence" refers to a defined nucleotide sequence used as a basis for nucleotide sequence comparison. The reference sequence for a marker, for example, is obtained by genotyping a number of lines at the locus or loci of interest, aligning the nucleotide sequences in a sequence alignment program, and then obtaining the consensus sequence of the alignment. Hence, a reference sequence identifies the polymorphisms in alleles at a locus. A reference sequence may not be a copy of an actual nucleic acid sequence from any particular organism; however, it is useful for designing primers and probes for actual polymorphisms in the locus or loci.

As used herein, the terms "disease tolerance" and "disease resistant" refer to a plant's ability to endure and/or thrive despite being infected with a respective disease. When used in reference to germplasm, the terms refer to the ability of a plant that arises from that germplasm to endure and/or thrive despite being infected with a respective disease. In some embodiments, infected Disease resistant soybean plants may yield as well (or nearly as well) as uninfected soybean plants. In general, a plant or germplasm is labeled as "Disease resistant" if it displays "enhanced pathogen resistance."

An "unfavorable allele" of a marker is a marker allele that segregates with the unfavorable plant phenotype, therefore providing the benefit of identifying plants that can be removed from a breeding program or planting. For instance, one could eliminate from a plant breeding program plant lines carrying unfavorable alleles for ASR resistance.

"PI441001, PI441008, PI583970, or PI483224," refers to *Glycine tomentella* plant accession number PI441001, PI441008, PI583970, or PI483224.

Genetic Mapping

Genetic loci correlating with particular phenotypes, such as disease resistance, can be mapped in an organism's genome. By identifying a marker or cluster of markers that co-segregate with a trait of interest, the breeder is able to rapidly select a desired phenotype by selecting for the proper marker (a process called marker-assisted selection, or "MAS"). Such markers may also be used by breeders to design genotypes in silico and to practice whole genome selection.

The present invention provides markers associated with enhanced disease resistance. Detection of these markers and/or other linked markers can be used to identify, select and/or produce disease resistant, more specifically ASR resistant, plants and/or to eliminate plants that are not disease resistant from breeding programs or planting.

*Glycine tomentella* Genetic Loci Associated with Enhanced Disease Resistance Markers associated with enhanced disease resistance are identified herein (see Tables 1-5 indicating favorable markers associated with enhanced ASR resistance). A marker of the present invention may comprise a single allele or a combination of alleles at one or more genetic loci (for example, any combination of a favorable markers from Tables 1-5). For example, the marker may comprise one or more marker alleles located within a first chromosomal interval (e.g. SEQ ID NO: 1) and one or more marker alleles located within a second chromosomal interval (e.g. SEQ ID NO: 2).

Marker-Assisted Selection

Markers can be used in a variety of plant breeding applications. See, e.g., Staub et al., *Hortscience* 31: 729 (1996); Tanksley, *Plant Molecular Biology Reporter* 1: 3 (1983). One of the main areas of interest is to increase the efficiency of backcrossing and introgressing genes using marker-assisted selection (MAS). In general, MAS takes advantage of genetic markers that have been identified as having a significant likelihood of co-segregation with a desired trait. Such markers are presumed to be in/near the gene(s) that give rise to the desired phenotype, and their presence indicates that the plant will possess the desired trait. Plants which possess the marker are expected to transfer the desired phenotype to their progeny.

A marker that demonstrates linkage with a locus affecting a desired phenotypic trait provides a useful tool for the selection of the trait in a plant population. This is particularly true where the phenotype is hard to assay or occurs at a late stage in plant development. Since DNA marker assays are less laborious and take up less physical space than field phenotyping, much larger populations can be assayed, increasing the chances of finding a recombinant with the target segment from the donor line moved to the recipient line. The closer the linkage, the more useful the marker, as recombination is less likely to occur between the marker and the gene causing or imparting the trait. Having flanking markers decreases the chances that false positive selection will occur. The ideal situation is to have a marker within the causative gene itself, so that recombination cannot occur between the marker and the gene. Such a marker is called a "perfect marker".

When a gene is introgressed by MAS, it is not only the gene that is introduced but also the flanking regions. Gepts, *Crop Sci* 42:1780 (2002). This is referred to as "linkage drag." In the case where the donor plant is highly unrelated to the recipient plant, these flanking regions carry additional genes that may code for agronomically undesirable traits. This "linkage drag" may also result in reduced yield or other negative agronomic characteristics even after multiple cycles of backcrossing into the elite soybean line. This is also sometimes referred to as "yield drag." The size of the flanking region can be decreased by additional backcrossing, although this is not always successful, as breeders do not have control over the size of the region or the recombination breakpoints. Young et al., *Genetics* 120:579 (1998). In classical breeding, it is usually only by chance that recombinations that contribute to a reduction in the size of the donor segment are selected. Tanksley et al., *Biotechnology* 7: 257 (1989). Even after 20 backcrosses, one might find a sizeable piece of the donor chromosome still linked to the gene being selected. With markers, however, it is possible to select those rare individuals that have experienced recombination near the gene of interest. In 150 backcross plants, there is a 95% chance that at least one plant will have experienced a crossover within 1 cM of the gene, based on a single meiosis map distance. Markers allow for unequivocal identification of those individuals. With one additional backcross of 300 plants, there would be a 95% chance of a crossover within 1 cM single meiosis map distance of the other side of the gene, generating a segment around the target gene of less than 2 cM based on a single meiosis map distance. This can be accomplished in two generations with markers, while it would have required on average 100 generations without markers. See Tanksley et al., supra. When the exact location of a gene is known, flanking markers surrounding the gene can be utilized to select for recombinations in different population sizes. For example, in smaller population sizes, recombinations may be expected further away from the gene, so more distal flanking markers would be required to detect the recombination.

The availability of integrated linkage maps of the soybean genome containing increasing densities of public soybean markers has facilitated soybean genetic mapping and MAS.

Of all the molecular marker types, SNPs are the most abundant and have the potential to provide the highest genetic map resolution. Bhattramakki et al., *Plant Molec. Biol.* 48:539 (2002). SNPs can be assayed in a so-called "ultra-high-throughput" fashion because they do not require large amounts of nucleic acid and automation of the assay is straight-forward. SNPs also have the benefit of being relatively low-cost systems. These three factors together make SNPs highly attractive for use in MAS. Several methods are available for SNP genotyping, including but not limited to, hybridization, primer extension, oligonucleotide ligation, nuclease cleavage, minisequencing and coded spheres. Such methods have been reviewed in various publications: Gut, *Hum. Mutat.* 17:475 (2001); Shi, *Clin. Chem.* 47:164 (2001); Kwok, Pharmacogenomics 1:95 (2000); Bhattramakki and Rafalski, *Discovery and application of single nucleotide polymorphism markers in plants, in* PLANT GENOTYPING: THE DNA FINGERPRINTING OF PLANTS, CABI Publishing, Wallingford (2001). A wide range of commercially available technologies utilize these and other methods to interrogate SNPs, including Masscode™ (Qiagen, Germantown, Md.), Invader® (Hologic, Madison, Wis.), SnapShot® (Applied Biosystems, Foster City, Calif.), Taqman® (Applied Biosystems, Foster City, Calif.) and Beadarrays™ (Illumina, San Diego, Calif.).

A number of SNP alleles together within a sequence, or across linked sequences, can be used to describe a haplotype for any particular genotype. Ching et al., *BMC Genet.* 3:19 (2002); Gupta et al., (2001), Rafalski, *Plant Sci.* 162:329 (2002b). Haplotypes can be more informative than single SNPs and can be more descriptive of any particular genotype. For example, a single SNP may be allele "T" for a specific Disease resistant line or variety, but the allele "T" might also occur in the soybean breeding population being utilized for recurrent parents. In this case, a combination of alleles at linked SNPs may be more informative. Once a unique haplotype has been assigned to a donor chromosomal region, that haplotype can be used in that population or any subset thereof to determine whether an individual has a particular gene. The use of automated high throughput marker detection platforms known to those of ordinary skill in the art makes this process highly efficient and effective.

The markers of the present invention can be used in marker-assisted selection protocols to identify and/or select progeny with enhanced Asian soybean rust resistance. Such methods can comprise, consist essentially of or consist of crossing a first soybean plant or germplasm with a second soybean plant or germplasm, wherein the first soybean plant or germplasm comprises a chromosomal interval derived from PI441001, PI441008, PI446958, PI509501, PI583970, or PI483224 wherein said chromosomal interval corresponds with nucleotide base 1 to nucleotide base 1251375 of SEQ ID NO: 1 or wherein the chromosomal interval corresponds with nucleotide base 1 to nucleotide base 2515428 of SEQ ID NO: 2, and selecting a progeny plant that possesses the marker. Either of the first and second soybean plants, or both, may be of a non-naturally occurring variety of soybean. In some embodiments, the second soybean plant or germplasm is of an elite variety of soybean. In some embodiments, the genome of the second soybean plant or germplasm is at least about 50%, 55%, 60%, 65%, 70%, 75%, 80%, 85%, 90%, 95%, 97%, 99% or 100% identical to that of an elite variety of soybean. In another embodiment, the first soybean plant comprises the chromosomal interval a chromosomal interval derived from PI441001, PI441008, PI446958, PI509501, PI583970, or PI483224 wherein said chromosomal interval corresponds with nucleotide base 1 to nucleotide base 1251375 of SEQ ID NO: 1 or wherein the chromosomal interval corresponds with nucleotide base 1 to nucleotide base 2515428 of SEQ ID NO: 2 wherein the chromosome interval further comprises at least one allele as depicted in any of Tables 1-5

Methods for identifying and/or selecting a disease resistant soybean plant or germplasm may comprise, consist essentially of or consist of detecting the presence of a marker associated with enhanced ASR tolerance. The marker may be detected in any sample taken from the plant or germplasm, including, but not limited to, the whole plant or germplasm, a portion of said plant or germplasm (e.g., a seed chip, a leaf punch disk or a cell from said plant or germplasm) or a nucleotide sequence from said plant or germplasm. Such a sample may be taken from the plant or germplasm using any present or future method known in the art, including, but not limited to, automated methods of removing a portion of endosperm with a sharp blade, drilling a small hole in the seed and collecting the resultant powder, cutting the seed with a laser and punching a leaf disk. The soybean plant may be of a non-naturally occurring variety of soybean. In some embodiments, the genome of the soybean plant or germplasm is at least about 50%, 55%, 60%, 65%, 70%, 75%, 80%, 85%, 90%, 95%, 97%, 99% or 100% identical to that of an elite variety of soybean.

In some embodiments, the marker detected in the sample may comprise, consist essentially of or consist of one or more marker alleles located within a chromosomal interval selected from the group consisting of:

1) chromosomal interval derived from PI441001, PI441008, PI446958, PI509501, PI583970, or PI483224 wherein said chromosomal interval corresponds with nucleotide base 1 to nucleotide base 1251375 of SEQ ID NO: 1; or
2) chromosomal interval derived from PI441001, PI441008, PI446958, PI509501, PI583970, or PI483224 wherein said chromosomal interval corresponds with nucleotide base 1 to nucleotide base 2515428 of SEQ ID NO: 2; or
3) chromosomal interval derived from PI441001, PI441008, PI446958, PI509501, PI583970, or PI483224 wherein said chromosomal interval corresponds with nucleotide base 1 to nucleotide base 365842 of SEQ ID NO: 3; or
4) chromosomal interval derived from PI441001, PI441008, PI446958, PI509501, PI583970, or PI483224 wherein said chromosomal interval corresponds with nucleotide base 1 to nucleotide base 646429 of SEQ ID NO: 4;
5) chromosomal interval derived from PI441001, PI441008, PI446958, PI509501, PI583970, or PI483224 wherein said chromosomal interval corresponds with nucleotide base 1 to nucleotide base 750080 of SEQ ID NO: 5; or
6) A chromosomal interval spanning 20 cM, 15 cM, 10 cM, 5 cM, 1 cM, 0.5 cM from a SNP marker that associates with increased ASR resistance in soybean wherein the SNP marker is selected from the group consisting of any favorable SNP marker displayed in Tables 1-5.

Methods for producing an disease resistant soybean plant may comprise, consist essentially of or consist of detecting, in a germplasm, a marker associated with enhanced disease resistance (e.g. ASR) wherein said marker is selected from Tables 1-5 or wherein marker is a closely linked loci of any marker described in any one of Tables 1-5 and producing a soybean plant from said germplasm. The marker may be detected in any sample taken from the germplasm, including, but not limited to, a portion of said germplasm (e.g., a seed chip or a cell from said germplasm) or a nucleotide sequence from said germplasm. Such a sample may be taken from the germplasm using any present or future method known in the art, including, but not limited to, automated methods of removing a portion of endosperm with a sharp blade, drilling a small hole in the seed and collecting the resultant powder, cutting the seed with a laser and punching a leaf disk. The germplasm may be of a non-naturally occurring variety of soybean. In some embodiments, the genome of the germplasm is at least about 50%, 55%, 60%, 65%, 70%, 75%, 80%, 85%, 90%, 95%, 97%, 99% or 100% identical to that of an elite variety of soybean. A disease resistant soybean plant is then produced from the germplasm identified as having the marker associated with enhanced disease resistance (e.g. ASR) according to methods well known in the art for breeding and producing plants from germplasm.

In some embodiments, the marker detected in the germplasm may comprise, consist essentially of or consist of one or more marker alleles located within a chromosomal interval selected from the group consisting of:

1) chromosomal interval derived from PI441001, PI441008, PI446958, PI509501, PI583970, or PI483224 wherein said chromosomal interval corresponds with nucleotide base 1 to nucleotide base 1251375 of SEQ ID NO: 1; or
2) chromosomal interval derived from PI441001, PI441008, PI446958, PI509501, PI583970, or PI483224 wherein said chromosomal interval corresponds with nucleotide base 1 to nucleotide base 2515428 of SEQ ID NO: 2; or
3) chromosomal interval derived from PI441001, PI441008, PI446958, PI509501, PI583970, or PI483224 wherein said chromosomal interval corresponds with nucleotide base 1 to nucleotide base 365842 of SEQ ID NO: 3; or
4) chromosomal interval derived from PI441001, PI441008, PI446958, PI509501, PI583970, or PI483224 wherein said chromosomal interval corresponds with nucleotide base 1 to nucleotide base 646429 of SEQ ID NO: 4;
5) chromosomal interval derived from PI441001, PI441008, PI446958, PI509501, PI583970, or PI483224 wherein said chromosomal interval corresponds with nucleotide base 1 to nucleotide base 750080 of SEQ ID NO: 5; or
6) A chromosomal interval spanning 20 cM, 15 cM, 10 cM, 5 cM, 1 cM, 0.5 cM from a SNP marker that associates with increased ASR resistance in soybean wherein the SNP marker is selected from the group consisting of any favorable SNP marker displayed in Tables 1-5.

In some embodiments, the marker detected in the germplasm may comprise, consist essentially of or consist of one or more marker alleles selected from any of Tables 1-5.

Methods for producing and/or selecting an Asian soy rust resistant/tolerant soybean plant or germplasm may comprise crossing a first soybean plant or germplasm with a second soybean plant or germplasm, wherein said first soybean plant or germplasm comprises a chromosomal interval selected from the group consisting of:

1) chromosomal interval derived from PI441001, PI441008, PI446958, PI509501, PI583970, or PI483224 wherein said chromosomal interval corresponds with nucleotide base 1 to nucleotide base 1251375 of SEQ ID NO: 1; or
2) chromosomal interval derived from PI441001, PI441008, PI446958, PI509501, PI583970, or PI483224 wherein said chromosomal interval corresponds with nucleotide base 1 to nucleotide base 2515428 of SEQ ID NO: 2; or
3) chromosomal interval derived from PI441001, PI441008, PI446958, PI509501, PI583970, or PI483224 wherein said chromosomal interval corresponds with nucleotide base 1 to nucleotide base 365842 of SEQ ID NO: 3; or
4) chromosomal interval derived from PI441001, PI441008, PI446958, PI509501, PI583970, or PI483224 wherein said chromosomal interval corresponds with nucleotide base 1 to nucleotide base 646429 of SEQ ID NO: 4; or
5) chromosomal interval derived from PI441001, PI441008, PI446958, PI509501, PI583970, or PI483224 wherein said chromosomal interval corresponds with nucleotide base 1 to nucleotide base 750080 of SEQ ID NO: 5; or 6) A chromosomal interval spanning 20 cM, 15 cM, 10 cM, ScM, 1 cM, 0.5 cM from a SNP marker that associates with increased ASR resistance in soybean wherein the SNP marker is selected from the group consisting of any SNP marker displayed in Tables 1-5; and crossing with a second soybean plant not comprising the chromosome interval then producing a progeny plant with increased ASR resistance. Either the first or second soybean plant or germplasm, or both, may be of a non-naturally occurring variety of soybean. In some embodiments, the second soybean plant or germplasm is of an elite variety of soybean. In some embodiments, the genome of the second soybean plant or germplasm is at least about 50%, 55%, 60%, 65%, 70%, 75%, 80%, 85%, 90%, 95%, 97%, 99% or 100% identical to that of an elite variety of soybean.

Also provided herein is a method of introgres sing an allele associated with enhanced Disease (e.g. ASR, SCN, SDS, RKN, Phytopthora, etc.) resistance/tolerance into a soybean plant. Such methods for introgressing an allele associated with enhanced Disease (e.g. ASR, SCN, SDS, RKN, Phytopthora, etc.) resistance/tolerance into a soybean plant or germplasm may comprise, consist essentially of or consist of crossing a first soybean plant or germplasm comprising said allele (the donor) wherein said allele is selected from any allele listed in Table 1 or Table 2 or a maker in "close proximity" to a marker listed in Tables 1-5 with a second soybean plant or germplasm that lacks said allele (the recurrent parent) and repeatedly backcrossing progeny comprising said allele with the recurrent parent. Progeny comprising said allele may be identified by detecting, in their genomes, the presence of a marker associated with enhanced Disease (e.g. ASR, SCN, SDS, RKN, Phytopthora, etc.) resistance/tolerance. The marker may be detected in any sample taken from the progeny, including, but not limited to, a portion of said progeny (e.g., a seed chip, a leaf punch disk or a cell from said plant or germplasm) or a nucleotide sequence from said progeny. Such a sample may be taken from the progeny using any present or future method known in the art, including, but not limited to, automated methods of removing a portion of endosperm with a sharp blade, drilling a small hole in the seed and collecting the resultant powder, cutting the seed with a laser and punching a leaf disk. Either the donor or the recurrent parent, or both, may be of a non-naturally occurring variety of soybean. In some embodiments, the recurrent parent is of an elite variety of soybean. In some embodiments, the genome of the recurrent parent is at least about 50%, 55%, 60%, 65%, 70%, 75%, 80%, 85%, 90%, 95%, 97%, 99% or 100% identical to that of an elite variety of soybean.

In some embodiments, the marker used to identify progeny comprising an allele associated with enhanced Disease (e.g. ASR, SCN, SDS, RKN, Phytopthora, etc.) resistance/tolerance may comprise, consist essentially of or consist of one or more marker alleles located within a chromosomal interval selected from the group consisting of:

1) a chromosomal interval derived from PI441001, PI441008, PI446958, PI509501, PI583970, or PI483224 wherein said chromosomal interval corresponds with nucleotide base 1 to nucleotide base 1251375 of SEQ ID NO: 1; or 2) a chromosomal interval derived from PI441001, PI441008, PI446958, PI509501, PI583970, or PI483224 wherein said chromosomal interval corresponds with nucleotide base 1 to nucleotide base 2515428 of SEQ ID NO: 2;

3) a chromosomal interval derived from PI441001, PI441008, PI446958, PI509501, PI583970, or PI483224 wherein said chromosomal interval corresponds with nucleotide base 1 to nucleotide base 365842 of SEQ ID NO: 3; or 4) a chromosomal interval derived from PI441001, PI441008, PI446958, PI509501, PI583970, or PI483224 wherein said chromosomal interval corresponds with nucleotide base 1 to nucleotide base 646429 of SEQ ID NO: 4;

5) chromosomal interval derived from PI441001, PI441008, PI446958, PI509501, PI583970, or PI483224 wherein said chromosomal interval corresponds with nucleotide base 1 to nucleotide base 750080 of SEQ ID NO: 5; or 6) a chromosomal interval spanning 20 cM, 15 cM, 10 cM, ScM, 1 cM, 0.5 cM from a SNP marker that associates with increased ASR resistance in soybean wherein the SNP marker is selected from the group consisting of any SNP marker displayed in Tables 1-5 or any closely linked markers in close proximity to said intervals 1)-5).

In some embodiments, the marker may comprise, consist essentially of or consist of marker alleles located in at least two different chromosomal intervals. For example, the marker may comprise one or more alleles located in the chromosomal interval defined by and including any two markers in Table 1, any two markers located in Table 2 any two markers in Table 3 or any two markers in Tables 4 and/or 5.

The following are all embodiments contemplated and encompassed within the invention:

1. An elite *Glycine max* plant having in its genome a chromosomal interval from a wild Glycine plant wherein the chromosomal interval comprises any one of SEQ ID NOs: 1-5 or a functional portion thereof that confers ASR resistance in said plant; in some instances the wild Glycine plant is *Glycine tomentella* and in further instances the wild Glycine plant is selected from any one of plant accessions PI441001, PI441008, PI446958, PI509501, PI583970, or PI483224, wherein said chromosomal interval confers increased Asian soy rust (ASR) resistance as compared to a control plant not comprising said chromosomal interval; Further in a variation of embodiment 1 said elite *Glycine max* plant is produced by a) performing a non-natural cross between a *Glycine max* plant and a *Glycine tomentella* plant wherein "non-natural cross" means a cross between two species that will not produce viable offspring without further intervention (e.g. embryo rescue such as described in Example 3) such as; a) performing embryo rescue as essentially described in Example 3 to create a amphidiploid plant; b) backcrossing the amphidiploid plant of b) with a *Glycine max* plant for at least 1 backcross generation (preferably BC4) resulting in the generation of an elite *Glycine max* plant having introgressed in its genome said chromosome interval (s); further the said elite *Glycine max* plant may have 20 chromosome pairs or could maintain a chromosome pair from *Glycine tomentella* and inheriting said intervals to confer ASR resistance in said elite *Glycine max* plant.
2. The plant of embodiment 1, wherein the chromosomal interval comprises SEQ ID NOs: 1, 2, 3, 4, 5 or a portion of any thereof wherein said portion confers ASR resistance to elite *Glycine max* plant.
3. The plant of embodiments 1-2, wherein the chromosomal interval comprises a SNP marker associated with increased ASR resistance wherein said SNP marker corresponds with any one of the favorable SNP markers as listed in Tables 1-5; or in another variation a haplotype comprising at least 2 SNP markers associated with ASR resistance and further wherein the at least 2 SNP markers are selected from any favorable SNP markers as listed in Tables 1-5.

4. The plant of embodiments 1-3, wherein the chromosomal interval is derived from *Glycine tomentella* chromosome 5 at an approximate mapping interval of 0.02-1.19 Mb.
5. The plant of embodiments 1-5, wherein the chromosomal interval corresponds to a position within the wild Glycine and/or *Glycine tomentella* genome that comprises SEQ ID NOs: 1-5 or a portion thereof wherein said portion confers increased ASR resistance in said elite *Glycine max* plant.
6. The plant of embodiments 1-5, wherein the elite *Glycine max* plant further shows resistance to any one of the stresses selected from: diseases (such as powdery mildew, *Pythium ultimum*, Phytophthora root rot, leaf spot, blast, brown spot, root-knot nematode, soybean cyst nematode, soybean vein necrosis virus, soybean stem canker, soybean sudden death syndrome, leaf and neck blast, rust, frogeye leaf spot, brown stem rot, Fusarium, or sheath blight); insect pests (such as whitefly, aphid, grey field slug, sugarcane borer, green bug, or aphid); abiotic stress (such as drought tolerance, flooding, high level of salinity, heavy metal, aluminum, manganese, cadmium, zinc, UV-B, boron, iron deficiency chlorosis or cold tolerance (i.e. extreme temperatures)) and further wherein said resistance to stress is conferred from said chromosomal interval.
7. The plant of embodiments 1-6, wherein at least one parental line of said plant was selected or identified through molecular marker selection, wherein said parental line is selected or identified based on a molecular marker located within or closely associated with said chromosome interval corresponding to any one of SEQ ID NOs: 1-5.
8. The plant of embodiment 7, wherein the molecular marker is a single nucleotide polymorphism (SNP), a quantitative trait locus (QTL), a amplified fragment length polymorphism (AFLP), randomly amplified polymorphic DNA (RAPD), a restriction fragment length polymorphism (RFLP) or a microsatellite.
9. The plant of embodiments 7-8, wherein the molecular marker is a SNP marker and the molecular marker is any favorable marker as shown in Tables 1-5.
10. The plant of any of embodiments 1-9, wherein the plant is a agronomically elite *Glycine max* plant having a commercially significant yield as well as commercially susceptible: vigor, seed set, standability or threshability.
11. The plant of any of embodiments 1-10, wherein said interval is introduced into said plant genome by a "non-natural" wide cross between a *Glycine max* and *Glycine tomentella* line followed by subsequent embryo rescue (e.g. as described in Example 3) and then resultant plant backcrossed at least once and more preferably at least four backcrosses (BC4) with *Glycine max* line (i.e. in some instances a recurrent *Glycine max* line) to produce an elite or agronomically elite *Glycine max* line.
12. The plant of any of embodiments 1-10, wherein said interval is introduced into said plant genome by transgenic expression or genome editing of sequences corresponding to and comprising any one of SEQ ID NOS: 1-5 or a portion thereof wherein said portion retains ASR resistance when introduced into a susceptible line.
13. The plant of embodiment 12, wherein the interval is introduced by genome editing of a *Glycine max* genomic region homologous to, or a ortholog of any of the intervals corresponding to SEQ ID NOs: 1-5 and further making at least one genetic edit to said *Glycine max* genomic region to include at least 1 allele change corresponding to any favorable allele as described in any of Tables 1-5 wherein said *Glycine max* genomic region did not comprise said allele change before genome edit and said genome edit confers in plant increased ASR resistance as compared to a control plant.
14. The plant of embodiment 13, wherein the genetic edit is accomplished through CRISPR, TALEN, meganucleases or through modification of genomic nucleic acids.
15. The plant of embodiments 1-14 wherein the chromosomal interval comprises any one of or a portion thereof (where said portion retains ASR resistance) of nucleotide base pair positions: 1-1251375 of SEQ ID NO: 1; 1-2515428 of SEQ ID NO: 2; 1-365842 of SEQ ID NO: 3; 1-646429 of SEQ ID NO: 4, or 1-750080 of SEQ ID NO: 5.
16. A ASR resistant agronomically elite *Glycine max* plant having commercially significant yield, wherein said plant comprises an introgression of a chromosomal interval from a wild Glycine plant wherein said chromosome interval corresponds to and/or comprises any one of SEQ ID NOs: 1-5; in some instances said wild Glycine plant is *Glycine tomentella*, in further instances the wild Glycine plant is any one of accessions PI441001, PI441008, PI446958, PI509501, PI583970, PI483224 or progeny thereof, wherein the introgression comprises a ASR resistance conferring QTL linked to at least one marker located on the chromosome equivalent to *Glycine tomentella* chromosome 5.
17. The ASR resistant elite *Glycine max* plant of embodiment 16, wherein said QTL is homozygous.
18. The plant of embodiments 16-17, wherein the parental plant of said ASR resistant agronomically elite *Glycine max* plant is a wide cross between *Glycine max* and *Glycine tomentella* parental lines; in one variation the parental line is a amphidiploid hybrid between *Glycine max* and *Glycine tomentella* parental lines (herein, "amphidiploid hybrid").
19. An agronomically elite *Glycine max* plant having commercially significant yield comprising an ASR resistant allele which confers increased resistance to ASR, and wherein the ASR allele comprises at least one single nucleotide polymorphism (SNP) selected from the group of favorable SNPs described in any one of Tables 1-5 and further wherein said plant comprises in its genome a chromosomal interval (i.e. such as any one of SEQ ID NOs: 1-5) from *Glycine tomentella* or a progeny there of (e.g. a amphidiploid hybrid).
20. An agronomically elite soybean having commercially significant yield comprising a chromosomal interval from *Glycine tomentella* chromosome 5 comprising at least one favorable SNP marker selected from any one of Tables 1-5; in one variation the chromosome interval is any one of SEQ ID NOs: 1-5.
21. The plant of embodiment 20, wherein said chromosomal interval from *Glycine tomentella* chromosome 5 is derived from any one of plant accessions PI441001, PI441008, PI446958, PI509501, PI583970, PI483224 or progeny thereof (e.g. such as a amphidiploid hybrid).

22. The plant of embodiments 20-21, wherein the chromosomal interval comprises SEQ ID NO: 1, SEQ ID NO: 2, SEQ ID NO: 3, SEQ ID NO: 4, SEQ ID NO: 5 or a portion thereof wherein said chromosomal interval confers increased ASR resistance in said plant as compared to a control plant not comprising said chromosomal interval.

23. A plant cell or plant part derived from the plant or seed of embodiments 1-22; in some instances the plant cell or plant part cannot be used to regenerate a plant (e.g. thus a plant cell or plant part unable to be used to regenerate a plant from the plant or seed of embodiments 1-22).

24. A progeny plant or seed from any of the plants of embodiments 1-22.

25. A *Glycine max* plant of embodiments 1-22, wherein said plant has 20 chromosome pairs and/or 40 paired chromosomes or in some instances said plant maintains a chromosomal pair derived from a wild glycine line.

26. A *Glycine max* plant of embodiments 1-25, wherein there is no yield drag or negative agronomic effects as compared to a control plant.

27. A method of producing a soybean plant (in some instances a "amphidiploid hybrid") having increased resistance to Asian soybean rust (ASR), the method comprising the steps of:
   a. crossing a *Glycine max* plant with a ASR resistant wild Glycine plant, in some instances a *Glycine tomentella* plant;
   b. generating soybean pods from the cross of a);
   c. isolating embryos from the pods of b) and placing said embryos onto embryo rescue medium (in some instances the embryo rescue medium comprises or has a composition essentially equivalent to: 3.1 g B5 basal salt, Gamborg's, 1 ml B5 vitamins 1000×, 40 g sucrose [C12H22011], 0.25 g casein hydrolysate, 0.25 mg BAP, 0.75 g MgCl2*6H20, 20 ml glutamine 25 mg/ml, 0.1 g serine [C3H7NO3], 4 ml Asparagine 25 mg/ml, 0.05 ml of IBA 1 mg/ml, and 2.0 g Gelzan); or Murashige and Skoog Medium (MS) or Gamborg's B-5 media (Bridgen, 1994)) wherein there is no callus induction caused or initiated in this step c);
   d. transferring the embryos of c) onto germination medium or elongation medium (in some instances the germination medium comprises or has a composition essentially equivalent to: 3.2 g Schenk and Hilderbrandt Basal salt mixture, 1 g Myo-inositol [C6H12O6], 5 ml Thiamine 1 mg/ml, 0.5 ml pyridoxine 1 mg/ml, 10 g sucrose [C12H22O11], and 7.5 g purified agar) or elongation medium comprising or has a composition essentially equivalent to: 4.3 g MS Basal salt Mixture [MSP01], 5 ml MS iron 200×, 30 g Sucrose [C12H22O11], 1 g MES [C6H13NO4S], 8 g purified agar, lml B5 vitamins 100×, 2 ml glutamine 25 mg/ml, 0.50 ml zeatin riboside, trans isomers 1 mg/ml, 0.1 ml IAA 1 mg/ml, 0.2 ml GA3); and collecting shoots from said embryos;
   e. growing the collected shoots of d) on germination or elongation medium; and
   f. transferring established shoots of e) to soil, thereby producing a soybean plant having increased resistance to ASR (in a preferred instance the shoots are rooted on elongation or germination medium to form plantlets and subsequently hardened.)

28. The method of embodiment 27, wherein the wild Glycine plant or *Glycine tomentella* plant of step a) comprises in its genome a chromosomal interval corresponding to and defined by (herein, "a chromosomal defined by" means the interval is the span of nucleotide bases from the first nucleotide to final nucleotide of the respective SEQ ID NO:) any one of SEQ ID NOs: 1-5 or a portion thereof where said portion confers increased ASR resistance in a plant.

29. The method of embodiments 27-28, wherein the *Glycine tomentella* plant comprises in its genome an allele associated with ASR resistance wherein said allele corresponds to any of the favorable alleles listed in Tables 1-5 or is a allele or SNP within any one of chromosome intervals comprising any one of SEQ ID NOs: 1-5 wherein said allele or SNP is associated with or closely linked to ASR resistance in a plant.

30. The method of embodiments 27-29, wherein the wild Glycine or *Glycine tomentella* plant is any one of PI441001, PI441008, PI446958, PI509501, PI583970, PI483224 or progeny thereof (in some instances the progeny is a amphidiploid hybrid).

31. The method of embodiment 30, wherein the progeny plant is a wide cross between *Glycine max* and *Glycine tomentella* parental lines.

32. The method of embodiments 27-31, further comprising the step of molecular marker selection where an isolated genomic nucleic acid from any one of: the parent plants of a), the embryo of c) or the shoot or resultant plant of f) is isolated and analyzed (e.g. genotyped) for the presence of a allele that associates with increased ASR resistance and further wherein said allele is closely linked with the chromosome intervals corresponding to and defined by SEQ ID NOs: 1-5 (e.g. any of the favorable alleles as described in any one of Tables 1-5).

33. The method of embodiment 32, wherein the allele corresponds to any of the favorable alleles listed in Tables 1-5.

34. The method of embodiments 27-33, wherein the *Glycine max* plant of a) has a relative maturity of 3.7 to 4.8. or in other variations the *Glycine max* plant may be selected from soybean maturity groups 000 the X 35. The method of embodiments 27-34, wherein the *Glycine max* plant of a) is used as a female plant and said wild Glycine or *Glycine tomentella* plant is the pollen donor; alternatively in some instances the *Glycine max* plant of a) can be uses as the male pollen donor plant and Wild Glycine or *Glycine tomentella* plant is used as a female plant.

36. The method of embodiments 27-35, wherein the pods of b) are treated with a hormone mixture comprising GA3, NAA and Kinetin (in some embodiments 100 mg GA3, 25 mg NAA and 5 mg kinetin/L and further, in some instances, wherein said hormone treatment is sprayed on pods daily until harvest).

37. The method of embodiments 27-36, wherein the pods are collected prior to 19 days after pollination.

38. The method of embodiments 27-37, wherein the embryos and/or shoots are treated with a chromosome doubling agent in any one of steps e)-h) to create amphidiploid plants (or amphidiploid hybrid) capable of being backcrossed with a domestic annual *Glycine* cultivar to produce at least one backcross generation in some instances a BC4 generation, further wherein the amphidiploid plant further comprises in its genome a favorable agronomic trait, such as ASR resistance that was inherited from the wild Glycine or *Glycine tomentella* parent; in other instances the amphidiploid plants are backcrossed with a recurrent *Glycine max* parental line followed by embryo rescue (e.g. as described in embodiments 65-83) to create a BC1 and repeated multiple times to produce a BC4 generation wherein said BC4 generation is fertile (i.e. no need for embryo rescue to generate plants) and capable of producing ASR resistant *Glycine max* progeny plants.

39. The method of embodiment 38, wherein the chromosome doubling agent is either colchicine or trifluralin; further contemplated chromosome doubling agents that may be used in embodiment 38 may comprise oryzalin.

40. The method of embodiments 27-39, wherein the embryos of c) remains on embryo rescue medium for at least about 20 days at about 24° C.

41. The method of embodiments 27-39, wherein the embryos of d) remain on germination or elongation medium for at least about 20 days at about 24° C.

42. The method of embodiment 41, wherein the embryo rescue medium is Soy ER1-1 wherein Soy ER1-1 comprises the following: 3.1 g B5 basal salt, Gamborg's, 1 ml B5 vitamins 1000×, 40 g sucrose [C12H22011], 0.25 g casein hydrolysate, 0.25 ml BAP, 0.75 g MgCl2*6H20, 20 ml glutamine 25 mg/ml, 0.1 g serine [C3H7NO3], 4 ml Asparagine 25 mg/ml and 0.05 ml of IBA 1 mg/ml (herein, "Soy ER1-1").

43. A method of producing a *Glycine max* plant having increased resistance to Asian soybean rust (ASR), the method comprising the steps of:
   a. providing a first *Glycine max* plant comprising in its genome a chromosomal interval corresponding to any one of SEQ ID NOs: 1-5 wherein said first *Glycine max* plant has increased resistance to ASR;
   b. crossing the *Glycine max* plant of a) with a second *Glycine max* plant not comprising said chromosomal interval;
   c. (in some embodiments this step is omitted) selecting a progeny plant from the cross of b) by isolating a nucleic acid from said progeny plant and detecting within said nucleic acid an allele that associates with increased ASR resistance and further wherein said allele is closely linked with the chromosome intervals corresponding to SEQ ID NOs: 1-5,
   d. thereby, producing a *Glycine max* plant having increased resistance to ASR.

44. The method of embodiment 43, wherein the allele in c) corresponds to any of the favorable alleles as depicted in any one of Tables 1-5.

45. The method of embodiments 43-44, wherein either first or second *Glycine max* plant is an elite *Glycine max* plant; further the first or second *Glycine max* plant could also be an elite *Glycine max* plant having commercially significant yield and in further embodiments be a agronomically elite *Glycine max* plant.

46. The method of embodiments 43-45, wherein the progeny plant is backcrossed by one or more generations, in some instances at least four (BC4) backcrosses; in further instances the BC1, BC2, BC3 generation is followed by embryo rescue as described in Example 3 or in embodiments 65-82 below.

47. The method of embodiments 27-46, wherein the chromosome interval corresponds to a *Glycine tomentella* chromosome interval located on *Glycine tomentella* chromosome 5 at an approximate mapping interval of 0.02-1.19 Mb and additionally comprises any one of SEQ ID NOS: 1-5 or a portion thereof wherein portion confers ASR resistance or is associated with ASR resistance.

48. The method of embodiment 47, wherein the *Glycine tomentella* chromosome interval is derived from any one of plant accessions: PI441001, PI441008, PI446958, PI509501, PI583970, PI483224 or a progeny thereof, in some instances the progeny comprises a amphidiploid hybrid plant.

49. The method of embodiment 48, wherein the progeny plant is a wide cross between *Glycine max* and *Glycine tomentella* parental lines.

50. A method of producing a *Glycine max* plant with increased ASR resistance, the method comprising the steps of:
   a) isolating a nucleic acid from a *Glycine max* plant;
   b) detecting in the nucleic acid of a) at least one molecular marker associated with increased ASR wherein said molecular marker is located within 20 cM, 10 cM, ScM, 1 cM 0.5 cM, or closely linked with a chromosomal interval corresponding to a genomic region from a wild Glycine plant or *Glycine tomentella* plant comprising any one of SEQ ID NOs: 1-5, or a portion thereof;
   c) selecting a plant based on the presence of the molecular marker detected in b) additionally crossing the selected plant with a second plant (e.g. *Glycine max* plant) not comprising said chromosomal interval; and
   d) producing a *Glycine max* progeny plant from the plant of c) identified as having said allele associated with increased ASR resistance and/or crossed with a second plant.

51. The method of embodiment 50, wherein the molecular marker is closely linked with or corresponds to any one of the favorable alleles as depicted in Tables 1-5 and/or said molecular marker is within a chromosomal interval from *Glycine tomentella* corresponding to and/or defined by SEQ ID NOs: 1-5.

52. A method of identifying and/or selecting a plant (in some embodiments either a *Glycine max* or a *Glycine tomentella* plant) having a ASR resistance, the method comprising the steps of
   a. isolating a nucleic acid from a soybean plant or plant part;
   b. detecting in the nucleic acid the presence of a molecular marker that associates with increased ASR resistance wherein the molecular marker is located within 20 cM, 10 cM, ScM, 1 cM, 0.5 cM of a marker as described in any one of Tables 1-5 or in another embodiment the molecular marker is closely linked with, in close proximity to, closely associated with or within a chromosomal interval corresponding to and/or comprising any one of SEQ ID NOs: 1-5; and
   c. identifying or selecting a soybean plant having increased ASR resistance on the basis of the molecular marker detected in b), thereby identifying and/or selecting a plant, having ASR resistance.

53. The method of embodiment 52, wherein the molecular marker detected in b) consists of any favorable marker as described in any one of Tables 1-5 or a allele or molecular marker associated with ASR wherein the allele or molecular marker is located within a chromosomal interval comprising and defined by any one of SEQ ID NOs: 1-5.

54. The method of embodiments 50-53, wherein the molecular marker is a single nucleotide polymorphism (SNP), a quantitative trait locus (QTL), an amplified fragment length polymorphism (AFLP), randomly amplified polymorphic DNA (RAPD), a restriction fragment length polymorphism (RFLP) or a microsatellite.
55. The method of any one of embodiments 50-54, wherein the detecting comprises amplifying a marker locus or a portion of the marker locus and detecting the resulting amplified marker amplicon (in some embodiments the amplicon comprises a nucleotide sequence as shown in any one of SEQ ID NOs 1-5; further, in another embodiment, a primer able to anneal to said marker locus and amplify said locus allowing for the detection of the resulting amplified marker amplicon.)
56. The method of embodiment 55, wherein the amplifying comprises: a) admixing an amplification primer or amplification primer pair with a nucleic acid isolated from the first soybean plant or germplasm, wherein the primer or primer pair is complementary or partially complementary to at least a portion of the marker locus, and is capable of initiating DNA polymerization by a DNA polymerase using the soybean nucleic acid as a template; and, b) extending the primer or primer pair in a DNA polymerization reaction comprising a DNA polymerase and a template nucleic acid to generate at least one amplicon; further embodiments, include the primer pair used in said DNA polymerization reaction and/or a composition comprising said primer pair.
57. The method of embodiments 32-56, wherein the nucleic acid is selected from DNA or RNA, in some embodiments isolated genomic DNA and/or RNA.
58. The method of embodiments 55-57, wherein the amplifying comprises employing a polymerase chain reaction (PCR) or ligase chain reaction (LCR) using a nucleic acid isolated from a soybean plant or germplasm as a template in the PCR or LCR, further embodiments wherein said soybean plant is either *Glycine max* or *Glycine tomentella*
59. A primer diagnostic for ASR resistance wherein said primer can be used in a PCR reaction to indicate the presence of an allele associated with ASR resistance, wherein said allele is any favorable allele as described in Tables 1-5 and/or said primer comprises a nucleotide sequence including any of SEQ ID NOs: 1-5 wherein primer is used in a PCR reaction to generate a amplicon diagnostic for at least one allele that is associated with ASR resistance; further a composition comprising said primer.
60. The method of embodiments 27-58, wherein the plant produced or identified by said methods, further confers increased resistance to any one of soy cyst nematode, bacterial pustule, IDC, root knot nematode, frog eye leaf spot, phytopthora, brown stem rot, nematode, rust, smut, *Golovinomyces cichoracearum, Erysiphe cichoracearum, Blumeria graminis, Podosphaera xanthii, Sphaerotheca fuliginea, Pythium ultimum, Uncinula necator, Mycosphaerella pinodes, Magnaporthe grisea, Bipolaris oryzae, Magnaporthe grisea, Rhizoctonia solani, Phytophthora sojae, Schizaphis graminum, Bemisia tabaci, Rhopalosiphum maidis, Deroceras reticulatum, Diatraea saccharalis, Schizaphis graminum* and *Myzus persicae*; or a combination thereof.
61. A plant, seed or plant part produced by the methods of embodiments 27-58 or 60.
62. The plant of embodiment 61, wherein the plant is an elite *Glycine max* plant, in some embodiments the plant is an elite *Glycine max* plant having commercially significant yield.
63. The plant of embodiment 62, wherein the plant is an agronomically elite *Glycine max* plant and in some instances the agronomically elite *Glycine max* plant shows commercially significant yield.
64. The plant of embodiments 61-63, wherein said plant displays no yield drag or negative agronomic effects as compared to a control and/or check plant; or in other instances has susceptible commercial performance as compared to a commercial check.
65. A method for producing at least one hybrid between a first parent plant of a wild perennial *Glycine* species and a second parent plant that is a domestic annual *Glycine* cultivar, wherein said *Glycine* cultivar is capable of being backcrossed with a domestic annual *Glycine* cultivar to produce at least one plant of a first backcross generation, or fertile progeny thereof, said method comprising the steps of:
   a. providing at least one wild glycine plant (wg) and at least one domestic annual *Glycine* parental plant (dg);
   b. allowing parental plants to flower;
   c. crossing said wg plant with dg plant (In most embodiments this cross is a "non-natural cross" thus not able to produce viable/fertile offspring);
   d. generating pods from the cross of c);
   e. isolating embryos from the pods of d) and placing said embryos onto embryo rescue medium, wherein there is no callus induction;
   f. transferring the embryos of e) onto germination medium or elongation medium and collecting shoots from said embryos;
   g. growing the collected shoots of f) on germination or elongation medium; and
   h. transferring established shoots of e) to soil, thereby producing a hybrid between a first parent plant of a wild perennial *Glycine* species and a second parent plant that is a domestic annual *Glycine*; in some embodiments this hybrid is a amphidiploid hybrid capable of being backcrossed with a *Glycine max* plant for at least 1 generation.
66. The method of embodiment 65 wherein said wild Glycine line is selected from the group consisting of *G. canescens, G. argyrea, G. clandestine, G. latrobeana, G. albicans, G. aphyonota, G. arenaria, G. curvata, G. cyrtoloba, G. dolichocarpa, G. falcate, G. gracei, G. hirticaulis, G. lactovirens, G. latifolia, G. microphylla, G. montis*-douglas, *G. peratosa, G. pescadrensis, G. pindanica, G. pullenii, G. rubiginosa, G. stenophita, G. syndetika*, and *G. tomentella.*
67. The method of embodiments 65-66, wherein the wild *Glycine* parental plant is *Glycine tomentella.*
68. The method of embodiments 65-66, wherein the wild perennial *Glycine* carries a desirable agronomic trait such as disease resistance (e.g. ASR) and/or abiotic stress resistance (e.g. drought resistance) and/or insect resistance (e.g. Aphid resistance) and/or higher yield.
69. The method of embodiment 68, wherein the desirable trait is selected from the group consisting of: disease resistance including but not limited to, resistance to: soy cyst nematode, bacterial pustule, root knot nematode, frog eye leaf spot, phytopthora, brown stem rot, nematode, rust, smut, *Golovinomyces cichoracearum, Erysiphe cichoracearum, Blumeria graminis,*

*Podosphaera xanthii, Sphaerotheca fuliginea, Pythium ultimum, Uncinula necator, Mycosphaerella pinodes, Magnaporthe grisea, Bipolaris oryzae, Magnaporthe grisea, Rhizoctonia solani, Phytophthora sojae, Schizaphis graminum, Bemisia tabaci, Rhopalosiphum maidis, Deroceras reticulatum, Diatraea saccharalis, Schizaphis graminum* or *Myzus persicae*; increased yield, increased resistance or tolerance to iron deficiency chlorosis, and increased drought or heat tolerance.

70. The method of embodiments 65-69, wherein the domestic annual *Glycine* is *Glycine max*.

71. The method of embodiments 65-70, wherein the dg plant is used as a female plant and said wg plant is the pollen donor or alternatively the dg plant can be used as a pollen donor (i.e. male line) and wg used as the female line.

72. The method of embodiments 65-71, wherein the pods of d) are treated with a hormone mixture comprising GA3, NAA and Kinetin (in some embodiments 100 mg GA3, 25 mg NAA and 5 mg kinetin/L and further, in some instances, wherein said hormone treatment is sprayed on pods daily until harvest.

73. The method of embodiments 65-72, wherein the pods are collected prior to 19 days after pollination.

74. The method of embodiments 65-73, wherein the embryos and/or shoots are treated with a chromosome doubling agent in any one of steps e)-h) to create amphidiploid plants capable of being backcrossed with a domestic annual *Glycine* cultivar to produce at least one backcross generation.

75. The method of embodiment 74, wherein the chromosome doubling agent is either colchicine, oryzalin or trifluralin.

76. The method of embodiments 65-75, wherein the embryos of e) remain on embryo rescue medium for at least about 20 days at about 24° C.

77. The method of embodiments 65-76, wherein the embryos of f) remain on germination or elongation medium for at least about 20 days at about 24° C.

78. The method of embodiment 76, wherein the embryo rescue medium is Soy ER1-1.

79. The method of embodiments 65-78, wherein the cross of c) does not require the emasculation of flowers.

80. The method of embodiments 65-79, wherein the cross of c) is a non-natural cross wherein no viable and/or fertile offspring would be produced without further intervention such as, for example, steps d)-h).

81. The method of embodiments 65-80, wherein the method further comprises a step i) wherein the hybrid plant of h) is backcrossed at least once with a *Glycine max* plant in most embodiments the backcross retains a favorable inherited agronomic trait from said wg, for example, the favorable agronomic trait could be disease resistance (e.g. ASR) and/or abiotic stress resistance (e.g. drought resistance) and/or insect resistance (e.g. Aphid resistance) and/or higher yield; In further instances the backcross is carried out for four generations (BC4) resulting in a fertile dg progeny plant comprising said favorable inherited agronomic trait wherein the backcross progression follows a wide cross between wg and dg plant followed by embryo rescue as in embodiment 65 thus generating a backcrossed plant which is repeated for BC2, BC3, and in preferred instances BC4 to produce fertile progeny plants comprising said favorable inherited agronomic trait.

82. The method of embodiments 65-81, wherein the method further comprises step j) wherein the hybrid plant of h) is backcrossed multiple times and further wherein each back crossed (BC) generation is selected based on a favorable agronomic trait derived from said wg line; in some instances each backcross is followed by (a-h) for four generations (BC4) thus producing fertile hybrid offspring/progeny plants.

83. The method of embodiments 65-82, wherein the method further comprises step k) counting the number of chromosomes in at least one BC generation and selecting those that have 40 paired chromosomes, 20 chromosome pairs or lines not comprising unpaired chromosomes, or in some instances the plant has more than 20 chromosome pairs.

84. The method of embodiments 65-82, wherein the method further comprises step k) counting the number of chromosomes in at least one BC generation and selecting for lines that have no unpaired chromosomes and carrying these lines forward for further breeding.

85. A amphidiploid plant produced by the method of embodiments 65-85.

86. A domestic annual *Glycine* plant derived from the plant of embodiment 86.

87. A domestic annual *Glycine* plant of embodiment 87, wherein the *Glycine* plant has inherited a desirable agronomic trait from perennial wild *Glycine* parent for example, the desirable agronomic trait could be disease resistance (e.g. ASR) and/or abiotic stress resistance (e.g. drought resistance) and/or insect resistance (e.g. Aphid resistance) and/or higher yield.

88. The domestic annual *Glycine* plant of embodiment 88, wherein the desirable agronomic trait is increased disease resistance to any one of: soy cyst nematode, bacterial pustule, root knot nematode, frog eye leaf spot, phytopthora, brown stem rot, nematode, rust, smut, *Golovinomyces cichoracearum, Erysiphe cichoracearum, Blumeria graminis, Podosphaera xanthii, Sphaerotheca fuliginea, Pythium ultimum, Uncinula necator, Mycosphaerella pinodes, Magnaporthe grisea, Bipolaris oryzae, Magnaporthe grisea, Rhizoctonia solani, Phytophthora sojae, Schizaphis graminum, Bemisia tabaci, Rhopalosiphum maidis, Deroceras reticulatum, Diatraea saccharalis, Schizaphis graminum* or *Myzus persicae.*

89. The domestic annual *Glycine* plant of embodiments 88-89, wherein the desirable agronomic traits is better field or commercial performance in regards to any one of the following: increased yield, lodging, plant height, field emergence, resistance or tolerance to herbicides, bacteria, fungi, viruses and nematodes, drought tolerance, heat tolerance, chilling or freezing tolerance, excessing moisture, salt stress, oxidative stress, food content and makeup, physical appearance, male sterility, dry down, standability, prolificacy, sugar properties, biomass, oil quality or production, protein quality and overall quality.

90. A plant cell, plant part from any of the plants of embodiments 85-90; in some embodiments said plant cell is incapable of producing a plant.

91. A method of controlling ASR in a field comprising the step of planting the seed from any of the plants described in embodiments 1-21; 24-26; 61-64 or 85-89.

Disease Resistant Soybean Plants and Germplasms

The present invention provides disease resistant soybean plants and germplasms. As discussed above, the methods of the present invention may be utilized to identify, produce and/or select a disease resistant soybean plant or germplasm (for example a soybean plant resistant or having increased tolerance to Asian Soybean Rust). In addition, to the methods described above, an Disease resistant soybean plant or germplasm may be produced by any method whereby a marker associated with enhanced disease tolerance is introduced into the soybean plant or germplasm, including, but not limited to, transformation, protoplast transformation or fusion, a double haploid technique, embryo rescue, gene editing and/or by any other nucleic acid transfer system.

In some embodiments, the soybean plant or germplasm comprises a non-naturally occurring variety of soybean. In some embodiments, the soybean plant or germplasm is at least about 50%, 55%, 60%, 65%, 70%, 75%, 80%, 85%, 90%, 95%, 97%, 99% or 100% identical to that of an elite variety of soybean.

The disease resistant soybean plant or germplasm may be the progeny of a cross between an elite variety of soybean and a variety of soybean that comprises an allele associated with enhanced Disease tolerance (e.g. ASR) wherein the allele is within a chromosomal interval selected from the group consisting of:

1) a chromosomal interval derived from PI441001, PI441008, PI446958, PI509501, PI583970, or PI483224 wherein said chromosomal interval corresponds with nucleotide base 1 to nucleotide base 1251375 of SEQ ID NO: 1; or 2) a chromosomal interval derived from PI441001, PI441008, PI446958, PI509501, PI583970, or PI483224 wherein said chromosomal interval corresponds with nucleotide base 1 to nucleotide base 2515428 of SEQ ID NO: 2;

3) a chromosomal interval derived from PI441001, PI441008, PI446958, PI509501, PI583970, or PI483224 wherein said chromosomal interval corresponds with nucleotide base 1 to nucleotide base 365842 of SEQ ID NO: 3; or 4) a chromosomal interval derived from PI441001, PI441008, PI446958, PI509501, PI583970, or PI483224 wherein said chromosomal interval corresponds with nucleotide base 1 to nucleotide base 646429 of SEQ ID NO: 4;

5) a chromosomal interval derived from PI441001, PI441008, PI446958, PI509501, PI583970, or PI483224 wherein said chromosomal interval corresponds with nucleotide base 1 to nucleotide base 750080 of SEQ ID NO: 5; or 6) a chromosomal interval spanning 20 cM, 15 cM, 10 cM, 5 cM, 1 cM, 0.5 cM or in close proximity from a SNP marker that associates with increased ASR resistance in soybean wherein the SNP marker is selected from the group consisting of any SNP marker displayed in Tables 1-5

The disease resistant soybean plant or germplasm may be the progeny of an introgression wherein the recurrent parent is an elite variety of soybean and the donor comprises an allele associated with enhanced disease tolerance and/or resistance wherein the donor carries a chromosomal interval or a portion thereof comprising any one of SEQ ID NOs: 1-4 and wherein the chromosome interval comprises at least one allele selected respectively from Tables 1-5.

The disease resistant soybean plant or germplasm may be the progeny of a cross between a first elite variety of soybean (e.g., a tester line) and the progeny of a cross between a second elite variety of soybean (e.g., a recurrent parent) and a variety of soybean that comprises an allele associated with enhanced ASR tolerance (e.g., a donor).

The disease resistant soybean plant or germplasm may be the progeny of a cross between a first elite variety of soybean and the progeny of an introgression wherein the recurrent parent is a second elite variety of soybean and the donor comprises an allele associated with enhanced ASR tolerance.

A disease resistant soybean plant and germplasm of the present invention may comprise one or more markers of the present invention (e.g. any marker described in Tables 1-5; or any marker in close proximity to any marker as described in Tables 1-5).

In some embodiments, the disease resistant soybean plant or germplasm may comprise within its genome, a marker associated with enhanced ASR tolerance, wherein said marker is located within a chromosomal interval selected from the group consisting of:

1) a chromosomal interval derived from PI441001, PI441008, PI446958, PI509501, PI583970, or PI483224 wherein said chromosomal interval corresponds with nucleotide base 1 to nucleotide base 1251375 of SEQ ID NO: 1; or 2) a chromosomal interval derived from PI441001, PI441008, PI446958, PI509501, PI583970, or PI483224 wherein said chromosomal interval corresponds with nucleotide base 1 to nucleotide base 2515428 of SEQ ID NO: 2;

3) a chromosomal interval derived from PI441001, PI441008, PI446958, PI509501, PI583970, or PI483224 wherein said chromosomal interval corresponds with nucleotide base 1 to nucleotide base 365842 of SEQ ID NO: 3; or 4) a chromosomal interval derived from PI441001, PI441008, PI446958, PI509501, PI583970, or PI483224 wherein said chromosomal interval corresponds with nucleotide base 1 to nucleotide base 646429 of SEQ ID NO: 4;

5) 5) a chromosomal interval derived from PI441001, PI441008, PI446958, PI509501, PI583970, or PI483224 wherein said chromosomal interval corresponds with nucleotide base 1 to nucleotide base 750080 of SEQ ID NO: 5; or 6) a chromosomal interval spanning 20 cM, 15 cM, 10 cM, 5 cM, 1 cM, 0.5 cM or in close proximity from a SNP marker that associates with increased ASR resistance in soybean wherein the SNP marker is selected from the group consisting of any SNP marker displayed in Tables 1-5.

In some embodiments, the disease resistant soybean plant or germplasm may comprise within its genome a marker that comprises, consists essentially of or consists of marker alleles located in at least two different chromosomal intervals. For example, the marker may comprise one or more alleles located in the chromosomal interval defined by and including any combination of two markers in Table 1 and one or more alleles located in the chromosomal interval defined by and including any combination of two markers in Table 2.

Disease Resistant Soybean Seeds

The present invention provides disease resistant soybean seeds. As discussed above, the methods of the present invention may be utilized to identify, produce and/or select a disease resistant soybean seed. In addition to the methods described above, a disease resistant soybean seed may be produced by any method whereby a marker associated with enhanced ASR tolerance is introduced into the soybean seed, including, but not limited to, transformation, protoplast transformation or fusion, a double haploid technique, embryo rescue, genetic editing (e.g. CRISPR or TALEN or MegaNucleases) and/or by any other nucleic acid transfer system.

In some embodiments, the disease resistant soybean seed comprises a non-naturally occurring variety of soybean. In some embodiments, the soybean seed is at least about 50%, 55%, 60%, 65%, 70%, 75%, 80%, 85%, 90%, 95%, 97%, 99% or 100% identical to that of an elite variety of soybean.

The disease resistant soybean seed may be produced by a disease resistant soybean plant identified, produced or selected by the methods of the present invention. In some embodiments, the disease resistant soybean seed is produced by a disease resistant soybean or wild glycine plant (e.g. *Glycine tomentella*) plant comprising any one of chromosomal intervals corresponding to SEQ ID NOs: 1-5.

A disease resistant soybean seed of the present invention may comprise, be selected by or produced by use of one or more markers from Tables 1-5 of the present invention.

In some embodiments, the disease resistant soybean seed may comprise within its genome, a marker associated with enhanced ASR tolerance, wherein said marker is located within a chromosomal interval selected from the group consisting of:

1) a chromosomal interval derived from PI441001, PI441008, PI446958, PI509501, PI583970, or PI483224 wherein said chromosomal interval corresponds with nucleotide base 1 to nucleotide base 1251375 of SEQ ID NO: 1; or 2) a chromosomal interval derived from PI441001, PI441008, PI446958, PI509501, PI583970, or PI483224 wherein said chromosomal interval corresponds with nucleotide base 1 to nucleotide base 2515428 of SEQ ID NO: 2;

3) a chromosomal interval derived from PI441001, PI441008, PI446958, PI509501, PI583970, or PI483224 wherein said chromosomal interval corresponds with nucleotide base 1 to nucleotide base 365842 of SEQ ID NO: 3; or 4) a chromosomal interval derived from PI441001, PI441008, PI446958, PI509501, PI583970, or PI483224 wherein said chromosomal interval corresponds with nucleotide base 1 to nucleotide base 646429 of SEQ ID NO: 4;

5) a chromosomal interval derived from PI441001, PI441008, PI446958, PI509501, PI583970, or PI483224 wherein said chromosomal interval corresponds with nucleotide base 1 to nucleotide base 750080 of SEQ ID NO: 5;

6) a chromosomal interval spanning 20 cM, 15 cM, 10 cM, 5 cM, 1 cM, 0.5 cM or in close proximity from a SNP marker that associates with increased ASR resistance in soybean wherein the SNP marker is selected from the group consisting of any SNP marker displayed in Tables 1-5.

EXAMPLES

The following examples are not intended to be a detailed catalog of all the different ways in which the present invention may be implemented or of all the features that may be added to the present invention. Persons skilled in the art will appreciate that numerous variations and additions to the various embodiments may be made without departing from the present invention. Hence, the following descriptions are intended to illustrate some particular embodiments of the invention, and not to exhaustively specify all permutations, combinations and variations thereof.

Example 1 Identification of ASR Resistant Wild Glycine Lines

Multiple wild glycine (*Glycine tomentella*) lines were evaluated for ASR resistance against sixteen rust strains collected across a diverse range of environments. The rust data were generated using single pustule derived isolates from USDA-ARS (FL Q09, FL Q12, LABR13, FLQ11) and field populations (FL Q15, FLQ16, RTP1, RTP2, Vero, GA15, UBL, BR south and BR central), the screening was carried out in contained facilities. Of the *Glycine tomentella* lines screened for ASR resistance, the following *Glycine tomentella* lines showed broad resistance against all ASR strains tested: PI441001, PI441008, PI446958, PI509501, PI583970, and PI483224.

Each *Glycine tomentella* line was evaluated over a multiple day course of infection and rated at various time points using a rust rating scale based on groupings modified from Burdon and Speer, T A G, 1984 (see FIG. 6). Each *Glycine tomentella* accession was screened >2 times with ~4 plants each time in North & South America using a large diverse panel of rust isolates.

Example 2 Allele Mining & Associations to PI441001, PI441008, PI446958, PI509501, PI583970, or PI483224 ASR Loci Resistant parent lines (i.e. PI441001, PI441008, PI446958, PI509501, PI583970, and PI483224) were crossed with a susceptible *Glycine tomentella* line and F1 plants were generated (See Table 5). F1 plants were self-fertilized to generate F2 seed. F2 seed was harvested from the selfed F1 plant. Around 200 F2 seed were sown and leaf tissue from each plant was collected for genotyping studies. Each line was inoculated with *Phakopsora pachyrhizi* to determine the resistance/susceptible phenotype of each F2 individual. Tissue from 50 resistant F2s and 50 susceptible F2s were combined in separate pools and genomic DNA was prepared from each pool. Illumina sequencing libraries were prepared from DNA for each of the pools and each library was sequenced in two Illumina HiSeq2000 2×100 bp Paired-End (PE) lanes. The average yield per sample was 383 million read pairs, which equals 77 gigabases of sequence per library. The sequencing reads were trimmed to remove bases with PHRED quality scores of <15.

Quality trimmed reads were aligned to the PI441001, PI441008, PI583970, and PI483224 reference genome sequence using GSNAP (WU and NACU 2010) as paired-end fragments. If a pair of reads could not be aligned together, they were treated as singletons for alignment. Reads were used in subsequent analyses if they mapped uniquely to the reference (≤2 mismatches every 36 bp and less than 5 bases for every 75 bp as tails).

SNPs were filtered prior to BSA analysis based on read depth, with SNPs having between 40 and 200× read depth being retained. A Chi-square test was used to select SNPs with significantly different read counts between the two alleles in the two pools. An empirical Bayesian approach (LIU et al. 2012) was used to estimate the conditional probability that there is no recombination between each SNP marker and the causal locus in both the resistant pool and in the susceptible pool. The probability of the linkage between the SNP and the causal gene is the geometric mean of these two conditional probabilities. Around 1000 SNPs were found to have possible linkage to the target locus. A subset of these putatively linked SNPs were used to fine map the locus using phenotyped F2 individuals. See references: LIU, S., C.-T. YEH, H. M. TANG, D. NETTLETON AND P. S. SCHNABLE, 2012 Gene Mapping via Bulked Segregant RNA-Seq (BSR-Seq). PLoS ONE 7: e36406 & Wu, T. D., and S. Nacu, 2010 Fast and SNP-tolerant detection of complex variants and splicing in short reads. Bioinformatics 26: 873-881.

TABLE 5

Plant Crossings and Study Type

| Species | PI# (male) | PI # (female) | Genome Size (Gb) | F2: Resistant to Susceptible Ratio |
|---|---|---|---|---|
| *G. tomentella* | PI441001 | PI441010 | 2 | 3:1 |
| *G. tomentella* | PI441001 | PI441011 | 2 | 3:1 |
| *G. tomentella* | PI441001 | PI441010 | 2 | 3:1 |
| *G. tomentella* | PI583970 | PI441007 | 2 | 3:1 |
| *G. tomentella* | PI583970 | PI441010 | 2 | 3:1 |
| *G. tomentella* | PI583970 | PI441011 | 2 | 3:1 |
| *G. tomentella* | PI448224 | PI441010 | 2 | 3:1 |
| *G. tomentella* | PI441008 | PI441010 | 2 | 7:9 |

1. PI441001 Data2Bio LLC (Ames, Iowa) Lab Methodology for gBSA-Seq Analysis for Tetraploid Soybean.

Chromosome discovery for causal loci in the tetraploid soybean population, PI441001 was carried out using Data2Bio's Genomic Bulked Segregant Analysis (gBSA) technology. It was theorized that ASR resistance is controlled by a single dominant allele. Four libraries were generated from DNA samples extracted from two susceptible tissue pools and two resistant tissue pools. These pools were then sequenced in eight (8) Illumina HiSeq2000 2×100 bp Paired-End (PE) lanes. A summary of the reference genomes used for subsequent analyses, read processing from raw data to quality trimming, alignment, SNP discovery and SNP impact are demonstrated in FIGS. 1-5 for population 441001. After various filtering steps 110,503 informative SNPs were identified in the PI441001 genome as being significantly associated with ASR resistance. A Bayesian approach was then used to calculate trait-associated probabilities. Next, physical maps of trait-associated SNPs (probability cutoff at 0.01) for the top contigs were created (FIG. 1). Two scaffolds, 46840 and 49652, were identified in PI441001 (SEQ ID NOs: 1 and 2 respectively). SNPs from these enriched scaffolds were mapped to the public *Glycine max* genome. In both populations, most of the SNPs from the top scaffolds clustered on small portions of Chr05 and Chr08 (see FIG. 4).

2. PI583970 Data2Bio LLC (Ames, Iowa) Lab Methodology for gBSA-Seq Analysis for Tetraploid Soybean Chromosome discovery for loci in the tetraploid soybean population, PI583970 was carried out using Data2Bio's Genomic Bulked Segregant Analysis (gBSA) technology. Two libraries were created from RNA samples extracted from one susceptible tissue pool and one resistant tissue RNA pool. After various filtering steps 59,014 informative SNPs were identified in the PI583970 genome that were significantly associated with ASR resistance. A Bayesian approach was then used to calculate trait-associated probabilities. Next, a physical map of trait-associated SNPs on contigs was created. The clustering of these SNPs suggests that the resistance loci is located in or near scaffold 000819F (see FIG. 7; Scaffold 001084F is SEQ ID NO: 4). The context sequences associated with these SNPs were also aligned to the public *Glycine max* genome to create a chromosome-level understanding of the mapping interval. The chromosomal positions of the trait-associated (ASR resistance) SNPs were then displayed graphically. Most of the SNPs from scaffold 001084F mapped and clustered on a small region of Chr05 (see FIG. 8). The data suggest that the loci responsible for ASR resistance maps within or near the interval 0.11 to 0.30 Mbp on scaffold 001084F (FIG. 9).

3. PI483224 Data2Bio LLC (Ames, Iowa) Lab Methodology for gBSA-Seq Analysis for Tetraploid Soybean Chromosome discovery for causal loci in the tetraploid soybean population, PI483224 was carried out using Data2Bio's Genomic Bulked Segregant Analysis (gBSA) technology. Two libraries were created from DNA samples extracted from one susceptible tissue pool and one resistant tissue pool (PI483224). After various filtering steps 428,263 informative SNPs were identified in the PI483224 genome to be significantly associated with ASR resistance. A Bayesian approach was then used to calculate trait-associated probabilities. Next, a physical map of trait-associated SNPs on contigs was created. The clustering of these SNPs indicates that the ASR resistance loci is located on or near scaffold 002687F (see FIG. 10). The context sequences associated with these SNPs were also aligned to the public *Glycine max* genome to create a chromosome-level understanding of the mapping interval. The chromosomal positions of the trait-associated (ASR resistant) SNPs were displayed graphically. Most of the SNPs from scaffold 002687F mapped to a small region of Chr05 (See FIG. 11). Data indicates that the ASR loci may map within or near the interval 0.17 to 0.36 MB on scaffold 002687F (see FIG. 12 and SEQ ID NO: 3).

Example 3 Embryo Rescue & Introgression of R Gene Intervals into *Glycine max* Lines Embryo rescue is performed (as described below) and chemical treatment to induce chromosome doubling is applied in order to generate amphidiploid shoots. If the amphidiploid plants are fertile they will be used to backcross with *Glycine max*. Backcrossing with *Glycine max* and subsequent embryo rescue will need to be performed for several generations in order to gradually eliminate the perennial *Glycine tomentella* chromosomes eventually resulting in ASR resistant *Glycine max* plant Wide crosses were carried out using Elite Syngenta soybean (*Glycine max*) lines (RM 3.7 to 4.8). The elite soybean lines are used as the females (pollen recipients) and multiple accessions of *Glycine tomentella* are used as the males or pollen donors. Selecting flowers from the *Glycine tomentella* plant containing anthers at the proper developmental stage is important. New, fully-opened, brightly colored flowers hold anthers with mature pollen. The pollen should appear as loose, yellow dust. These flowers are removed from the *Glycine tomentella* plant and crossed with the elite *Glycine max* plant for pollination. Pollen from the *Glycine tomentella* plants should be used within 30 minutes of flower removal. It is also important to identify and select elite soybean flower buds that are ready for pollination. A soybean flower bud is generally ready when it is larger in size when compared to an immature bud. The sepals of the soybean blossoms are lighter in color and the petals are just beginning to appear. First, use a pair of fine-tipped tweezers to carefully detach the sepals from the flower bud to expose the outer set of petals. Then, gently grasp and remove the petals (5 in total) from the flower exposing the ring of stamens surrounding the pistil. Since the stigma is receptive to pollen 1 day before the anthers begin shedding pollen it is important to recognize the stage development of "female ready, male not ready". When pollinating soybean flowers at this developmental stage it is not necessary to emasculate the female flower. Locate the stigma on the elite soybean flower. Then using 1 male flower, carefully peel off the petals to expose the anthers and gently dust the pollen grains onto the stigma of the soybean flower. Care should be taken not to damage the stigma at any time during this process. Starting the day after pollination a hormone mixture is sprayed onto the pollinated flower and eventual developing F1 pod 1× every day until harvest. The pollinated flower or pod is saturated with a light mist of the hormone mixture, taking care not to cause the flower/pod to prematurely detach from the plant. The mixture contains 100 mg GA3, 25 mg 1-Naphthaleneacetic acid (NAA) and 5 mg kinetin/L distilled water. Application of these hormones aid in the retention of the developing pod and in increased pod growth. The above described wide cross methodology results in success rates significantly higher than that reported in the literature. Further, no emasculation of female flowers is necessary, which saves time and reduces risk of damage to the stigma.

Harvest: Pods from wide crosses are harvested at approximately 14 to 16 days post pollination. (Harvest dates in the literature suggest 19 to 21 days, however the above method allows for faster harvest time and more robust pods). Pods are collected and counted according to wide cross combination to determine crossing success. The average crossing success across multiple soybean females and 5 different accessions of *Glycine tomentella* is approximately 40%. The wide cross pods can contain 1 to 3 seeds but generally 2 seeds are found in each F1 pod. The above described methodology allows for pod harvest at 14 to 16 days after pollination, ~5 days earlier than described in literature.

Embryo rescue: Harvested pods are collected and brought back to the lab to be sterilized. The pods are first rinsed with 70% EtOH for 2 to 3 minutes and then placed in 10% Clorox bleach for an additional 30 minutes on a platform shaker at approximately 130 RPM. Finally, the pods are rinsed multiple times with sterile water to remove any residual bleach. Embryo isolation can begin immediately following pod sterilization or pods can be stored at 4° C. for up to 24 hours prior to embryo isolation. The sterilized pods are next taken to a laminar flow hood where the embryos can be rescued. Individual pods are placed in a sterile petri dish and opened using a scalpel and forceps. An incision is made along the length of the wide cross pod away from the seed. The pod can then be easily opened to expose the seed. Alternatively, two pair of forceps can be used to separate the pod shell. Carefully remove the seed from the pod and place in a sterile petri dish under a dissection microscope. Very fine forceps are needed to isolate the embryo from the seed. With forceps in one hand, gently hold the side of the seed away from the embryo, with the hilum facing up. Use another pair of forceps in the other hand to remove the seed coat from the side of the seed containing the embryo. Peel off the membrane surrounding the embryo and push the embryo up from its bottom side. Embryos should be past the globular developmental stage and preferably past the early heart developmental stage (middle to late heart stage, cotyledon stage and early maturation stage embryos are desired). Isolated embryos are transferred to embryo rescue medium such as Soy ER1-1 (i.e. 3.1 g B5 basal salt, Gamborg's, lml B5 vitamins 1000×, 40 g sucrose [C12H22O11], 0.25 g casein hydrolysate, 0.25 ml BAP, 0.75 g MgCl2*6H20, 20 ml glutamine 25 mg/ml, 0.1 g serine [C3H7NO3], 4 ml Asparagine 25 mg/ml and 0.05 ml of IBA lmg/ml) Murashige and Skoog Medium (MS) and Gamborg's B-5 media (Bridgen, 1994) may also be used as embryo rescue medium. Embryos can be treated to induce chromosome doubling at this time. (See below for chromosome doubling details.) Isolated embryos remain on embryo rescue medium for 21 to 30 days at 24° C. Embryos may remain in the dark for the entire incubation on ER1-1, they also can be incubated in the dark and later completed in the light, or may spend the entire incubation in the light. There is not a callus induction stage in this protocol, shoots are developed directly from the embryos which allows for faster turnaround time, plantlet survival and better quality results. The above described embryo rescue method involves direct shoot regeneration from embryos, rather than regeneration through embryogenesis, thus making plant recovery quicker (shoot recovery in approximately 2-3 months, compared to reported up to 1 year timeline in the literature). Further, the following protocol does not require culture in the dark following transfer to germination medium nor does the above protocol require a transfer to rooting medium.

Chromosome doubling treatments: Either colchicine of trifluralin can be used to induce chromosome doubling. Ideally, late heart stage wide cross embryos (or larger) are chemically treated to induce chromosome doubling at any time from immediately following isolation up to 1 week post isolation. The doubling agent can be mixed in either solid or liquid medium and applied for several hours or up to a few days. Trifluralin is used at a concentration of 10-40 uM in either solid or liquid media. Alternatively, colchicine is used at a concentration of 0.4-1 mg/ml in either solid or liquid media. Following chemical treatment, embryos are transferred to fresh embryo rescue medium.

Shoot regeneration: Developing embryos are transferred from rescue medium to germination medium such as Soy ER GSMv2 (i.e. 3.2 g Schenk and Hilderbrandt Basal salt mixture, 1 g Myo-inositol [C6H1206], 5 ml Thiamine 1 mg/ml, 0.5 ml pyridoxine 1 mg/ml, 10 g sucrose [C12H22O11], and 7.5 g purified agar) for approximately 3 to 5 weeks in the light at 24° C. Alternatively, developing embryos may be transferred from rescue medium to elongation medium such as Soy E1 0 No TCV (i.e. 4.3 g MS Basal salt Mixture [MSP01], 5 ml MS iron 200×, 30 g Sucrose [C12H22011], 1 g MES [C6H13NO4S], 8 g purified agar, 1 ml B5 vitamins 100×, 2 ml glutamine 25 mg/ml, 0.50 ml zeatin riboside, trans isomers 1 mg/ml, 0.1 ml IAA 1 mg/ml, 0.2 ml GA3 5 mg/ml, 1.5 ml timentin 100 mg/ml, 0.3 ml cefotaxime 250 mg/ml, 0.5 ml vancomycin 100 mg/ml) Shoots can be kept on medium for approximately 3 to 5 weeks in the light at 24° C. Developing shoots may be transferred from media plates to Phytocons containing either germination or elongation medium for further shoot development. Established shoots having suitable roots are moved to soil.

Ploidy Analysis: Ploidy analysis is conducted using a flow cytometer. Leaf tissue for ploidy analysis is collected from small shoots either in culture or after establishment in soil. Tissue is collected on dry ice and stored at −80° C. until analysis, or collected on wet ice and analyzed the same day. A sample size of 0.5 $cm^2$ is sufficient. Samples are prepared according to the instructions in the Sysmex kit (Sysmex Inc., Kobe Japan). Each sample set contains an untreated F1 plant (not treated to induce chromosome doubling) as a control.

Example 4 ASR Resistance Trait Introgression

Amphidiploid lines generated from the wide cross (i.e. *Glycine tomentella* crossed with *Glycine max*) followed by embryo rescue as described in Example 3 were backcrossed multiple times with a recurrent elite *Glycine max* lines. It is known in the art that multiple backcrosses are needed to generate fertile hybrid lines, in particular the literature suggests that a BC3 generation is necessary. In this case it was determined that an additional backcrosses are necessary, BC4 in the case of *G. tomentella* x *G. max* to generate fertile hybrid plants. F1 hybrid plants produced by the methods as described above were created from wide crosses comprising PI441001, PI441008, PI446958, PI509501, PI583970, and PI483224. F1 plants were next crossed as a female with a male recurrent *G. max* plant to perform a first backcross (BC1 progeny). BC1 Progeny were further backcrossed for multiple generations (e.g. BC2). BC plants are evaluated for ASR resistance, chromosome numbers and in some cases lines are genotyped through use of molecular markers as described herein to detect the presence of chromosome intervals corresponding to SEQ ID NOs 1-5 or any marker identified in Tables 1-5.

The above examples clearly illustrate the advantages of the invention. Although the present invention has been described with reference to specific details of certain embodiments thereof, it is not intended that such details should be regarded as limitations upon the scope of the invention except as and to the extent that they are included in the accompanying claims.

Throughout this application, various patents, patent publications and non-patent publications are referenced. The disclosures of these patents, patent publications and non-patent publications in their entireties are incorporated by reference herein into this application in order to more fully describe the state of the art to which this invention pertains.

SEQUENCE LISTING

The patent contains a lengthy sequence listing. A copy of the sequence listing is available in electronic form from the USPTO web site (https://seqdata.uspto.gov/docdetail?docId=US12509736B2). An electronic copy of the sequence listing will also be available from the USPTO upon request and payment of the fee set forth in 37 CFR 1.19(b)(3).

That which is claimed:

1. A method of producing a soybean plant having increased resistance to Asian soybean rust (ASR), the method comprising the steps of:

a) providing a first soybean plant comprising in its genome a chromosomal interval comprising SEQ ID NO: 2, wherein said first soybean plant has resistance to ASR;

b) crossing the first soybean plant with a second soybean plant not comprising said chromosomal interval to produce a progeny soybean plant;

c) selecting the progeny soybean plant by isolating a nucleic acid from said progeny plant and detecting within said nucleic acid the presence of an allele that associates with ASR resistance, wherein said allele is an A at a position corresponding to position 1535471 of SEQ ID NO: 2, a G at position 1525812 of SEQ ID NO: 2, a G at position 1538522 of SEQ ID NO: 2, or a favorable allele positioned between the G at position 1525812 and the G at position 1538522 of SEQ ID NO: 2, thereby producing a soybean plant having resistance to ASR.

2. A method of producing a soybean plant having increased resistance to Asian soybean rust (ASR), the method comprising the steps of:

a) wide crossing a *Glycine max* plant with an ASR resistant *Glycine tomentella* plant having in its genome a chromosomal interval comprising SEQ ID NO: 2, or a portion thereof;

b) generating soybean pods from the cross of a);

c) isolating embryos from the pods of step b) and placing said embryos onto embryo rescue medium, wherein there is no callus induction;

d) analyzing genomic nucleic acid isolated from the embryo of step c) for the presence of an allele that associates with ASR resistance and is located within the chromosomal interval comprising SEQ ID NO: 2, wherein the allele is an A at a position corresponding to position 1535471 of SEQ ID NO: 2, a G at position 1525812 of SEQ ID NO: 2, a G at position 151538522 of SEQ ID NO: 2, or a favorable allele positioned between the G at position 1525812 and the G at position 1538522 of SEQ ID NO: 2;

e) transferring the embryos of step d) onto germination medium or elongation medium and collecting shoots from said embryos;

f) growing the collected shoots of step e) on germination or elongation medium; and g) transferring established shoots of step f) to soil, thereby producing a soybean plant having resistance to ASR.

3. The method of claim 2, wherein the embryos or shoots are treated with a chromosome doubling agent in any one of steps e)-g) to create amphidiploid plants, wherein the chromosome doubling agent is either colchicine or trifluralin.

4. A method of selecting a soybean plant having ASR resistance, the method comprising the steps of:

a. isolating a nucleic acid from a soybean plant;

b. detecting in the nucleic acid the presence of an allele that associates with ASR resistance, wherein the allele is an A at a position corresponding to position 1535471 of SEQ ID NO: 2, a G at position 1525812 of SEQ ID NO: 2, a G at position 1538522 of SEQ ID NO: 2, or a favorable allele positioned between the G at position 1525812 and the G at position 1538522 of SEQ ID NO: 2;

c. selecting a soybean plant having ASR resistance on the basis of the allele detected in step b); and d. crossing the selected soybean plant with another soybean plant lacking an ASR resistance allele.

* * * * *